(12) United States Patent
Akatsuka et al.

(10) Patent No.: US 6,954,991 B2
(45) Date of Patent: Oct. 18, 2005

(54) METHOD AND APPARATUS FOR MEASURING SHAPE OF TUBULAR BODY

(75) Inventors: Takumi Akatsuka, Oyama (JP); So Kanai, Oyama (JP)

(73) Assignee: Showa Denko K.K., Tokyo (JP)

( * ) Notice: Subject to any disclaimer, the term of this patent is extended or adjusted under 35 U.S.C. 154(b) by 56 days.

(21) Appl. No.: 10/660,635

(22) Filed: Sep. 12, 2003

(65) Prior Publication Data

US 2005/0050745 A1 Mar. 10, 2005

Related U.S. Application Data

(60) Provisional application No. 60/447,745, filed on Feb. 19, 2003, provisional application No. 60/421,079, filed on Oct. 25, 2002, and provisional application No. 60/413,439, filed on Sep. 26, 2002.

(30) Foreign Application Priority Data

| Sep. 12, 2002 | (JP) | 2002-266651 |
| Oct. 2, 2002 | (JP) | 2002-289933 |
| Oct. 9, 2002 | (JP) | 2002-296382 |
| Jan. 17, 2003 | (JP) | 2003-009014 |
| Feb. 7, 2003 | (JP) | 2003-031281 |
| Feb. 28, 2003 | (JP) | 2003-054126 |
| Apr. 9, 2003 | (JP) | 2003-105558 |
| Jul. 8, 2003 | (JP) | 2003-193624 |

(51) Int. Cl.$^7$ .......................... G01B 5/20; G01B 5/28
(52) U.S. Cl. .......................... 33/550; 33/549; 33/553
(58) Field of Search .......................... 33/501.01, 542, 33/543, 544.5, 549–554

(56) References Cited

U.S. PATENT DOCUMENTS

| 3,913,234 A | * | 10/1975 | Windle .......................... 33/549 |
| 3,942,253 A | * | 3/1976 | Gebel et al. .................. 33/551 |
| 3,943,632 A | * | 3/1976 | Albertazzi .................... 33/549 |
| 4,642,902 A | * | 2/1987 | Niedermayr ................. 33/543 |
| 4,914,827 A | * | 4/1990 | Cook .......................... 33/552 |
| 4,916,824 A | * | 4/1990 | Shimazutsu et al. .......... 33/551 |
| 5,535,143 A | * | 7/1996 | Face .......................... 33/553 |
| 6,810,593 B2 | * | 11/2004 | Kobayashi .................. 33/550 |

FOREIGN PATENT DOCUMENTS

| DE | 38 16 130 | 11/1989 |
| JP | 59-196410 | 11/1984 |
| JP | 61-70406 | 4/1986 |
| JP | 61-117406 | 6/1986 |
| JP | 4-19450 | 5/1992 |
| JP | 5-248842 | 9/1993 |
| JP | 7-308715 | 11/1995 |
| JP | 8-141643 | 6/1996 |
| JP | 9-170912 | 6/1997 |
| JP | 10-94807 | 4/1998 |

* cited by examiner

*Primary Examiner*—G. Bradley Bennett
(74) *Attorney, Agent, or Firm*—Oblon, Spivak, McClelland, Maier & Neustadt, P.C.

(57) ABSTRACT

A pair of reference portions 20 and 20 is brought into contact with an internal peripheral surface 11 of the vicinity of both side end portions of a tubular body 10. The tubular body 10 is rotated such that contact portions where the tubular body 10 and the pair of reference portions 20 and 20 contact move on the internal peripheral surface 11 in a circumferential direction of the tubular body 10 with positions of the pair of reference portions 20 and 20 fixed. The radial displacement of an external peripheral surface 12 of the tubular body 10 caused by the rotation of the tubular body 10 at at least one position 31 and 32 of an external side of the tubular element 10 is detected, wherein the at least one position is fixed relative to the circumferential direction of the tubular element 10.

49 Claims, 42 Drawing Sheets

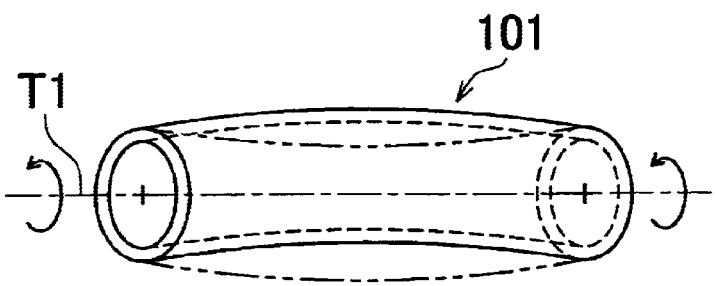
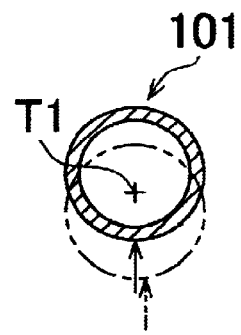
FIG.6A  FIG.6B
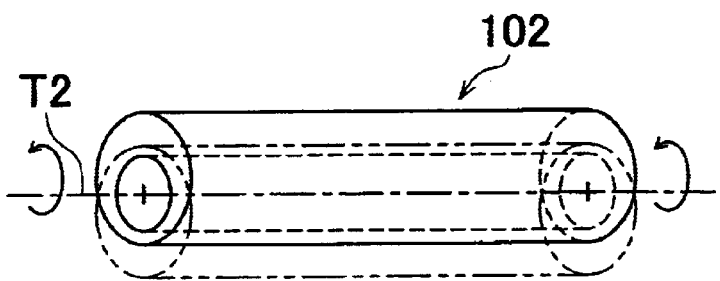
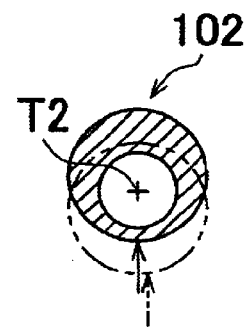
FIG.7A  FIG.7B
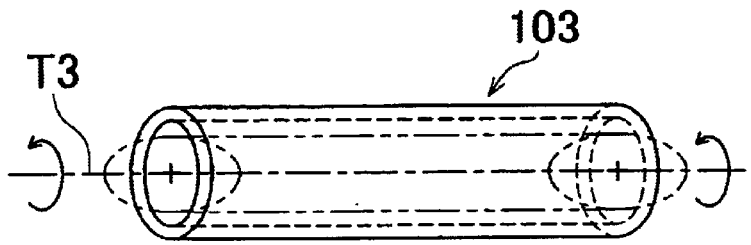
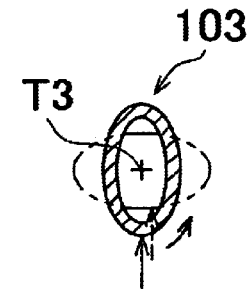
FIG.8A  FIG.8B
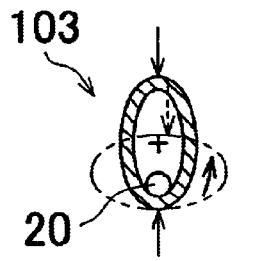
FIG.8C

METHOD AND APPARATUS FOR MEASURING SHAPE OF TUBULAR BODY

CROSS REFERENCE TO RELATED APPLICATIONS

This application is an application filed under 35 U.S.C. §111(a) claiming the benefit pursuant to 35 U.S.C. §119(e)(1) of the filing dates of U.S. Provisional Application No. 60/413,439 filed on Sep. 26, 2002, U.S. Provisional Application No. 60/421,079 filed on Oct. 25, 2002 and U.S. Provisional Application No. 60/447,745, filed on Feb. 19, 2003, of pursuant to 35 U.S.C. §111(b).

Priority is claimed to Japanese Patent Application No. 2002-266651 filed on Sep. 12, 2002, Japanese Patent Application No. 2002-289933 filed on Oct. 2, 2002, Japanese Patent Application No. 2002-296382 filed on Oct. 9, 2003, Japanese Patent Application No. 2003-9014 filed on Jan. 17, 2003, Japanese Patent Application No. 2003-31281 filed on Feb. 7, 2003, Japanese Patent Application No. 2003-54126 filed on Feb. 28, 2003, Japanese Patent Application No. 2003-105558 filed on Apr. 9, 2003, Japanese Patent Application No. 2003-193624 filed on Jul. 8, 2003, U.S. Provisional Application No. 60/413,439 filed on Sep. 26, 2002, U.S. Provisional Application No. 60/421,079 filed on Oct. 25, 2002, and U.S. Provisional Application No. 60/447,745 filed on Feb. 19, 2003, the disclosure of which are incorporated by reference in their entireties.

FIELD OF INVENTION

The present invention relates to a method and an apparatus for measuring a shape of a tubular member, such as a substrate of a photosensitive drum for use in copying machines, a method and an apparatus for inspecting such a tubular member, and a method and a system for manufacturing such a tubular member.

BACKGROUND ART

In a tubular body to be used as a rotating member in various machines, it is sometimes required to measure the precision of the shape. For example, in a substrate of a photosensitive drum for use in electrophotographic systems such as copying machines, a tubular body after the tube manufacturing steps is subjected to a shape measuring to keep high precision of the shape.

As a method for measuring the shape, there is a method shown in FIGS. 56 and 57. In this method, in a state in which the external peripheral surface 12 of portions near both ends of the tubular body 90 are supported by reference rollers 91, displacement measuring devices 92 are brought into contact with three positions on the longitudinal central portion of the external peripheral surface of the tubular body 10. Then, the tubular body 10 is rotated by rotating the reference rollers 91 to obtain the variation of the detected values of the displacement measuring devices 92. Using the detected values, the displacement at the longitudinal central portions of the external peripheral surface of the tubular body 10 is measured. Such obtained displacement reflects the deflection of the central external peripheral surface with respect t the external peripheral surfaces of the longitudinal end portions of the tubular body 10.

In cases where the tubular body 10 is rotatably supported at the inner peripheral surfaces of the end portions, the thickness distribution (unevenness of thickness) of the tubular body 10 affects the accuracy of rotation. Accordingly, in cases where high precision of shape is required, it can be considered that it is evaluated taking account of the degree of unevenness of thickness by measuring the maximum thickness and the minimum thickness of the tubular body 10.

However, the method for measuring the shape of the tubular body using the deflection measurement of the external peripheral surface of the tubular body 10 shown in FIGS. 56 and 57 and the thickness measurement using thickness measuring devices has the following problems.

(1) Since the deflection measurement of the external peripheral surface and the thickness measurement are performed by using different measuring devices, device differences among the measuring devices, errors arose from the handling of measuring devices and dispersion of the measuring persons will accumulate, which makes it difficult to attain high accuracy of measurement.

(2) Although the deflection of the external peripheral surface and the distribution of the thickness may sometimes be set off geometrically, both of them are measured separately. Therefore, the aforementioned circumstances cannot be considered. As a result, there is a possibility that excessive quality is requested.

Japanese Unexamined Laid-open Patent Publication Nos. H11-271008, S63-131018, 2001-336920, H8-141643, H11-63955, H3-113114, 2000-292161 and H2-275305 for example, disclose various techniques for measuring a shape of a tubular body. However, these publications fail to disclose techniques capable of measuring deflection of an external peripheral surface of a tubular body easily with high precision.

Furthermore, it can be considered to employ a method for measuring a shape of a tubular body using a conventional circularity measuring device. In this case, however, it is required to repeatedly perform every tubular element such that the rotating axis of a measurement table on which the tubular body is disposed and the central axial position of the tubular body to be measured are aligned and that the rotating axis of the measurement table and the central axis of the tubular body are aligned in parallel, which takes a lot of time and trouble.

DISCLOSURE OF THE INVENTION

Under the aforementioned technical background, the present invention aims to provide a method, etc., for measuring a shape of a tubular body in a simple manner with high precision.

A method for measuring a shape of a tubular body according to a first aspect of a preferable embodiment of the present invention, a method for measuring a shape of a tubular body, comprises: making a pair of reference portions and internal peripheral surfaces of vicinities of both end portions of the tubular body in contact with each other; rorating the tubular body such that contact portions where the tubular body and the pair of reference portions come in contact with each other shift on the internal peripheral surface in a circumferential direction of the tubular body with positions of the pair of reference portions fixed; and detecting radial displacement of an external peripheral surface of the tubular body caused by a rotation of the tubular body at at least one position outside the tubular element, the at least one position being fixed relative to the circumferential direction of the tubular element.

According to such a method for measuring a shape of a tubular body, the deflection of the external peripheral surface with respect to the internal peripheral surface as a benchmark can be measured. In other words, the influence of uneven thickness of the tubular body is reflected in the measured deflection of the external peripheral surface. Therefore, it becomes possible to perform a measurement of a tubular body whose internal peripheral surface is to be rotatably supported in the actual use in a condition similar to the actual use condition. Furthermore, since the deflection of the external peripheral surface to be measured reflects the influence of uneven thickness, it is possible to prevent the accumulation of device differences and/or a request of excessive quality which may occur in the case of separately measuring the thickness of the tubular body. Furthermore, since the deflection of the external peripheral surface to be measured reflectes the influence of uneven thickness, the time required to conduct the measurement can be shortened. Furthermore, since the measurement can be performed by simply measuring the external peripheral surface side in a state in which a benchmark is in contact with the internal peripheral surface side, the structure can be simplified, the accumulation of measurement errors can be decreased as small as possible, and the shape measurement can be attained with high precision. Furthermore, since it only requires to bring the reference portions into contact with the internal peripheral surface side, the method can be preferably applied to a shape measurement of a tubular body with a smaller inner diameter. In the meantime, it is required to fix the position of the reference portions only when the tubular body is rotated for the purpose of detecting the displacement of the external peripheral surface of the tubular body. Therefore, for example, the position can be moved when the tubular body is set to a shape measuring apparatus. Furthermore, although it is required to fix the positions of the reference portions, the reference portions can be changed in posture. For example, the reference portion itself can be rotated at its fixed position.

An apparatus for measuring a shape of a tubular body according to another aspect of a preferable embodiment of the present invention, comprises: a pair of reference portions in contact with an internal peripheral surface of vicinities of both end portions of the tubular body disposed horizontally or near horizontally; a pedestal portion that supports the tubular body, wherein the pedestal portion is in contact with an external peripheral surface of the tubular body from a lower side of the tubular body so that a height of the internal peripheral surface of the tubular body is positioned at the same height or almost at the same height of the pair of reference portions; a pressing portion that presses the external peripheral surface of the tubular body so as to press the tubular body against the reference portion, the pressing portion being provided at an outside of the tubular body; and a displacement detecting device that detects radial displacement of an external peripheral surface of the tubular body caused by a rotation of the tubular body when the tubular body rotates in a state in which the tubular body is in contact with the pair of reference portions at a position facing off against a hypothetical straight line passing two contact portions where the internal peripheral surface of the tubular body and the pair of reference portions contact from an outside of the tubular body.

According to such a method for measuring a shape of a tubular body, the deflection of the external peripheral surface with respect to the internal peripheral surface as a benchmark can be measured. In other words, deflection of the external peripheral surface in which the influence of uneven thickness of the tubular body is reflected can be measured. Therefore, it becomes possible to perform a measurement of a tubular body whose internal peripheral surface is to be rotatably supported in a condition similar to the actual use condition. Furthermore, since the deflection of the external peripheral surface to be measured reflects the influence of uneven thickness, it is possible to prevent the accumulation of device differences and/or a request of excessive quality which may occur in the case of separately measuring the thickness of the tubular body. Furthermore, since the deflection of the external peripheral surface to be measured reflects the influence of uneven thickness, the time required to conduct the measurement can be shortened. Furthermore, since the measurement can be performed by simply measuring the radial displacement of the external peripheral surface of the tubular body in a state in which the pair of reference portions is in contact with the internal peripheral surface of the tubular element, the structure can be simplified, the accumulation of measurement errors can be decreased as small as possible, and the shape measurement can be attained with high precision. Furthermore, since the radial displacement of the external peripheral surface of the tubular element is measured at a position facing off against a hypothetical straight line passing two contact portions where the internal peripheral surface of the tubular body and the pair of reference portions contact from an outside of the tubular body, a stable shape measurement can be performed even in cases where the rotational center position of the tubular body is shifted. This enables to obtain high reliable measured result because the position facing off against the hypothetical straight line from the outside of the tubular body is the least position where the radial displacement of the external peripheral surface of the tubular body receives the influence of the shift of the rotational central position of the tubular body. Furthermore, since the tubular body is pressed against the pair of reference portions from the outside by the pressing portion, the tubular body can assuredly come into contact with the pair of reference portion when the tubular body rotates. This enables accurate shape measurement. Furthermore, since the tubular body is supported from the lower side thereof by the pedestal portion and that the reference positions for shape measurement by the pair of reference portions and the detecting position by the displacement detecting device are arranged at the side of the tubular body, by rotating the tubular body in a state in which the internal peripheral surface is in contact with the pair of reference portions, even in cases where the height position of the rotational center of the tubular body moves upward or downward, shape measurement can be performed stably without being affected by the influence, resulting in a measured result with high reliability because of the following reasons. The up-and-down direction that the tubular body is supported by the pedestal portion and the direction (horizontal direction) that the pair of reference portions contact and displacement is detected by the displacement detecting device are approximately orthogonal oriented directions. Furthermore, since the tubular body is supported from the lower side thereof by the pedestal portion, a structure in which a free space is formed above the tubular body can be employed. By employing this structure, the tubular element can be easily set to the shape measuring apparatus from the above or taken out therefrom. Furthermore, by employing the structure in which a free space is formed above the tubular body, a worker can manually rotate the tubular body with his/her hand from the above. Furthermore, since it is enough that the reference portions can be brought into contact with the internal peripheral surface side of the tubular body, it is possible to preferably employ this apparatus to shape measurement of a tubular body with smaller inner diameter.

An apparatus for measuring a shape of a tubular body according to still another aspect of a preferable embodiment of the present invention, comprises: a pair of reference portions which come into contact with internal peripheral lower surfaces of vicinities of both end portions of a tubular body disposed horizontally or nearly horizontally; four supporting rollers which come into contact with external peripheral lower surfaces of the tubular body to support the tubular body and press the tubular body against the pair of reference portions, wherein two of the four supporting rollers are disposed at one of end portions of the tubular body and the other two of the four supporting rollers are disposed at the other side portion of the tubular body; and a displacement detecting device that detects radial displacement of an external peripheral surface of the tubular body caused by a rotation of the tubular body when the tubular body rotates in a state in which the tubular body is in contact with the pair of reference portions at a position facing off against a straight line passing two contact portions where the internal peripheral surface of the tubular body and the pair of reference portions contact from an outside of the tubular body.

According to such an apparatus for measuring a shape of a tubular body, the deflection of the external peripheral surface with respect to the internal peripheral surface as a benchmark, i.e., the deflection of the external peripheral surface to which the influence of uneven thickness of the tubular body is reflected, can be measured. Therefore, it becomes possible to perform measurement of a tubular body whose internal peripheral surface is to be rotatably supported in the actual use in a condition similar to the actual use condition. Furthermore, since the deflection of the external peripheral surface to be measured is reflected by the influence of uneven thickness, it is possible to prevent the accumulation of device differences and/or a request of excessive quality which may occur in the case of separately measuring the thickness of the tubular body. Furthermore, since the deflection of the external peripheral surface to be measured reflects the influence of uneven thickness, the time required to conduct the measurement can be shortened. Furthermore, since the apparatus has a simple structure in which the radial displacement of the external peripheral surface of the tubular body is measured in a state in which the pair of reference portions is in contact with the internal peripheral surface of the tubular element, the accumulation of measurement errors can be decreased as small as possible, and the shape measurement can be attained with high precision. Furthermore, since it only requires to bring the reference portions into contact with the internal peripheral surface side, the apparatus can be preferably applied to shape measurement of a tubular body with a smaller inner diameter. Furthermore, since the weight of the tubular body is supported from the lower side thereof by the supporting rollers, the contact pressure between the tubular body and the pair of contacting portions can be controlled appropriately irrespective of the weight of the tubular body, which enables high reliable shape measurement. Furthermore, since two supporting rollers are disposed at both sides of the tubular body, respectively, the axial position of the tubular body and the attitude of the tubular body can be stabilized, resulting in a stable rotational movement of the tubular body. As a result, high accuracy of measurement can be attained. Furthermore, since the supporting rollers carry out a function of supporting the weight of the tubular body and a function of positioning the axis of the tubular body, the number of members that contact the tubular body can be decreased. This eliminates factors of errors, contributing to accurate shape measurement, which enables to obtain high reliability of shape measurement and decrease the possibility of damages to the tubular body.

A method for measuring a shape of a tubular body according to still another aspect of a preferable embodiment of the present invention, comprises: temporarily correcting cross-sectional shapes of both end portions of the tubular body by bringing plural correcting rollers into contact with both end portions of the tubular body; rotating the tubular body in a state in which the cross-sectional shapes of the both end portions are temporarily being corrected; and detecting radial displacement of an external peripheral surface of the tubular body caused by a rotation of the tubular body.

According to such a method for measuring a shape of a tubular body, the radial displacement of the external peripheral surface can be detected, not in a state in which the tubular body is in an untouched state, but in a state in which both of the side end portions are temporality corrected by the correcting rollers. Therefore, the shape of the tubular body can be measured under the condition similar to the actual use condition in which the cross-sectional shape of both of the side end portions are deformed into an appropriate shape. Accordingly, the shape of the tubular body in actual use can be measured with a high degree of accuracy, which in turn can prevent a request of excessive quality to secure necessary shape accuracy which is demonstrated in actual use.

A method for measuring a shape of a tubular body according to still another aspect of a preferable embodiment of the present invention, comprises: plastically deforming both end portions of the tubular body to correct a cross-sectional shape of both end portions by rotating the tubular body while pressing both end portions with a plurality of correcting rollers; and decreasing pressing force of the correcting rollers against the end portions of the tubular body and then continuously rotating the tubular body while bringing at least a part of the correcting rollers into contact with the tubular body to detect radial displacement of an external peripheral surface of the tubular body caused by a rotation of the tubular body, thereby performing a measurement of the shape of the tubular body.

According to such a method for measuring a shape of a tubular body, the radial displacement of the external peripheral surface can be detected, not in a state in which the tubular body is in an untouched state, but in a state in which both of the side end portions are temporality corrected by the correcting rollers. Therefore, the shape of the tubular body can be measured under the condition similar to the actual use condition in which the cross-sectional shape of both of the side end portions are deformed into an appropriate shape. Accordingly, the shape of the tubular body in actual use can be measured with a high degree of accuracy, which in turn can prevent a request of excessive quality to secure necessary shape accuracy which is demonstrated in actual use. Furthermore, the correcting rollers for correcting both of the side end portions of the tubular body serves as supporting rollers for maintaining the posture of the tubular body by supporting the tubular body at the time of measuring the shape of the tubular body. Therefore, by setting the tubular body to a shape measuring position where the tubular body comes into contact with the correcting rollers, the end portion correction and the shape measurement can be performed continuously, resulting in excellent operation efficiency. Furthermore, since the number of contacts caused between the tubular body and the rollers supporting the tubular body can be decreased, the possibility of damages caused by the contacts of the tubular body against the rollers or the like can be decreased. Furthermore, since the tubular body whose shape was measured as explained above has already been corrected in cross-sectional shape of the end portions, an operation of press fitting of a flange or the like can be performed easily and assuredly. Thus, it becomes possible to prevent generation of defective products caused by pressing a flange or the like into an uncorrected non-circular end portion in a slanted manner.

A method for measuring a shape of a tubular body according to still another aspect of a preferable embodiment of the present invention, comprises: inserting a pair of expandable clamps into the inside of vicinities of both end portions of the tubular body; expanding the pair of expandable clamps to thereby bring the pair of expanded clamps into contact with internal peripheral surfaces of the tubular body along entire circumference thereof; rotating the tubular body together with the expandable clamps about a central axis of the pair of expandable clamps as a rotation axis; and detecting radial displacement of an external peripheral surface of the tubular body caused by a rotation of the tubular body at at least one position positioned outside the tubular body and fixed with respect to a circumferential direction of the tubular body.

According to such a method for measuring a shape of a tubular body, the central axis position of the pair of expandable clamps is located almost at the center of a circle formed by the internal peripheral surface of the tubular body. By rotating the tubular body about the central axis of the pair of expandable clamps, it becomes possible to realize a rotating status extremely similar to a rotating status of the tubular body in actual use which is rotated with the internal peripheral surface supported. Therefore, the action of the tubular body detected when rotating is almost equivalent to the action of the tubular body in actual use. Concretely, the detected radial displacement of the external peripheral surface corresponds to the deflection generated in actual use. In detail, the radial displacement of the external peripheral surface to be detected corresponds to the deflection of the external peripheral surface with respect to the near central of a circle formed by the internal peripheral surface at the vicinity of both end portions of the tubular body. Therefore the radial displacement reflects all influences such as the curvature, the uneven thickness, the cross-sectional shape (circularity), etc. of the tubular body. Furthermore, since the deflection of the external peripheral surface to be measured reflects the influence of uneven thickness, it is possible to prevent the accumulation of device differences and/or a request of excessive quality which may occur in the case of separately measuring the thickness of the tubular body. Furthermore, since the deflection of the external peripheral surface to be measured reflects the influence of uneven thickness, the time required to conduct the measurement can be shortened. Furthermore, since the pair of expandable clamps contact the internal peripheral surface of the tubular body along the entire circumference thereof, the central axis of the pair of expandable clamps can be assuredly positioned at the center of a circle formed by the internal peripheral surface of the tubular body, which can realize a status similar to a rotating status in actual use. Furthermore, since the pair of expandable clamps contact the internal peripheral surface of the tubular body along the entire circumference thereof, even if the expandable clamps make contact with the tubular body with larger pressing force, the pressing force can be distributed in the circumferential direction almost evenly, contributing to accurate shape measurement. Furthermore, it is only requested to insert the pair of expandable clamps inside the tubular body, expand them therein and then rotate the tubular body together with the expandable clamps to detect the displacement of the external peripheral surface. Therefore it is possible to perform the measurement with a simple structure and obtain high accuracy of shape measurement by decreasing the accumulation of measurement errors as small as possible.

BRIEF DESCRIPTION OF THE DRAWINGS

FIG. 6A is a perspective view of a curved tube 101 which is a defective example of a tubular body.

FIG. 6B is a cross-sectional view of an axial central portion of the curved tube 101.

FIG. 7A is a perspective view of a tube 102 with uneven thickness which is a defective example of a tubular body.

FIG. 7B is a cross-sectional view of the tube 102.

FIG. 8A is a perspective view of a flat tube as a defective example of a tubular body which is not perfect circle in cross-section, but flat in cross-section.

FIG. 8B is a cross-sectional view of the flat tube 103.

FIG. 8C is a cross-sectional explanatory view showing the status of the flat tube 103 which is being rotated in a state in which a pair of reference portions 20 and 20 are in contact with the internal peripheral surface of the tubular body (flat tube) 103.

FIG. 9A is an example in which there is no change in detected displacement.

FIG. 9B is an example in which deflection with a 360-degree-cycle is detected.

FIG. 9C is an example in which deflection with a 180-degree-cycle is detected.

FIG. 16A is a perspective view showing the state in which one end of the tubular body 10 is inserted with respect to one of the reference portions 42.

FIG. 16B is a perspective view showing the state in which the other end of the tubular body 10 is descended so that a pair of reference portions 42 and 42 are positioned inside the tubular body 10.

FIG. 16C is a perspective view showing the state in which the tubular body 10 is horizontally slid so that the other reference portion 42 is inserted into the other end portion of the tubular body 10.

FIG. 36 is an enlarged perspective view of a tubular body supporting structure in which the ninth embodiment is constituted by approximately the same mechanical structure as the second embodiment or the like.

FIG. 52 is an example of a tubular body 107 which is uneven in material distribution along the circumferential direction.

BEST MODE FOR CARRYING OUT THE INVENTION

[Principal of Measurement]

Although various embodiments of a method and an apparatus for measuring a shape of a tubular body according to the present invention will be explained as follows, first, the principal of the measurement will be explained with reference to schematic drawings.

Figure 1:
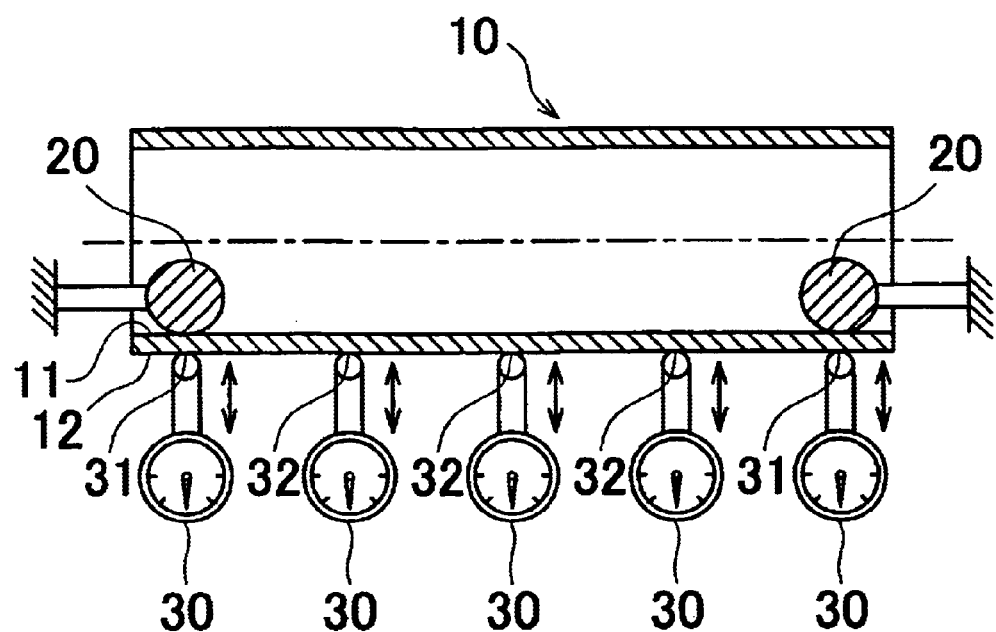
FIG. 1 is a front cross-sectional view showing the principle of the method for measuring a shape of a tubular body according to the present invention.
Figure 2:
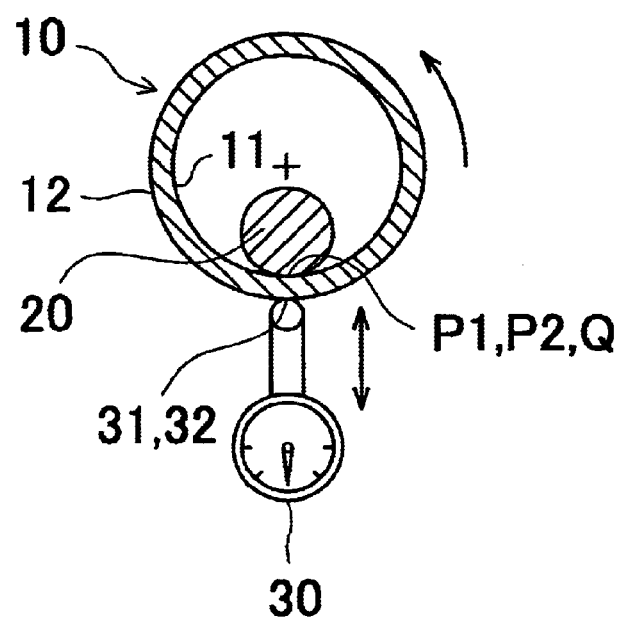
FIG. 2 is a side cross-sectional view showing the same.
Figure 3:
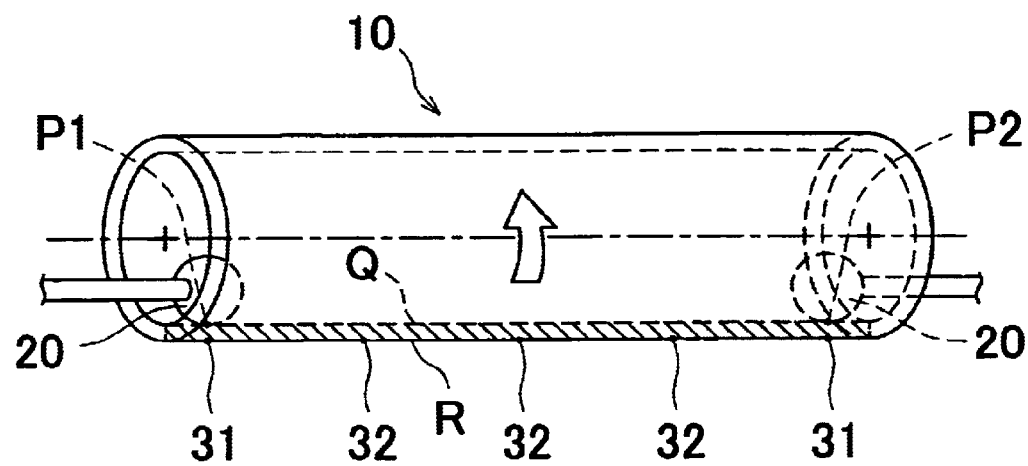
FIG. 3 is a perspective view showing the same.
Figure 4:
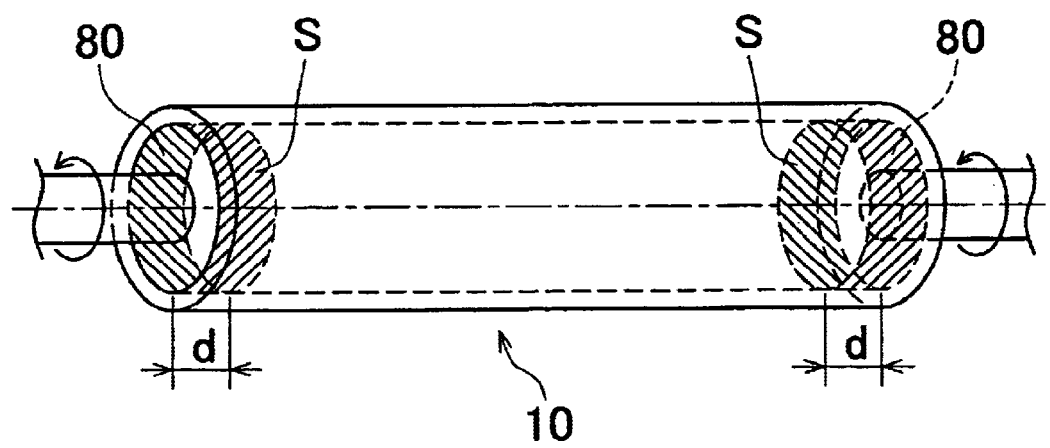
FIG. 4 is an explanatory perspective view showing the use status of the tubular body (work) as an object to be measured.
Figure 5:
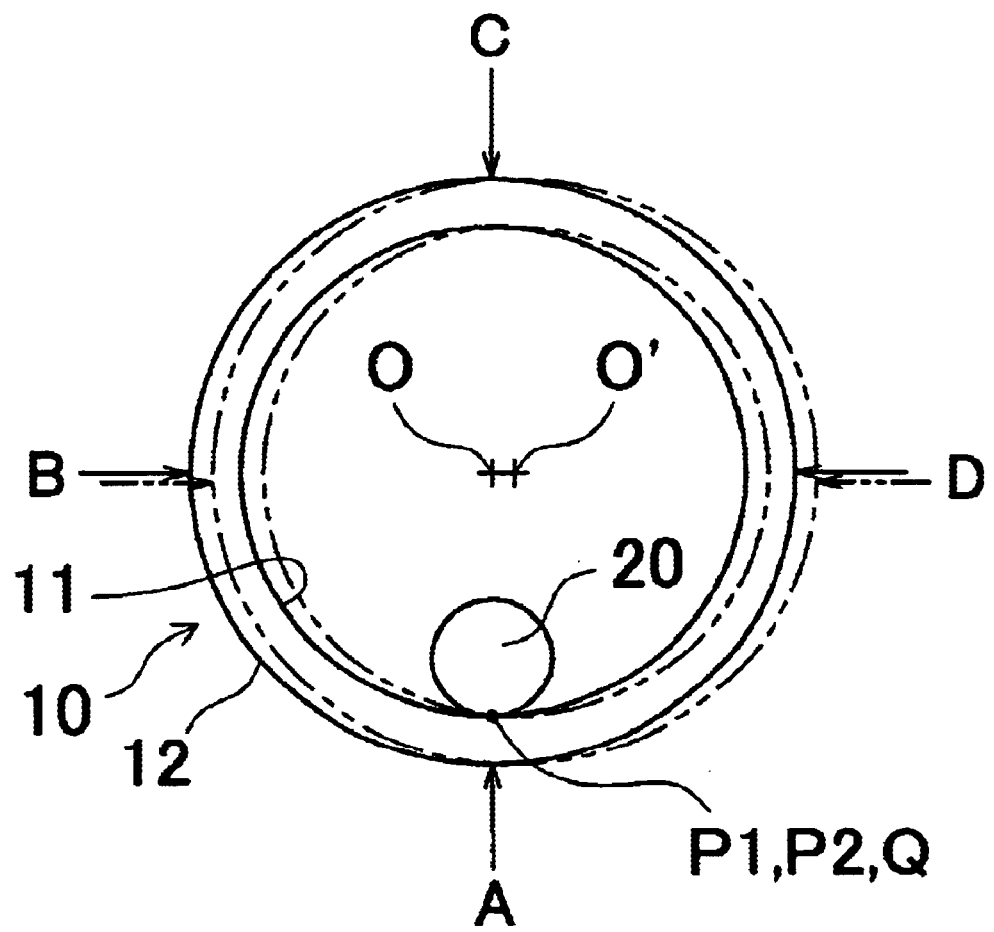
FIG. 5 is an explanatory view of a detecting position for displacement in a method for measuring a shape of a tubular body according to the present invention.

FIG. 1 is a front cross-sectional view showing the principle of a method for measuring a shape of a tubular body according to the present invention. FIG. 2 is a side cross-sectional view threreof. FIG. 3 is a perspective view thereof. FIG. 4 is an explanatory perspective view showing the use status of the tubular body (work) as a shape measuring object. FIG. 5 is an explanatory view of a detecting position for displacement in a method for measuring a shape of a tubular body according to the present invention.

<Tubular Body>

In the present invention, it is assumed that a tubular body to be measured is a cylindrical member having an internal peripheral surface and an external peripheral surface which are circular in cross-section. Furthermore, the tubular body (work) 10 exemplified in this embodiment is a member which will be used while being rotated in a state in which the opposite ends are supported by flanges 80 and 80 inserted therein as shown in FIG. 4. The positions where these flanges 80 and 80 are brought into contact with the tubular body 10 so as to rotatably support it are, for example, the areas S (areas with hatching lines in FIG. 4) with a width d from both ends of the tubular body 10.

As the material of such a tubular body (work) 10, aluminum alloy can be exemplified. However, it is not limited to this and can be various metals or synthetic resins.

As the manufacturing method, a combination of extrusion molding and drawing molding can be exemplified as will be described later. However, it is not limited to this and can be any method capable of manufacturing a tubular body, such as extrusion molding, drawing molding, casting, forging, injection molding, cutting or a combination thereof.

As such a tubular body 10, in concrete, a photosensitive rum substrate or raw tube for use in copying machines or printers employing an electrophotography system can be exemplified. The aforementioned photosensitive drum substrate denotes a tubular body after executing cutting processing or drawing processing but before forming a photosensitive layer. However, a tubular body after forming a photosensitive layer on a photosensitive drum substrate can also be a tubular body to be subjected to the method for measuring a shape according to the present invention.

<Outline>

As shown in FIGS. 1 to 3, in the method for measuring a shape of a tubular body according to the present invention, a pair of reference portions 20 and 20 are brought into contact with the internal peripheral surface 11 of the tubular body (work) 10 at the vicinities of both end portions, and the radial displacement of the external peripheral surface 12 of the tubular body 10 is detected by each of displacement detecting devices 30 arranged outside the tubular body 10 while rotating the tubular body 10.

The rotation of the tubular body 10 can be performed by grasping the tubular body 10 with an operator's hand, bringing a driving roller (not shown) into contact with the tubular body 10 or using any other method. The rotational center of the tubular body 10 is located approximately at a position corresponding to the axial center of the tube shape of the tubular body 10.

<Reference Portion>

The positions of the pair of reference portions 20 and 20 are fixed at least when the tubular body 10 is rotated, and thus the contact portions relative to the tubular body 10 advance on the internal peripheral surface 11 of the tubular body 10 in the circumferential direction. This tubular body 10 is positioned by the pair of reference portions 20 and 20 at least when the tubular body is rotated to define the reference of the shape measurement.

In this illustration, the pair of reference portions 20 and 20 are in contact with the tubular body 10 at positions (within the regions S with hatching lines in FIG. 4) to be supported at the time of the actual use of the tubular body 10. By this, the portions which will be the rotational operation references at the time of the actual use of the tubular body 10 can be references for the shape measurement, which realizes more practical measurement.

Furthermore, the pair of reference portions 20 and 20 are formed into a spherical shape, respectively, and in contact with the internal peripheral surface 11 of the tubular body 10 approximately in a point contact state, respectively. This enables a clear specification of the reference position for the shape measurement.

The pair of reference portions 20 and 20 can be in contact with the tubular body 10 at any position on the lower internal peripheral surface, the side internal peripheral surface, the upper internal peripheral surface (ceiling surface), or the diagonally upper or lower internal peripheral surface of the tubular body.

<Displacement Detecting Device>

The displacement detecting devices 30 are arranged outside the tubular body 10, and their circumference direction positions of the tubular body 10 (displacement detecting positions 31 . . . , 32 . . . ) are fixed at least when the tubular body 10 is rotated. In other words, in accordance with the rotation of the tubular body 10, the displacement detecting positions 31 and 32 by the displacement detecting devices 30 advance on the external peripheral surface 12 of the tubular body 10 in the circumferential direction thereof.

The radial displacement of the external peripheral surface 12 of the tubular body 10 to be detected by the displacement detecting devices 30 means the so-called deflection (external diameter deflection). In this invention, one of features resides in that the deflection of the external peripheral surface 12 with respect to the internal peripheral surface 11 of the tubular body 10 is detected (measured) by the aforementioned pair of reference portions 20 and 20 in contact with the internal peripheral surface 11 of the tubular body 10.

In this illustrations, one embodiment in which five displacement detecting devices 30 are arranged so that five positions different in the axial directional position of the tubular body 10 can be displacement detecting positions 31 and 32 is exemplified.

Especially, two outermost displacement detecting devices 30 and 30 are disposed at the positions 31 and 31 facing off against the pair of reference portions 20 and 20 at the vicinities of both ends of the tubular body 10 as displacement detecting positions 31 and 31. At these positions 31 and 31, the thickness of the tubular body 10 pinched by and between the reference portion 20 and the displacement detecting device 30 can be measured.

On the other hand, the other three displacement detecting devices 30 are disposed at positions 32 other than the positions 31 and 31 corresponding to the pair of reference portions 20 and 20 as displacement detecting positions. At each of these positions 32, the deflection of the external peripheral surface of the tubular body 10 can be detected.

The circumferential positions of the five displacement detecting devices 30 are positions 31 and 32 corresponding to a hypothetical straight line Q passing two contact points P1 and P2 where the internal peripheral surface 11 of the tubular body 10 and the pair of reference portions 20 and 20 contact via a thickness (region R with hatching lines shown in FIG. 3) of the tubular body 10 from the outside of the tubular body 10, as shown in FIG. 3.

FIG. 5 is an explanatory drawing for explaining the features of each displacement detecting position with respect to the circumferential direction of the tubular body 10.

In the method for measuring a shape of a tubular body according to the present invention, the position of each reference portion 20 is fixed stably since the reference portion 20 is a benchmark of the shape measurement. However, there is a possibility that the tubular body 10 contacting the reference portion 20 is unstable in position (posture of the tubular body 10) except for the positions contacting the reference portions 20. For example, as shown in FIG. 5, there is a possibility that the tubular body 10 which is being measured (rotated) shifts from the state shown by the actual line with the center located at the position O to the state shown by the phantom line with the center located at the position O'.

At this time, the position A facing off against the hypothetical straight line Q passing the contact portions P1 and P2 in contact with the reference portion 20 is a position where the shift (O→O') of the tubular body least affects the displacement of the external peripheral surface 12 of the tubular body 10 in the radial direction (in the direction of the arrow shown at each position A, B, C, D in FIG. 5). In other words, once the positions facing off against the hypothetical straight line Q are set to be displacement detecting positions, even if the tubular body 10 shifts during the measurement, the measured displacements hardly receive the influence, resulting in stable measurement.

In a concrete apparatus for measuring a shape which will be described later, it is configured so as to stabilize the position of the tubular body 10 to decrease the problem that the tubular body 10 shifts during the measurement.

When the tubular body 10 is rotated in a state in which the pair of reference portions 20 and 20 are in contact with the internal peripheral surface 11 of the tubular body 10, there will be no radial displacement of the external peripheral surface 12 if the tubular body 10 is perfectly circular in cross-sectional shape. To the contrary, if the tubular body 10 is not perfectly circular, the deviation will be detected as the displacement of the external peripheral surface by the displacement detecting devices 30.

(Examples of Defective Tubes)

Next, examples of typical defections of the tubular body 10 will be explained with reference to FIGS. 6 to 8.

<Bent Tube>

FIG. 6A is a perspective view of a bent tube 101 as a defective example of the tubular body. The bent tube 101 denotes a tube whose axis is bent. Here, in order to exclude another defective factors, it is assumed that the circle formed by the internal peripheral surface (internal peripheral circle) and the circle formed by the exterior peripheral surface (exterior peripheral circle) in each cross-section are perfectly circular along the entire length, and that the center of the internal peripheral circle and that of the external peripheral circle coincide with each other (concentric), and therefore the thickness of the tubular body is uniform.

In the actual use of such a bent tube 101, as explained with reference to FIG. 4, when the tube 101 is rotated by the flanges inserted into both ends of the tubular body, as shown in FIG. 6A, the bent tube 101 rotates about the straight line T1 passing the centers of the internal peripheral circles at the vicinities of both ends of the tube 101, causing deflation at the axial central portion of the bent tube 101. The chain double-dashed line in FIG. 6A shows the state rotated by 180 degrees from the state shown by the solid line.

FIG. 6B is a cross-sectional view taken at the axial central portion of the bent tube 101, and the chain double-dashed line shows the external peripheral surface (external peripheral circle) in the state rotated by 180 degrees from the state shown by the solid line. As shown in this figure, although the tubular body 101 is pushed up in the state shown by the solid line, it is pushed down when rotated by 180 degrees as shown by the chain double-dashed line, and then it returns to the state shown by the solid line when further rotated by 180 degrees. That is, 360-degree-cycle deflection is generated.

In the rotation using the flanges, the line passing the center of the internal peripheral circle at the vicinity of one end portion of the tubular body supported by the flange and the center of the internal peripheral circle at the vicinity of the other end portion of the tubular body supported by the flange constitutes the rotation axis T1. However, this rotation axis T1 and the center of the external peripheral circle are misaligned at the axial central portion of the bent tube 101. The deflection caused at the central portion in the axial direction of the bent tube 101 arises from the misalignment between the rotation axis T1 determined by the internal peripheral circles at the vicinities of both ends of the tube 101 and the center of the external peripheral circle in a cross-section to be observed.

<Uneven Thickness Tube>

FIG. 7A is a perspective view of a tube 102 with uneven thickness as a defective example of a tubular body (hereinafter referred to as "uneven thickness tube"). The uneven thickness tube denotes a tube in which the thickness differs in the circumferential direction at a cross-section of a tubular body. Here, in order to exclude another defective factors, it is assumed that the axis of the tubular body is a straight line, the circle formed by the internal peripheral surface (internal peripheral circle) and the circle formed by the exterior peripheral surface (exterior peripheral circle) are perfectly circular in each cross-section along the entire length thereof, but the center of the internal peripheral circle and that of the external peripheral circle are shifted (eccentric), and therefore the thickness is uneven. Furthermore, it is also assumed that the cross-sectional configuration is constant along the axial direction of the tubular body and that there is no twist.

In the actual use of such an uneven thickness tube 102, as explained with reference to FIG. 4, when the tube is rotated by the flanges inserted into both ends of the tubular body, as shown in FIG. 7A, the uneven thickness tube 102 rotates about the straight line T2 passing the centers of the internal peripheral circles at the vicinities of both ends of the tube 102, causing deflation at the entire length of the tube 102 along the axial direction. The chain double-dashed line in FIG. 7A shows the state rotated by 180 degrees from the state shown by the solid line.

FIG. 7B is a cross-sectional view of the uneven thickness tube 102, and the chain double-dashed line shows the external peripheral surface (external peripheral circle) in the sate rotated by 180 degrees from the state shown by the solid line. As shown in this figure, although the external peripheral surface of the tube 102 is raised upward as a whole since the thicker portion is located at the upper portion as shown by the solid line, the thicker portion is moved downward when it is rotated by 180 degrees as shown by the chain double-dashed line and the thinner portion is located at the upper position, and therefore the external peripheral surface is moved downward as a whole and then it returns to the state shown by the solid line. That is, 360-degree-cycle deflection is generated.

In such a rotation by the flanges, in the same manner as the aforementioned bent tube, the line passing the center of the internal peripheral circle at the vicinity of one end portion of the tubular body supported by the flange and the center of the internal peripheral circle at the vicinity of the other end portion of the tubular body supported by the flange constitutes the rotation axis T2. In the uneven thickness tube 102, since the center of the internal peripheral circle and that of the external peripheral circle are misaligned along the entire length of the tube, the rotation axis T1 which is determined based on the internal peripheral surface and the center of the external peripheral circle are misaligned along the entire length of the bent 102. The deflection along the entire length of the uneven thickness tube 102 arises from the misalignment between the rotation axis T2 determined by the internal peripheral circles at the vicinities of both ends of the tube 102 and the center of the external peripheral circle at a cross-section to be observed.

<Flat Tube>

FIG. 8A is a perspective view of a tube 103 with a non-perfect circular cross-section as a defective example of a tubular body, especially a tube with a flat cross-section (hereinafter referred to as "flat tube"). The flat tube denotes a tube not having a perfect circular cross-section but having an elliptic cross-section formed by pressing from up-and-down direction or right-and-left direction. Here, in order to exclude another defective factors, it is assumed that the axis of the tubular body is a straight line, the cross-sectional shape of the internal peripheral circle and that of the exterior peripheral circle are almost similar, the thickness is almost constant, the cross-sectional shape is constant along the entire length with no twist.

In the actual use of such a flat tube 103, as explained with reference to FIG. 4, it cannot be decided how the flanges are set with respect to the tubular body (flat tube), or how the position or the posture of the tubular body (flat tube) 103 is decided with respect to a rotation axis as a center of the flange because they are decided based on the relationship of the degree of flatness or the strength of the tubular body, the size of the flange and the strength of the flange. Here, it is assumed that both the flanges are set to both end portions of the tubular body 103 with the center of the flange aligned with the center of the internal peripheral circle of the flat tube. In this state, when the tubular body (flat tube) 103 is rotated, as shown in FIG. 8A, the flat tube rotates about the straight line T3 passing the center of the internal peripheral circle as an axis, causing deflection along the entire axial length of the flat tube 103. The chain double-dashed line in FIG. 8A shows the state rotated by 90 degrees from the state shown by the solid line.

FIG. 8B is a cross-sectional view of the flat tube 103, and the chain double-dashed line shows the external peripheral surface (external peripheral circle) in the state rotated by 90 degrees from the state shown by the solid line.

As shown in this figure, although the tubular body 103 is taking a vertical posture in the state shown by the solid line, it will take a horizontal posture as shown by the chain double-dashed line when further rotated by 90 degrees, and then returns to the original posture shown by the solid line when further rotated by 90 degrees. As will be understood from the above, inward and outward displacements of the external peripheral surface will be repeated, causing 180-degree-cycle deflection.

As mentioned above, it is assumed that the rotation axis T3 of this flat tube 103 passes the centers of the internal peripheral surfaces of both ends of the tubular body (flat tube) 103. Furthermore, in this example assuming that the cross-section is constant along the entire length of the tube, the rotational axis T3 passes the center of the external peripheral circle (not perfect circle) at any cross-section. Therefore, the deflection along the entire length of the flat tube 103 arises from the fact that the external peripheral circle in each cross-section of the tubular body 103 is shifted from the perfect circle. FIG. 8C will be detailed later.

(Measuring Examples)

Next, the measurement of the shape of the aforementioned defective tube as an object to be measured will be explained with reference to FIG. 9. FIG. 9 shows graphs each showing the result of the displacement of the external peripheral surface of a tubular body (work) 10 as an object detected while rotating the tubular body 10. In FIG. 9, the horizontal axis denotes a rotation angle of the tubular body (work), and the vertical axis denotes the detected value of the radial displacement of the external peripheral surface of the tubular body 10 to be detected by the displacement detecting devices 30.

<Measurement of Perfect Tube>

When a shape of a perfect cylindrical tubular body 10 with no bent, no uneven thickness, no cross-sectional distortion is measured based on the measurement principle shown in FIGS. 1 to 3, as explained above, the external peripheral surface of the tubular body 10 does not change at all. Therefore, there will be no change in displacement to be detected by each of the five displacement detecting devices 30 as shown in FIG. 9A.

<Measurement of Bent Tube>

In the bent tube 101 shown in FIG. 6A, since it is assumed that the internal peripheral surface is perfect circular, even if the tubular body 10 is rotated in a state in which the pair of reference portions 20 and 20 are in contact with the internal peripheral surface of the bent tube 20 and 20, the internal peripheral surface of the tubular body in contact with the pair of reference portion 20 and 20 does not fluctuate. Accordingly, in this measurement for the bent tube 101, the tube rotates in the same manner as in the case in which the tubular body is rotated with the flanges inserted into both ends of the tubular body as shown in FIG. 6A. Here, the misalignment of the rotation center position assumed in FIG. 6 is neglected.

Figure 9A:
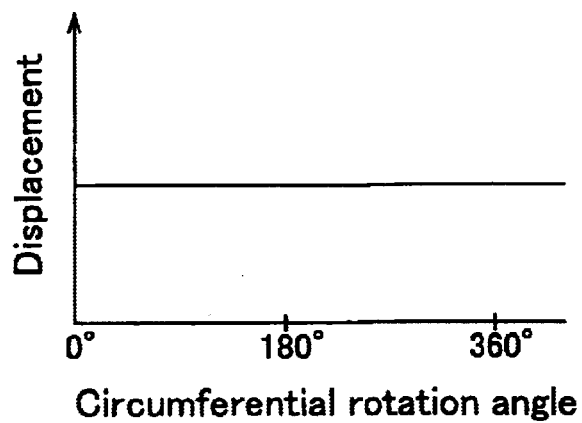
FIGS. 9A, 9B and 9C are graphs showing examples of results of displacement of the external peripheral surface of the tubular body (work) 10 to be measured detected while rotating the tubular body (work).

At this time, as will be apparent from FIG. 6A, at the detecting positions 31 and 31 near both ends of the tubular body 101 facing off against the pair of reference portions, no displacement will be detected as shown in FIG. 9A. This is apparent because of the facts that at the detecting positions 31 and 31 facing the reference portions 20 and 20 the thickness of the tubular body 101 at these positions 31 and 31 are to be detected and that in the bent tube 101 shown in FIG. 6 it is assumed that the thickness is constant.

Figure 9B:
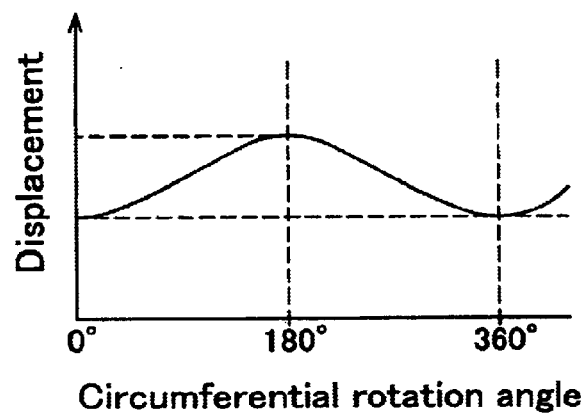

To the contrary, at the positions 32 other than the positions 31 and 31 facing off against the reference portions 20 and 20, as shown in the arrows under the tubular body 101 in FIG. 6B, the external peripheral surface of the tubular body 101 is displaced in the radial direction thereof and the cycle is 360 degrees. Therefore, the deflection of the external peripheral surface as shown in FIG. 9B will be detected. That is, according to this method for measuring a shape of a tubular body, the deflection of the external peripheral surface caused by the bent of the tubular body 101 can be detected.

Furthermore, at the central position among the three central displacement detecting positions 32 of the tubular body 101, maximum deflection can be detected. The comparison of the deflection of each detecting position 32 enables to figure the fact that the defects of the tubular body 101 are caused by the bent and to figure the degree of the bent.

The deflection of the bent tube 101 shown in FIG. 6 can also be detected by the previously mentioned conventional method (see FIGS. 56 and 57) for detecting deflection of an external peripheral surface with reference to the external peripheral surface as a reference.

<Measurement of Uneven Thickness Tube>

In the uneven thickness tube 102 shown in FIG. 7, since it is assumed that the internal peripheral surface is perfectly circular, even if the tubular body 102 is rotated in a state in which the pair of reference portions 20 and 20 are in contact with the internal peripheral surface of the uneven thickness tube 102 and 102, the internal peripheral surface of the tubular body in contact with the pair of reference portion 20 and 20 would not fluctuate. Accordingly, in this measurement for the unevenness thickness tube 102, the tube rotates in the same manner as in the case in which the tubular body is rotated with the flanges inserted into both ends of the tubular body as shown in FIG. 7A. Here, the misalignment of the rotation center position assumed in FIG. 5 is neglected.

At this time, at all of the detecting positions, i.e., the detecting positions 31 and 31 at the vicinities of both ends of the tubular body 102 facing off against the pair of reference portions 20 and 20 and the detecting positions 32 other than the above detecting positions 31 and 31, as shown by the arrow under the tubular body 102 in FIG. 7B, the external peripheral surface of the tubular body 102 is displaced in the radial direction, and the cycle is 360 degrees. Therefore, according to this method for measuring a shape of a tubular body, deflection of the external peripheral surface due to the unevenness thickness of the tubular body 102 can be detected.

Especially, at the detecting positions 31 and 31 facing off against the reference portions 20 and 20, the thickness of the tubular body 102 is directly detected. Therefore, it is possible to obtain the thickness distribution in the circumferential direction of the tubular body 102 from the deflection detected at the positions 31 and 31.

Furthermore, although a tubular body generally includes defect factors such as bent or unevenness in a complex manner, according to this method for measuring a shape of a tubular body, a result reflecting these influences can be obtained by one measurement.

Furthermore, if it is assumed that the uneven thickness is almost the same along the entire length of the tubular body, it is possible to assume that the thickness distribution in the circumferential direction of the tubular body which will be proved from the displacement detected at the detecting positions 31 and 31 facing off against the reference portions of the tubular body 10 is the same along the entire length of the tubular body 10. In this case, although the displacement detected at the detecting positions 32 other than the detecting positions 31 and 31 facing off against the reference portions 20 includes the displacement due to the uneven thickness, it is possible to take out only the defective influences due to causes other than the unevenness by subtracting the displacement detected at the detecting positions 31 and 31. By this, regarding a tubular body having defective factors of bent and uneven thickness in a complex manner, it is possible to obtain the results affected by these influences and to evaluate the respective defective degree by separating the influences due to the defectives from the results.

Such assumption that such uneven thickness is almost the same along the entire length of the tubular body can be made, in most case, based on the characteristics and the like of the manufacturing method of the tubular body. For example, if the tubular body is manufactured by performing a continuous extrusion and then cutting the extruded member into a predetermined length, there are many cases capable of assuming that the cross-sectional shape is almost the same along the entire length of each tubular body.

As mentioned above, the deflection of the uneven thickness tube 102 as shown in FIG. 7 cannot be detected by a conventional method (see FIGS. 56 and 57) for measuring deflection of the external peripheral surface with respect to the external peripheral surface as a reference.

<Measurement of Flat Tube>

In the measurement of the flat tube 103 shown in FIG. 8, when the tubular body 103 is rotated in a state in which the pair of reference portions 20 and 20 is in contact with the internal peripheral surface of the tubular body (flat tube) 103, the tubular body (flat tube) 103 moves up and down in appearance as shown in FIG. 8C.

In the measuring method shown in FIGS. 1 to 3, the positions facing off against the hypothetical straight line Q passing two contact points where the pair of reference portions 20 and 20 are in contact with the tubular body, i.e., the upper side of the tubular body 103, is the position to detect the displacement. Therefore, as will be apparent from the arrow shown at the lower side of the tubular body 103, no displacement change is detected as shown in FIG. 9A. This is because the tubular body 103 has no bent and the thickness is constant. As a result, in the measuring method shown in FIGS. 1 to 3, it is impossible to detect defects due to a non-circular cross-section such as a flat cross-section.

The deflection of the flat tube as shown in FIG. 8 cannot be detected by a conventional method (see FIGS. 56 and 57) for measuring deflection of the external peripheral surface with respect to the external peripheral surface as a reference.

(Principle of Further Advanced Method for Measuring a Shape)

Next, as for a further advanced method for measuring a shape of a tubular body according to the present invention, which is capable of detecting defects due to the fact that the cross-sectional shape is a non-circular shape like the flat tube 103, the principle will be explained with reference to schematic explanatory drawings.

Figure 10:
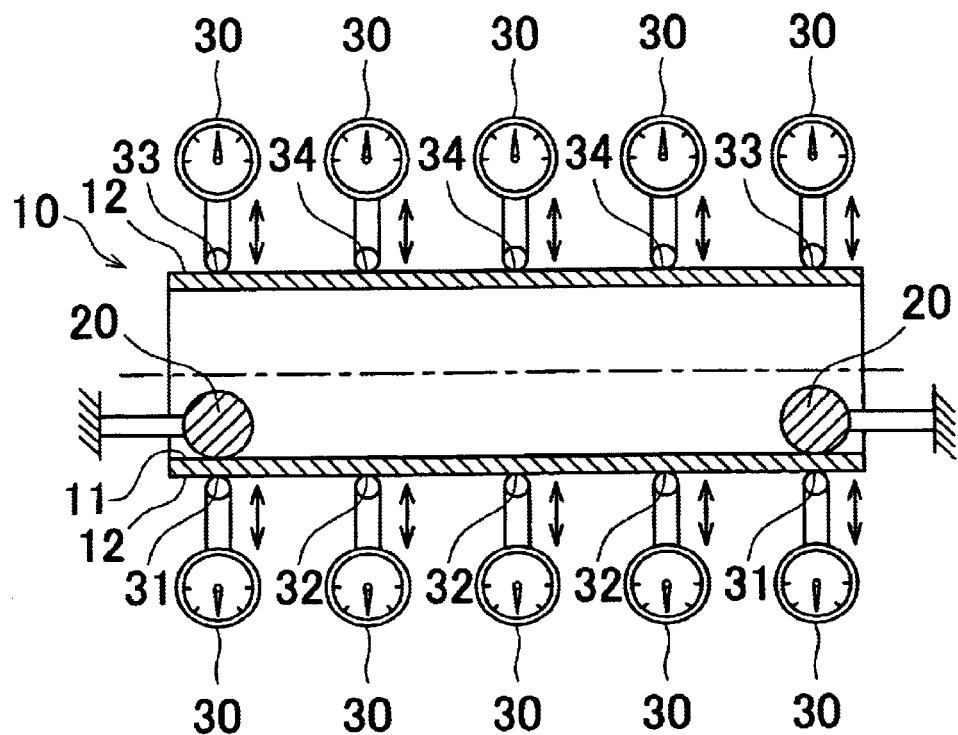
FIG. 10 is a front cross-sectional view showing the principle of an advanced method for measuring a shape of a tubular body according to the present invention.
Figure 11:
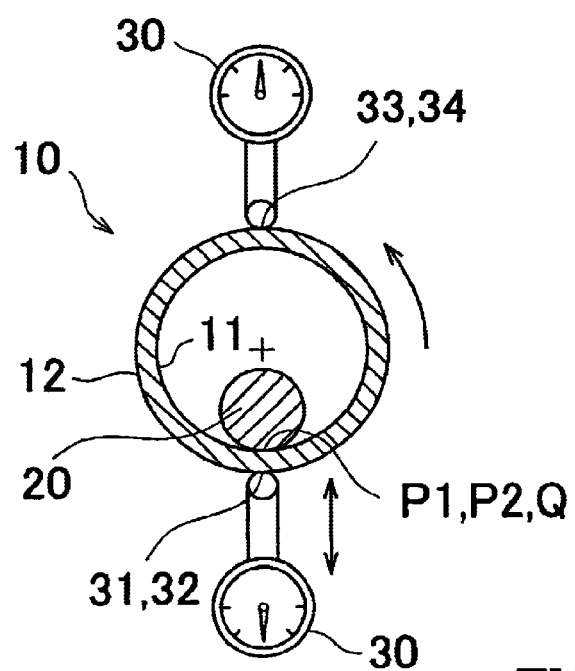
FIG. 11 is a side cross-sectional view of the tube.

FIG. 10 is a front cross-sectional view showing the principle of the measuring method according to the present invention, and FIG. 11 is the side cross-sectional view thereof.

In the aforementioned method for measuring a shape of a tubular body according to the present invention shown in FIGS. 1 to 3 (hereinafter referred to as "basic method"), the five displacement detecting devices 30 are arranged at the positions facing off against the hypothetical straight line Q passing two contact portions P1 and P2 where the reference portions 20 and 20 are in contact with the internal peripheral surface of the tubular body contact from the outside of the tubular body 10. Especially, two positions 31 and 31 among the aforementioned contact positions are located at the positions facing off against the pair of reference portions 20 and 20.

In a further advanced method for measuring a shape of a tubular body according to the present invention, as shown in FIGS. 10 and 11, in addition to the five displacement detecting devices 30 in the aforementioned basic method, newly added five displacement detecting devices 30 are arranged.

These newly arranged five detecting devices 30 are arranged such that these axial positions coincide with the deflection detecting positions 31 and 32 in the basic method and that the circumferential positions are positions 33 and 34 shifted by a half circumference length from the deflection detecting positions 31 and 32 in the basic method. In other words, new displacement detecting devices 30 are arranged so as to be arranged at detecting positions which are reversed phase positions (positions shifted by 180 degrees in phase) in the circumferential direction of the tubular body 10 with respect to the detecting positions 31 and 32 in the basic method.

Like this, if the radial displacements of the external peripheral surface are detected from both sides of the tubular body 10 at each axial position, the diameter of the external peripheral surface (external circle) of the tubular body 10 at each axial position can be obtained. Concretely, the diameter displacement of the tubular body 10 in each circumferential position can be obtained by finding the differences between the displacements detected at two detecting positions of the opposite sides of the tubular body 10 at each rotational angle along the circumferential direction while rotating the tubular body 10.

By this, at each cross-section in the axial direction of the tubular body 10 to which the detecting positions are set, it becomes possible to grasp the external peripheral shape (external shape) of the tubular body 10.

Especially, the displacement to be detected at the detecting positions 31 and 31 facing off against the pair of reference portions 20 and 20 shows the thickness of the tubular body 10 as mentioned above. Therefore, by the detecting positions 31 and 31 and the opposed reversed phase detecting positions 33 and 33, it becomes possible to detect how the thickness and the diameter of the tubular body 10 in the cross-section change in the circumferential direction. Accordingly, in this cross-section, it is possible to grasp the cross-sectional shape.

Furthermore, each of these detecting positions 33 and 34 correspond to the position C shown in FIG. 5. This position C is a portion receiving the least influence of the detection amount with respect to the displacement of the central position of the tubular body 10 next to the detecting position A when the central position is displaced with the internal peripheral surface of the tubular body 10 contacting the reference portions 20 and 20 during the shape measurement of the tubular body 10 (during the rotation). Therefore, even if the tubular body 10 is shifted during the shape measurement, the detected value of the displacement in the detecting positions 33 and 34 hardly receives the influence, resulting in stable shape measurement.

<Measurement of Flat Tube>

In the case of performing a shape measurement of a flat tube shown in FIG. 8 by the aforementioned advanced method, as mentioned above, at the detecting positions 31 and 31 facing off against the reference portions 20 and 20 and the detecting positions 32 (the detecting positions at the lower side of the tubular body 103 in FIG. 8C) located at the same circumferential position as the detecting positions 31 and 31, no displacement is only detected as shown in FIG. 9A.

Figure 9C:
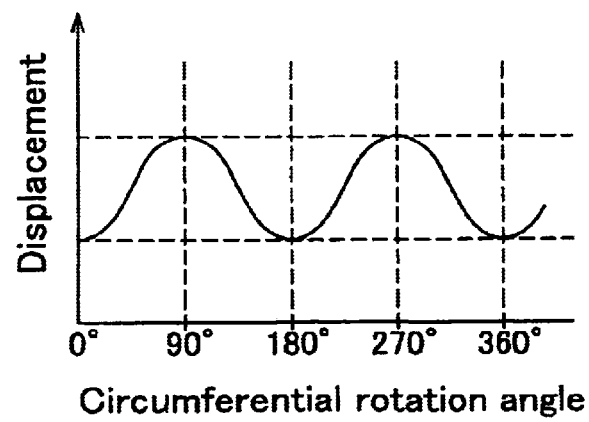

To the contrary, at the detecting positions 31 and 32 and the reversed phase detecting positions 33 and 34, as shown by the arrow above the upper side of the tubular body 103 in FIG. 8C, the external peripheral surface of the tubular body 103 is displaced in a radial direction. Since the cycle of this displacement is 180 degrees, the deflection of the external peripheral surface 12 as shown in FIG. 9C is detected at these detecting positions 33 and 34. That is, according to the second method for measuring a shape of a tubular body, it is also possible to detect defects due to the fact that the cross-section of the tubular body is non-circular.

Furthermore, from the changing status of the displacement to be detected (the shape of the graph in FIG. 9C), it is also possible to guess the cross-sectional shape of the measured tubular body 103.

Furthermore, although this advanced method can detect the defects such as bent or uneven thickness of the tubular body in the same manner as in the first method, results reflecting the defects due to the non-circular cross-sectional shape and the influences of the defects can be obtained.

Furthermore, by considering the typical detection pattern of each defect, it is possible to discriminate the degree, size or contents (cross-sectional shape in the case of non-circular cross-section) of each defect. This can contribute to countermeasures for solving each defect.

Figure 56:
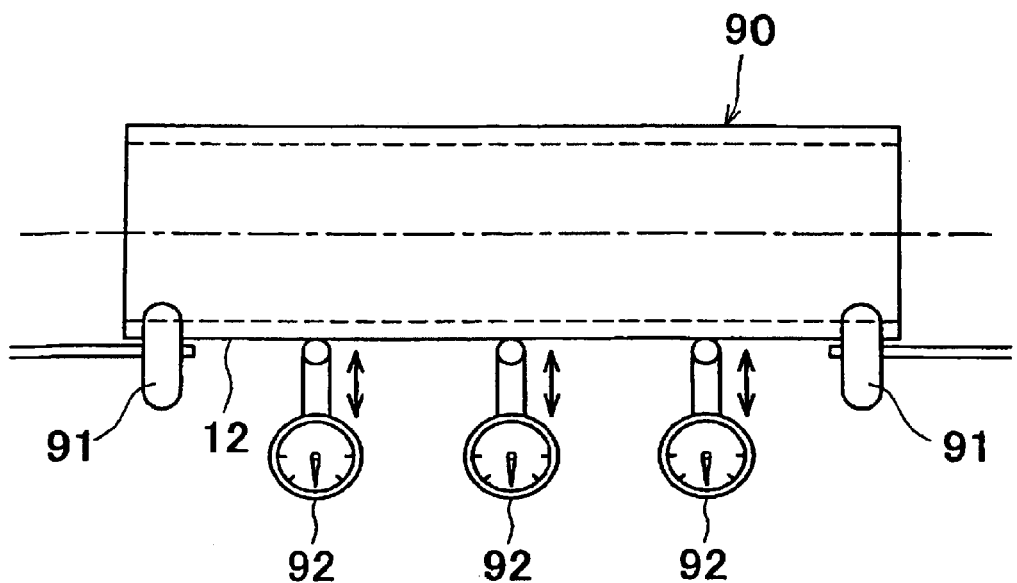
FIG. 56 is an explanatory view showing the principle of a conventional method for measuring a shape of a tubular body.
Figure 57:
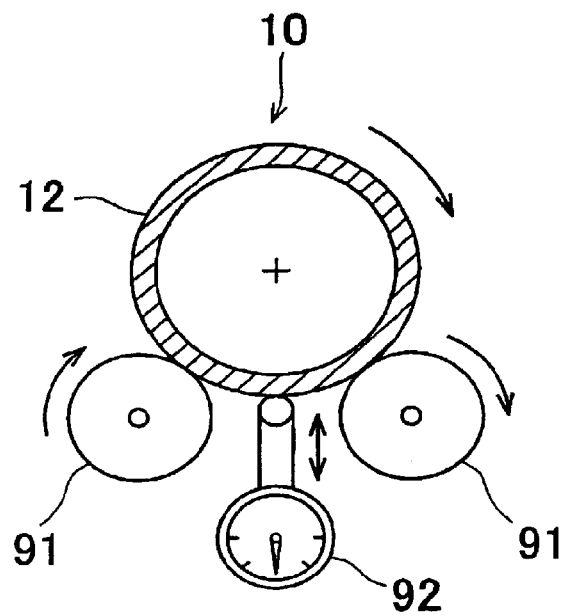
FIG. 57 is an explanatory view showing the principle of a conventional method for measuring a shape of a tubular body.

In both the basic method shown in FIGS. 1 to 3 and the advanced method shown in FIGS. 10 and 11, it is possible to obtain the deflection corresponding to the conventional deflection of the external peripheral surface with reference to the external peripheral surface as a reference as shown in FIGS. 56 and 57. In detail, from the ratio of distance between the two detecting positions 31 and 31 facing off against the reference portions 20 and 20 and another detecting positions 32 arranged at the axial central portion of the tubular body 10, the displacement that the displacement detected at two detecting positions 31 and 31 gives to another detecting positions 32 is found. Thus obtained displacement is subtracted from the actually detected displacement. Thus calculated displacement of another detecting positions 32 becomes the displacement measured with reference to the two detecting positions 31 and 31 as references.

[Embodiment 1]

Hereinafter, as a first embodiment of an apparatus for measuring a shape of a tubular body which conducts a shape measurement of a tubular body based on the aforementioned principle, a manual type shape measuring apparatus 4 in which a tubular body (work) 10 is rotated by a measuring operator with his/her hand will be explained.

Figure 12:
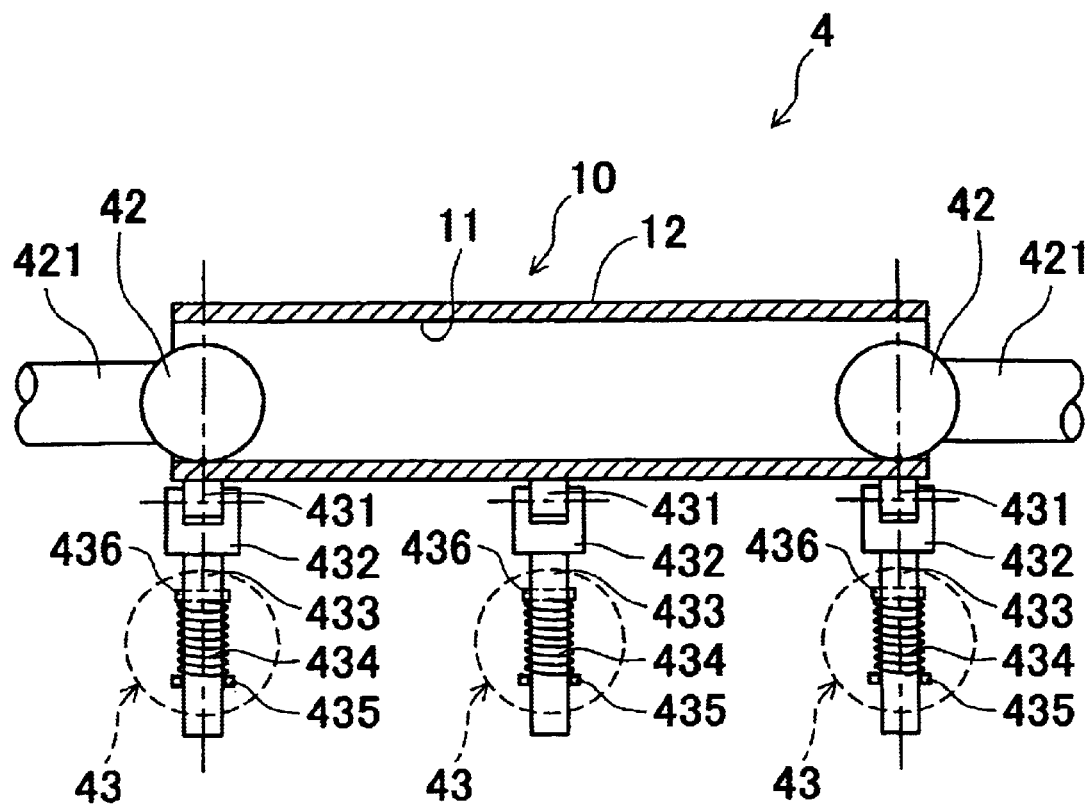
FIG. 12 is a plan cross-sectional view of this manual type shape measuring apparatus 4.
Figure 13:
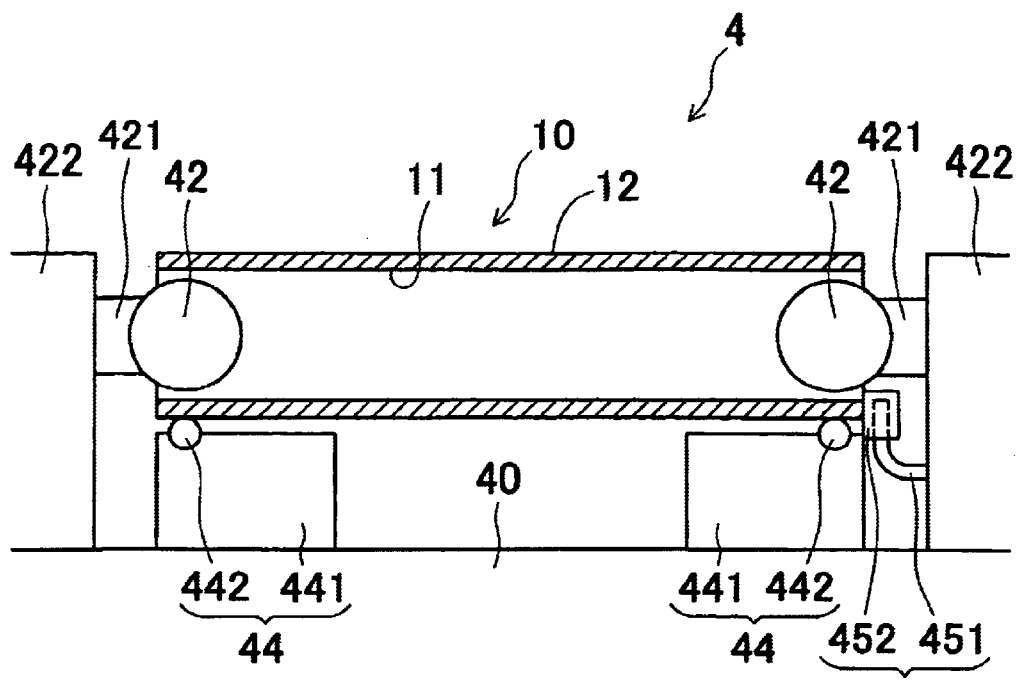
FIG. 13 is a front cross-sectional view of this apparatus 4.
Figure 14:
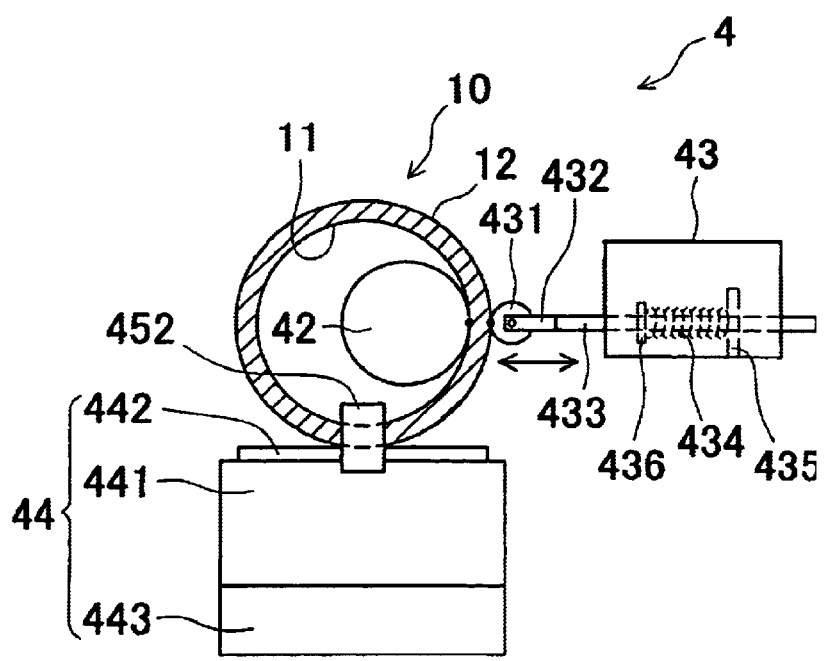
FIG. 14 is a side cross-sectional view of this apparatus 4.
Figure 15:
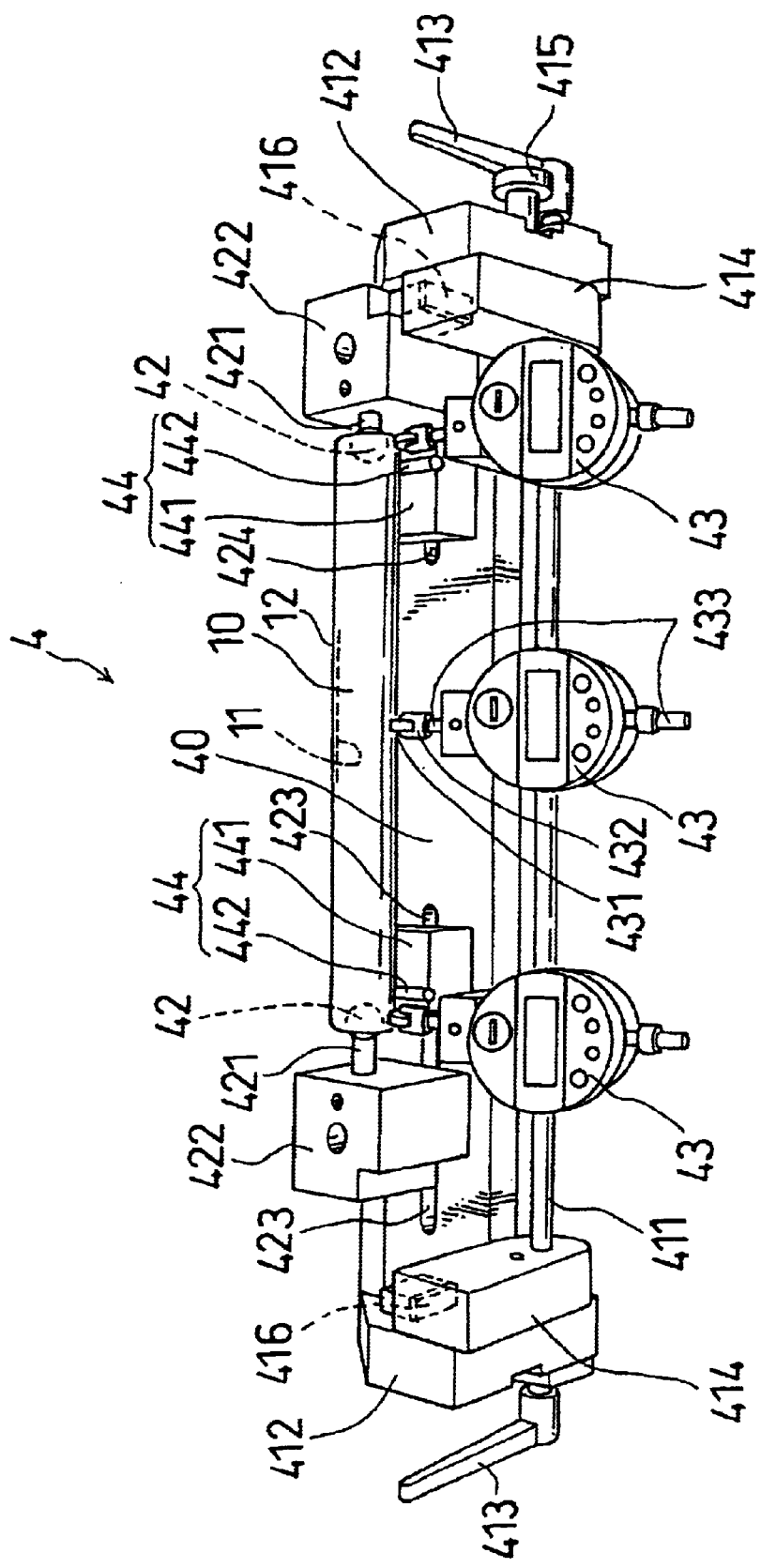
FIG. 15 is a schematic perspective view of this apparatus 4.

FIG. 12 is a plan cross-sectional view of the manual type shape measuring apparatus 4. FIG. 13 is a front cross-sectional view of the apparatus. FIG. 14 is a side cross-sectional view of the apparatus. FIG. 15 is a schematic perspective view of the apparatus. FIG. 16 is an explanatory view of the setting procedure of a tubular body (work) in the apparatus 4.

This shape measuring apparatus 4 is provided with a pair of reference portions 42 and 42 which come into contact with the internal peripheral surface 11 of the tubular body 10 to become shape measuring references, pedestal portions 44 which support the tubular body 10 from the lower side thereof to stabilize the height position of the tubular body 10, a stopper 45 which comes into contact with one side end of the tubular body 10 to stabilize the axial position of the tubular body 10, deflection detecting devices 43 which come into contact with the external peripheral surface 12 of the tubular body 10 to detect the radial displacement of the external peripheral surface of the tubular body 10, and a main base 40 to which these parts are attached.

<Pair of Reference Portions>

As shown in FIG. 14, etc., the pair of reference portions 42 and 42 each comes into contact with a side position of the internal peripheral surface 11 at the vicinity of each end portion of the tubular body 10 disposed horizontally or approximately horizontally, wherein the side portion corresponds to approximately the central positions in the height direction of the tubular body 10, and serves as a reference of the shape measurement.

The pair of reference portion 42 and 42 are each constituted by a synthetic resin spherical body capable of being smoothly slid on the internal peripheral surface 11 of the tubular body 10 without scratching the internal peripheral surface 11, and attached to the reference supporting block 422 and 422 via a fixed supporting axis 421 and 421. In this embodiment, the pair of reference portions 42 and 42 do not rotate together with the tubular body 10. Therefore, the portions of the pair of reference portions 42 and 42 which is in contact with the internal peripheral surface 11 of the tubular body 10 do not change even if the tubular body 10 rotates, which causes stabilized measuring reference positions. On the other hand, it is designed such that the pair of reference portions 42 and 42 can be rotated arbitrarily when the contact portion in contact with the internal peripheral surface 11 of the tubular body 10 is abraded. Accordingly, new positions of the pair of reference portions 42 and 42 can be brought into contact with the internal peripheral surface 11 of the tubular body 10 as needed.

Each of the fixed supporting axes 421 and 421 supporting the reference portions 42 and 42 is formed to have a cross-section smaller than that of the reference portion 42 and constituted by, for example, a metal bar having a length longer than the insertion length of the reference portion 42 inserted into the tubular body 10. This enables the setting of the tubular body (work) 10.

Each of the reference supporting block 422 and 422 is constituted by, for example, a metal block fixed on the upper surface of the main base 40 with bolts or the like. At a portion of the main base 40 to which one of the reference supporting block 422 and 422 is mounted, an elongated hole 423 of a certain length extending along the longitudinal direction (axial direction) of the tubular body 10 is formed. By a bolt passing through this elongated hole 423, one of the reference supporting blocks 422 is fixed. Thus, the distance between the pair of reference supporting blocks 422 and 422 can be changed such that one of the reference supporting blocks 422 can be moved among a plurality of positions arranged in the axial direction of the tubular body 10 and can be fixed at any one of the positions. This enables a shape measurement in accordance with various tubular bodies 10 with different size. Furthermore, it is possible to set the contact position of the reference portion 42 at any one of various axial positions of the tubular body 10. However, the structure enabling the movement of the reference portion 42 and 42 does not aim to move the reference supporting block 422 and 422 during a shape measuring of a tubular body 10.

Furthermore, although the bolt hole for fixing the other reference supporting block 422 is also an elongated hole 424, this elongated hole 424 is used to move the pedestal portion 44 which will be explained later, and therefore it is not necessary to move the other reference supporting block 422.

Since the reference portions 42 and 42, the fixed supporting axes 421 and 421 and the reference supporting blocks 422 and 422 each serve as a reference for a shape measurement of a tubular body 10, it is constituted such that they have sufficient rigidity depending on the requested measurement accuracy.

<Pedestal Portion>

As shown in, for example, FIGS. 13 and 14, the pedestal portion 44 supports the tubular body 10 from the lower side such that the side portion (internal peripheral side surface) of the internal peripheral surface 11 at the altitudinal middle position of the tubular body 10 is set to be approximately the same height as the pair of reference portions 42 and 42 and that the internal peripheral side surface of the tubular body 10 and the pair of reference portions 42 and 42 make contacts, to thereby stabilize the height position of the tubular body 10.

The pedestal portion 44 is disposed at each end of the tubular body 10 so as to support the vicinities of both end portions of the tubular body 10. Therefore, the tubular body 10 is stably supported so that the axial direction is kept approximately horizontal. These two pedestal portions 44 and 44 include a pair of pedestal blocks 441 each fixed at the inside of the reference supporting blocks 422 and 422 with bolts or the like and contact members (contacting portions) 442 and 442 each provided on the upper surface of the pedestal block 441 and 441.

The pedestal blocks 441 and 441 are movably fixed on the main base 40 with bolts passing through the elongate holes 423 and 424 formed in the main base so that the fixing position of the pedestal blocks can be changed in the same manner as the reference supporting blocks 422 and 422. Thus, in the same manner as the reference supporting blocks 422 and 422, various tubular bodies 10 with different lengths can be supported at an appropriate axial position in a state in which the height position is stabilized, thereby enabling accurate shape measurement.

Furthermore, the pedestal block 441 is fixed to the main base 40 via one or plural height adjusting plates 443 so as to adjust the height. This enables a stable support of any tubular bodies with different cross-sectional sizes (diameters) at an appropriate height position.

The contact member (contact portion) 442 is a round bar made of materials such as hard synthetic resin with smaller frictional coefficient against the external peripheral surface of the tubular body 10. Therefore, when the tubular body 10 rotates in a state in which the external peripheral surface 12 is in contact with the pedestal portions 44 and 44, the tubular body 10 can rotate smoothly without causing fluttering vibrations, enabling accurate shape measurement. As the material of the contact members 442, any material whose friction coefficient against the external peripheral surface of the tubular body is low can be preferably used. For example, other than the aforementioned hard synthetic resin, metallic material having a flat surface can be exemplified.

The contact member 442 is fitted in an approximately horizontal groove perpendicular to the axial direction of the tubular body 10 formed on the upper surface of the pedestal block 441 so that the upper surface is leveled approximately. As a result, even if the contact position against the tubular body 10 is slightly shifted, the height of the tubular body 10 can be stably held, resulting in accurate shape measurement.

Each contact member 442 is disposed at a position which coincides with the reference portion 42 in axial directional position of the tubular body 10. Therefore, the height position of the tubular body 10 can be stabilized at the axial directional positions wherein the tubular body 10 comes into contact with the pair of reference portions 42 and 42, enabling accurate shape measurement with the reference position for the shape measurement stabilized.

<Stopper>

As shown in, for example, FIG. 13, the stopper 45 stabilizes the axial position of the tubular body 10 by coming into contact with one of the end faces of the tubular body 10, thereby bringing the pair of reference portions 42 and 42 into contact with appropriate axial positions of the tubular body 10. Furthermore, the stopper 45 stabilizes the contact positions of the displacement detecting devices 43 and the tubular body 10 at appropriate axial positions.

This stopper 45 is constituted by a stopper fixing shaft 451 attached to the inside surface of the reference supporting block 422 which is not moved in the axial direction of the tubular body 10 and a stopper body 452 attached to the tip end of the stopper fixing shaft 451.

The stopper fixing shaft 451 is formed as a metallic component extended from the inside surface of the reference supporting block 422 approximately horizontally and then bent upward.

The stopper body 452 is formed as a short column having a circular horizontal cross-section made of synthetic resin or the like with low friction coefficient, and comes into contact with one end face of the tubular body 10 to thereby stabilize the axial position of the tubular body 10 to be rotated during the shape measurement.

<Displacement Detecting Device>

The displacement detecting device 43 is brought into contact with the external peripheral surface 12 of the tubular body 10 to detect the radial displacement of the external peripheral surface. In this embodiment, contact type displacement detecting devices are arranged at three positions different in axial position of the tubular body 10. Among three displacement detecting devices 43, two side detecting devices are disposed at positions facing off against the pair of reference portions 42 and 42 and positions where the radial direction of the tubular body 10 coincides with a horizontal direction. The remaining one is disposed at the axial central position of the tubular body 10 in parallel with the aforementioned two detecting devices.

The displacement detecting device 43 is provided with a contact roller (contact portion) 431 which comes into rolling contact with the external peripheral surface of the tubular body 10, a support bracket 432 to rotatably support the contact roller 431 and a movable shaft 433 with one end to which the support bracket 432 is attached. By detecting the displacement of the movable shaft 433 in the in-and-out direction, or the displacement of the contact roller (contact portion) 431, the displacement of the external peripheral surface of the tubular body 10 can be detected. Since the displacement detecting device 43 detects the displacement while making contact with the external peripheral surface 12, the detection can be performed assuredly. Furthermore, since the contact roller 431 comes into rolling contact with the external peripheral surface 12 of the tubular body 10, it is possible to minimize damages such as scratches on the external peripheral surface 12 of the tubular body 10.

The contact roller (contact portion) 431 is formed into a cylindrical shape, and the external surface thereof comes into line contact with the external peripheral surface 12 of the tubular body 10. Thus, the pressure acting on the external peripheral surface 10 of the tubular body 10 is dispersed, which prevents damages to the external peripheral surface 12 of the tubular body 10. Furthermore, both edges of the contact roller 431 are cut. This also prevents damages to the external peripheral surface 12 of the tubular body 10.

Furthermore, each displacement detecting device 43 is equipped with an urging means 434 for urging the movable shaft 433 toward the tubular body 10 to thereby press the external peripheral surface 12 of the tubular body 10 on the pair of reference portions 42 and 42 via the contact roller 431. This urging means 434 is constituted by a spring or the like with one end fixed to the fixed portion 435 in the displacement detecting device 43 and the other end attached to the movable shaft 433 so as to urge the protrusion 436 formed on the movable shaft 433. In other words, this displacement detecting device 43 is provided with the urging means 434 so as to serve as a pressing portion. Since the tubular body 10 is pressed from the outside thereof by the displacement detecting device (pressing portion) 43 against the pair of reference portion 42 and 42, the internal peripheral surface 11 of the tubular body 10 assuredly comes into contact with the pair of reference portions 42 and 42. Therefore, accurate shape measurement can be performed.

Furthermore, since the displacement detecting devices 43 functions as pressing portions, the number of contact portions between the tubular body 10 as an object to be measured and the shape measuring apparatus 4 can be decreased as small as possible as compared with the structure having separate pressing portions. Thus, external turbulence factors can be eliminated to thereby contribute to accurate shape measurement. Furthermore, this decreases the number of parts of the shape measuring apparatus 4 to thereby contribute to cost reduction.

Furthermore, since the displacement detecting devices 43, which also functions as pressing portions, are disposed at the positions facing off against the pair of reference portions 42 and 42 and the axial central position of the tubular body 10, the tubular body 10 can be brought into contact with the pair of reference portions 42 and 42 in a stable manner. In addition, since the displacement detecting devices 43 are disposed symmetrically about the axial center of the tubular body 10 (in FIG. 12, monosymmetric), the tubular body 10 can be stably brought into contact with the pair of reference portions in a well-balanced manner.

These displacement detecting devices 43 are mounted on the detecting device mounting shaft 411 parallel to the axial direction of the tubular body 10 so as not to be rotated. Both end portions of this detecting device mounting shaft 411 rotatably penetrate a pair of main body side walls 412 and 412 fixed at opposite ends of the main base 40, and are provided with rotation operation handle 413 and 413.

To the portions of the detecting device mounting shaft 411 disposed immediately inside the main body side walls 412 and 412, a pair of rotation blocks 414 and 414 is attached so as not to be rotated with respect to the detecting device mounting shaft 411. Each rotation block 414 is structured such that the rotational position can be fixed by inserting a boss (not shown) inwardly protruded from the main body side wall 412 with the plunger handle 415. The rotational position to be fixed at this time is set to take a disengaging position where the contact rollers 431 of the displacement detecting device 43 are detached from the tubular body 10. As a result, it becomes possible to easily disengage the contact rollers 431 from the tubular body 10 and set the tubular body 10 to this apparatus.

Furthermore, at the inner upper portions of the main body side walls 412, a magnet 416 is mounted to fix the rotational position of the rotation block 414 respectively. The rotational position to be fixed at this time is a position for performing a shape measurement of the tubular body 10 (displacement measuring position) in which the detecting device mounting shaft 411 is rotated with the rotation operation handle 413, and the contact roller 431 is pressed against the external peripheral surface 12 of the tubular body 10. In this state, the shape measurement of the tubular body 10 can be performed in a stable manner.

The detecting device mounting shaft 411, the pair of main body side walls 412 and 412, the rotation operation handles 413 and 413, the rotation blocks 414 and 414, the plunge handle 415 and the magnets 416 and 416 constitute a cooperative mechanism that cooperatively moves the plural displacement detecting devices 43 between the displacement measuring position and the disengaged position.

Furthermore, each displacement detecting device 43 . . . is mounted on the detecting device mounting axis 411 in such a manner that the axial position can be changed and fixed at each position, so that it is possible to cope with various tubular body 10 with different lengths. Furthermore, it is possible to measure the deflection of the external peripheral surface 12 of the tubular body 10 with the limited number (three (3) in this embodiment) of displacement detecting devices 43 at larger number of positions than the limited number of positions.

<Setting of Tubular Body>

Figure 16A:
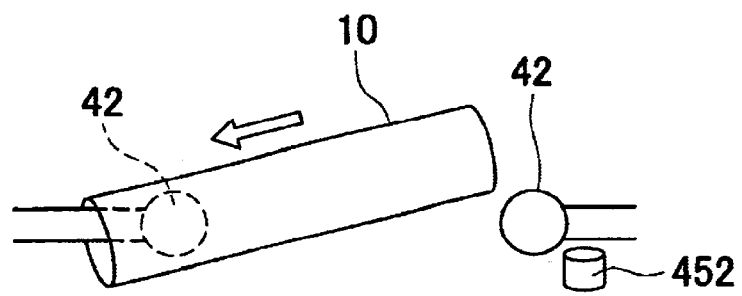
FIGS. 16A, 16B and 16C are explanatory views of the setting procedures of a tubular body (work) in the apparatus 4.

The setting of the tubular body (work) to the shape measuring apparatus is performed by inserting one end of the tubular body with respect to one of the reference portions (see FIG. 16A). At this state, since the reference portions 42 and 42 are supported from the outside by the fixed supporting axis 421 and 421 and each of these fixed supporting axes 421 and 421 has a length longer than the insertion depth of the pair of reference portions 42 and 42 inserted in the tubular body 10, from the end face of the tubular body 10, the one end portion of the tubular body 10 can be deeply inserted with respect to the one reference portion 42 such that the other end portion of the tubular body 10 (right side end portion in FIG. 16A) reaches the inside of the other reference portion 42.

Figure 16B:
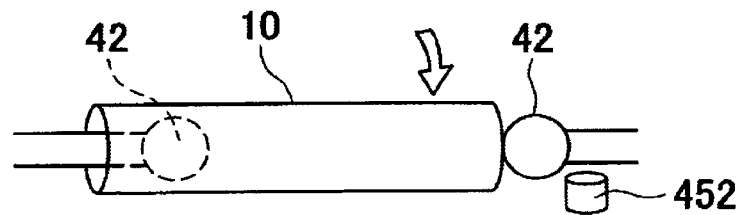
Figure 16C:
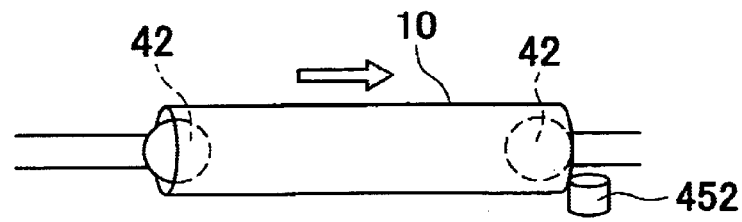

From this state, the other end portion of the tubular body 10 is lowered so as to locate the pair of reference portions 42 and 42 inside the tubular body 10 as seen from the axial direction (see FIG. 16B). Thereafter, the tubular body 10 is horizontally slid so as to insert the other reference portion 42 into the other end portion of the tubular body 10 until the tubular body 10 comes into contact with the stopper body 452 to complete the setting.

As explained, in setting the tubular body 10, it is not required to move the pair of reference portions 42 and 42 at all. This easily stabilizes the positions of the pair of reference portions 42 and 42, contributing to accurate shape measurement.

Furthermore, since the stopper 45 which comes into contact with the one side face of the tubular body 10 is provided, the tubular body 10 can be easily set to an appropriate axial position by simply sliding the tubular body 10 until the other side face of the tubular body 10 comes into contact with the stopper body 452.

Once the tubular body 10 is set, the displacement detecting devices 43 are set to be rotatably movable by operating the plunger handle 415, and then the contact rollers 431 of the displacement detecting devices 43 are pressed against the external peripheral surface 12 of the tubular body 10 by operating the rotation operation handle 413.

Then, while keeping the contact state in which the contact rollers 431 are in contact with the external peripheral surface 12 of the tubular body 10, an operator grasps the external peripheral surface 12 of the tubular body 10 to rotate the tubular body 10. The rotation operation of this tubular body 10 is performed by making at least one rotation or more, preferably three rotations to eliminate measurement errors.

By detecting the radial displacement of the external peripheral surface 12 of the tubular body 10 in accordance with the rotation of the tubular body 10, the deflection of the external peripheral surface with respect to the internal peripheral surface of the tubular body 10 as a reference can be detected.

It is preferable to continuously perform the detection of the displacement by the displacement detecting device 43 while rotating the tubular body 10. In this case, the displacement detecting device 43 can be provided with a function of storing the maximum value of the displacement from the value (reset value when reset) of the displacement at the time of initiating the rotation of the tubular body 10 while updating, a function of storing the maximum value and the minimum value of the displacement while updating, or a function of continuously storing the displacement.

On the other hand, the detection of the displacement by the displacement detecting devices 43 can be performed at several rotation angle positions along the circumferential direction with the rotation of the tubular body 10 stopped. In this case too, if the detection of the displacement is performed at plural positions along the entire peripheral surface, rough deflection of the displacement can be obtained.

<Functions and Results>

In the shape measuring apparatus 4 constituted as mentioned above, functions and results of the shape measuring method shown in the aforementioned FIGS. 1 to 3 can be secured.

Especially, in the shape measuring apparatus 4 shown in FIGS. 12 to 16, since the displacement detecting devices 43 urge to press the tubular body 10 against the pair of reference portions 42 and 42, it is easy to maintain a stable contact state in which the pair of reference portions 42 and 42 are in contact with the internal peripheral surface 11 of the tubular body 10.

Especially, since the tubular body 10 is supported by the pedestal portion 44 in the direction of the height and therefore the height position is stable, a measuring operator can secure an appropriate measuring environment by rotating the tubular body 10 on the pedestal portion 44 in a slidable manner while maintaining the pinched state in which the tubular body 10 is pinched by and between the pair of reference portions 42 and 42 and the displacement detecting devices 43.

Furthermore, since the up-and-down direction that the tubular body 10 is supported by the pedestal portions 44 and 44 and the horizontal direction that the pair of reference portions contacts and the displacement is detected by the displacement detecting devices 43 cross each other perpendicularly, the moving of the rotational center of the tubular body 10 in the up-and-down direction exerts the least influence to the radial displacement of the external peripheral surface 12 at the side of the tubular body 10. For example, as shown in FIG. 5, even if the center of the tubular body 10 is displaced in the B or D direction, the displacement would not affect the radial displacement of the external peripheral surface to be detected at the position A. In the case where the tubular body 10 has a configuration away from a perfect cylindrical shape, when the tubular body 10 is supported from the lower side thereof by the pedestal portions 44 and 44, the central position thereof will be moved in the up-and-down direction. Even if the central position of the tubular body 10 is displaced in the up-and-down direction, this displacements do not affect the radial displacement of the external peripheral surface of the tubular body 10 detected at the side thereof. As a result, stable shape measurement can be achieved, resulting in high reliability of the measured results.

Furthermore, in this shape measuring apparatus 4, since the tubular body (work) 10 is supported from the lower side thereof by the pedestal portions 44 and 44 and there are a space formed at the upper portion of the tubular body 10 and the side portion opposite to the displacement detecting devices 44 and 44 (back side in FIG. 15), the tubular body 10 can be easily set up or taken out form the space. Furthermore, from this space, the tubular body 10 can be easily grasped through the space and rotated. Since the rotating operation can be performed easily regardless of the manual rotation, stable rotation with less displacement can be attained, resulting in high measuring accuracy.

Actually, a plurality of tubular bodies with various displacements were subjected to shape measurement ten times respectively. The maximum data spread of the measured results (measurement deviation) was 4 $\mu$m. This confirms that the shape measuring apparatus is high in reliability as a manual type shape measuring apparatus.

Accordingly, in cases where the allowable range of the deflection of the external peripheral surface with respect to the internal peripheral surface of the tubular body as a standard is 20 $\mu$m or less, considering that the maximum measuring deviation is 4 $\mu$m, the inspection can be performed by selecting the tubular body with measured deflection of 16 $\mu$m or less as a good item. This enables to obtain a group of tubular bodies in which all of them selected as good items fall within the allowable range assuredly.

Furthermore, in this shape measuring apparatus 4, it is possible to set, rotate and remove a tubular body 10 easily. Therefore, in cases where each tubular body 10 is measured by making three rotations, the shape measurement can be completed within thirty seconds or less per one item. Further getting skillful, the shape measurement can be completed within about ten seconds per one item.

<Modified Embodiment>

Although the above explanation was directed to a first embodiment, the present invention is not limited to it and allows the following structure.

(1) In the aforementioned first embodiment, the upper surface of the contact member 442 of the pedestal portion 44 which comes into contact with the external peripheral surface 12 of the tubular body 10 is configured to be horizontal. However, the upper surface of the contact member 442 can be configured to be dented or protruded.

(2) In the aforementioned first embodiment, it is configured such that the pedestal portion 44 supports the tubular body 10 in a state in which the pedestal portion 44 is fixed to a prescribed position without changing the posture. However, the pedestal portion 44 can be constituted by one or a plurality of rollers or the like which come into contact with the external peripheral surface 12 of the tubular body 10 while being rotated.

(3) In the aforementioned first embodiment, although two pedestal portions 44 and 44 are disposed at the vicinities of both ends of the tubular body 10, one or more than three pedestal portions can be employed. Although two contact portions of the pedestal portions are in contact with the tubular body 10 in the first embodiment, one or more than three contact portions can be employed.

(4) In the aforementioned first embodiment, although the pair of reference portions are brought into contact with the positions of the tubular body to be supported when in use, the pair of reference portions can be brought into contact with any positions of the internal peripheral surface of the tubular body. It is preferable that the contact positions are near the positions to be supported since the cross-sectional shape of the position near the position to be supported is likely similar to that of the position to be supported.

(5) In the aforementioned first embodiment, although each of the pair of reference portions 42 and 42 is configured to be a spherical shape, the reference portion can take any shape so long as it is possible to become a reference for measuring a shape of a tubular body 10 by coming into contact with the internal peripheral surface 11 of the tubular body 10.

(6) In the aforementioned first embodiment, although the pair of reference portions 42 and 42 are configured so as not to be rotated together with the tubular body 10, the pair of reference portions can be configured so as to be rotated together with the tubular body 10. In this case, the rotational resistance of the tubular body 10 can be decreased.

(7) In the aforementioned first embodiment, although the pair of reference portions 42 and 42 are set to be predetermined positions by moving the tubular body 10 in the axial direction thereof at the time of setting the tubular body 10 to the shape measuring apparatus 4, it can be configured such that the pair of reference portions are moved in the axial direction of the tubular body 10 so that the tubular body 10 can be set to a predetermined position.

(8) In the aforementioned first embodiment, although the displacement of the external surface of the tubular element is detected only at the position facing off against the hypothetical straight line passing the contact portions of the pair of reference portions and the tubular body, the displacement can be detected at any positions in the circumferential direction of the tubular body.

(9) In the aforementioned first embodiment, although a plurality of detecting positions for the displacement are provided, the detecting position can be at least one.

(10) In the aforementioned first embodiment, although the displacement detecting devices function as pressing portions, or the displacement detecting devices are also used as pressing portions, pressing portions can be provided in addition to the displacement detecting devices.

(11) In the aforementioned first embodiment, although a contact-type detecting device which comes into contact with the external peripheral surface of the tubular body 10 is exemplified as a displacement detector, the displacement detector is not limited to this so long as the radial displacement of the external peripheral surface 12 of the tubular body 10 can be detected. Various detecting devices based on various measurement principles including, for example, light transmittance type detectors eddy current type detectors, electrostatic capacity type detectors, focus type detectors or laser reflector type detectors, which do not come into contact with the external peripheral surface of the tubular element, can be employed.

(12) In the aforementioned first embodiment, although a photosensitive drum substrate is exemplified as a tubular body to be measured, the tubular body is not limited to this. Conveyance rollers, developing rollers or transferring rollers for use in copying machines or the like can also be applied. In addition to the above, any tubular bodies can be measuring objects of the present invention.

(13) In the aforementioned first embodiment, although it is configured that an operator manually rotates the tubular body 10 with his/her hands, the rotation of the tubular body can be performed by bringing rollers, etc. driven by motors, etc., into contact with the external peripheral surface or internal peripheral surface of the tubular body 10.

[Second Embodiment]

Next, the second embodiment will be explained.

This second embodiment is directed to an automatic type shape measuring apparatus in which the tubular body 10 (work) is automatically rotated by the driving force of the shape measuring device to perform the shape measuring.

Figure 17:
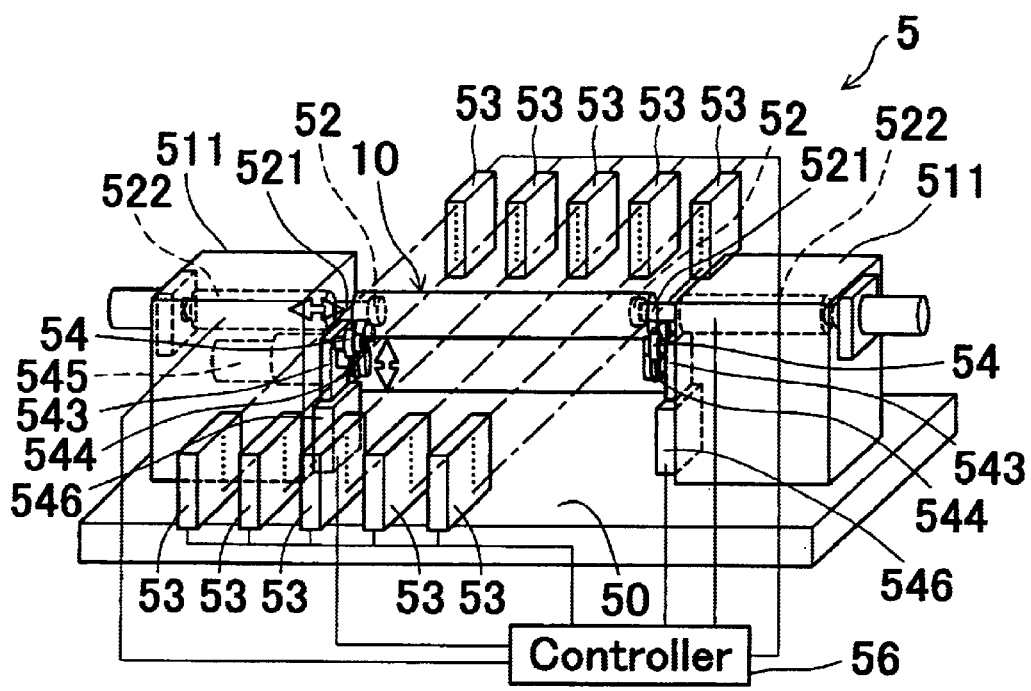
FIG. 17 is an entire schematic perspective view of an automatic type shape measuring apparatus 5.
Figure 18:
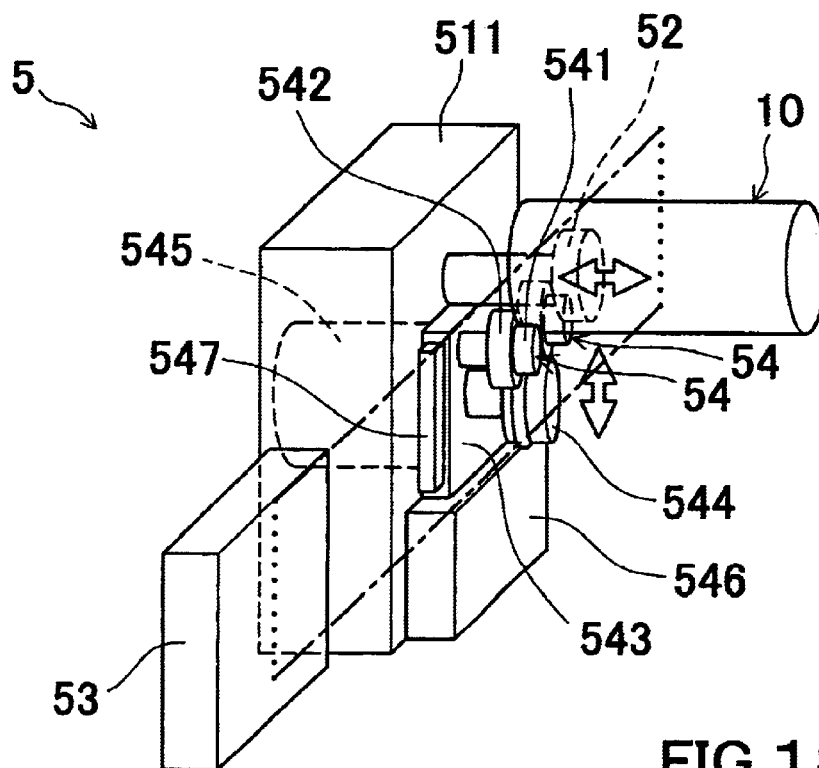
FIG. 18 is a front cross-sectional explanatory view of the principal portion of the apparatus 5.
Figure 19:
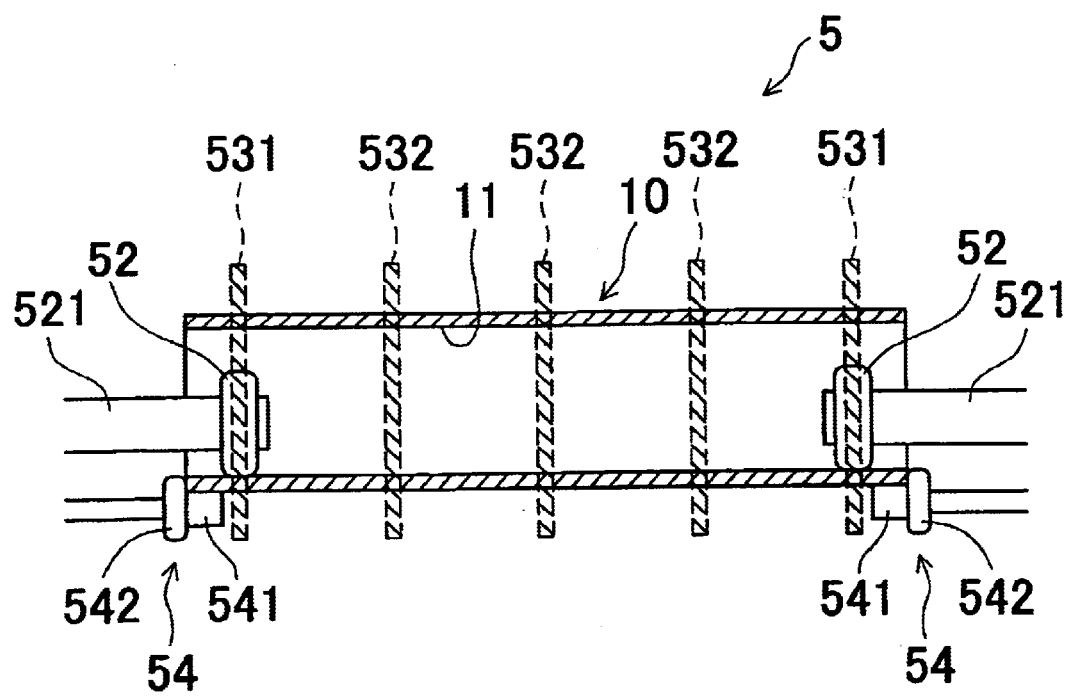
FIG. 19 is a front cross-sectional explanatory view of the principal portion of the apparatus 5.
Figure 20:
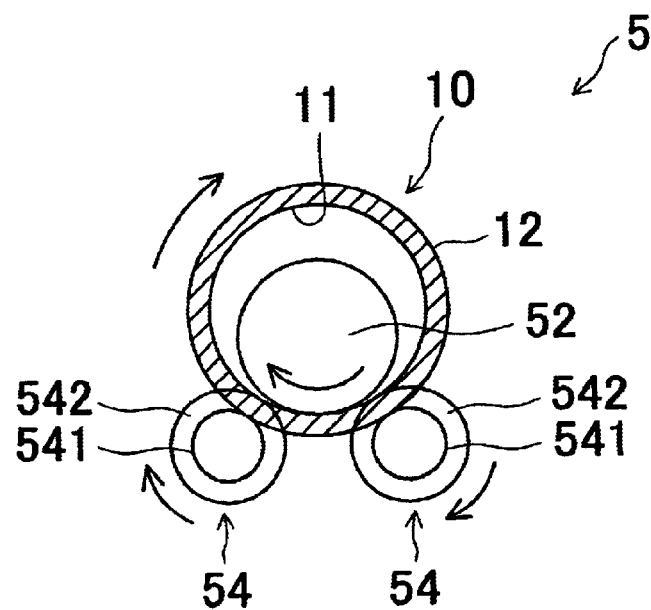
FIG. 20 is a side cross-sectional view of the principal portion of the apparatus 5.
Figure 21:
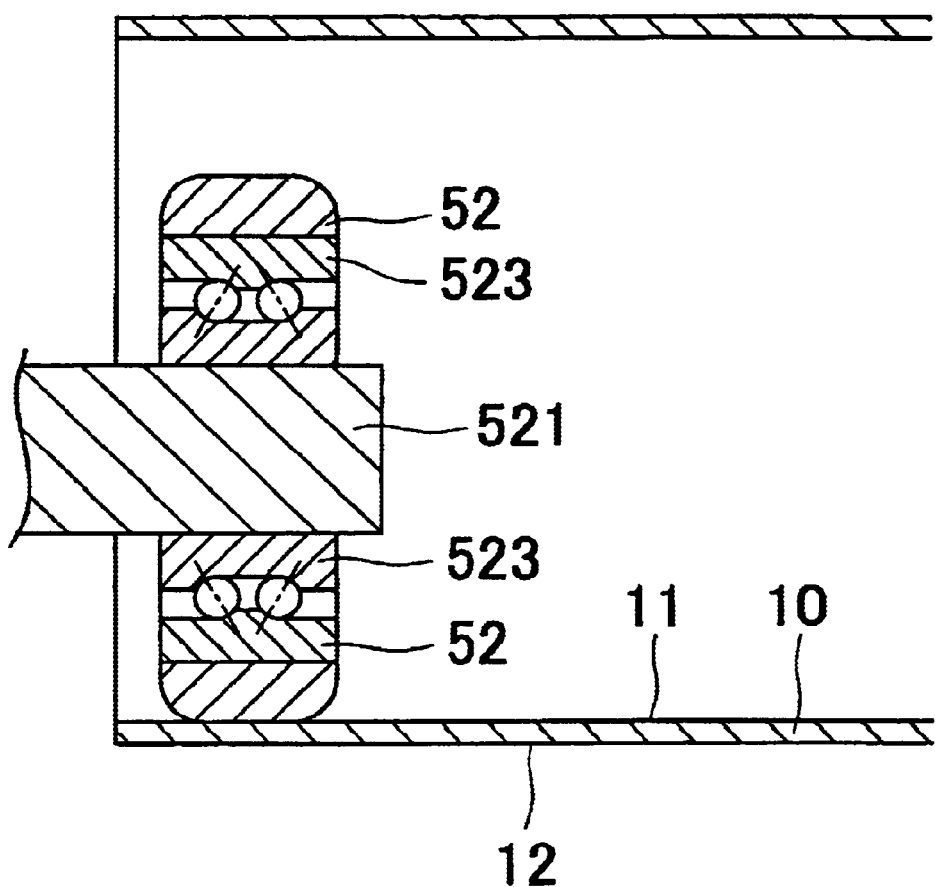
FIG. 21 is a front cross-sectional view showing a supporting form of a reference roller.
Figure 22:
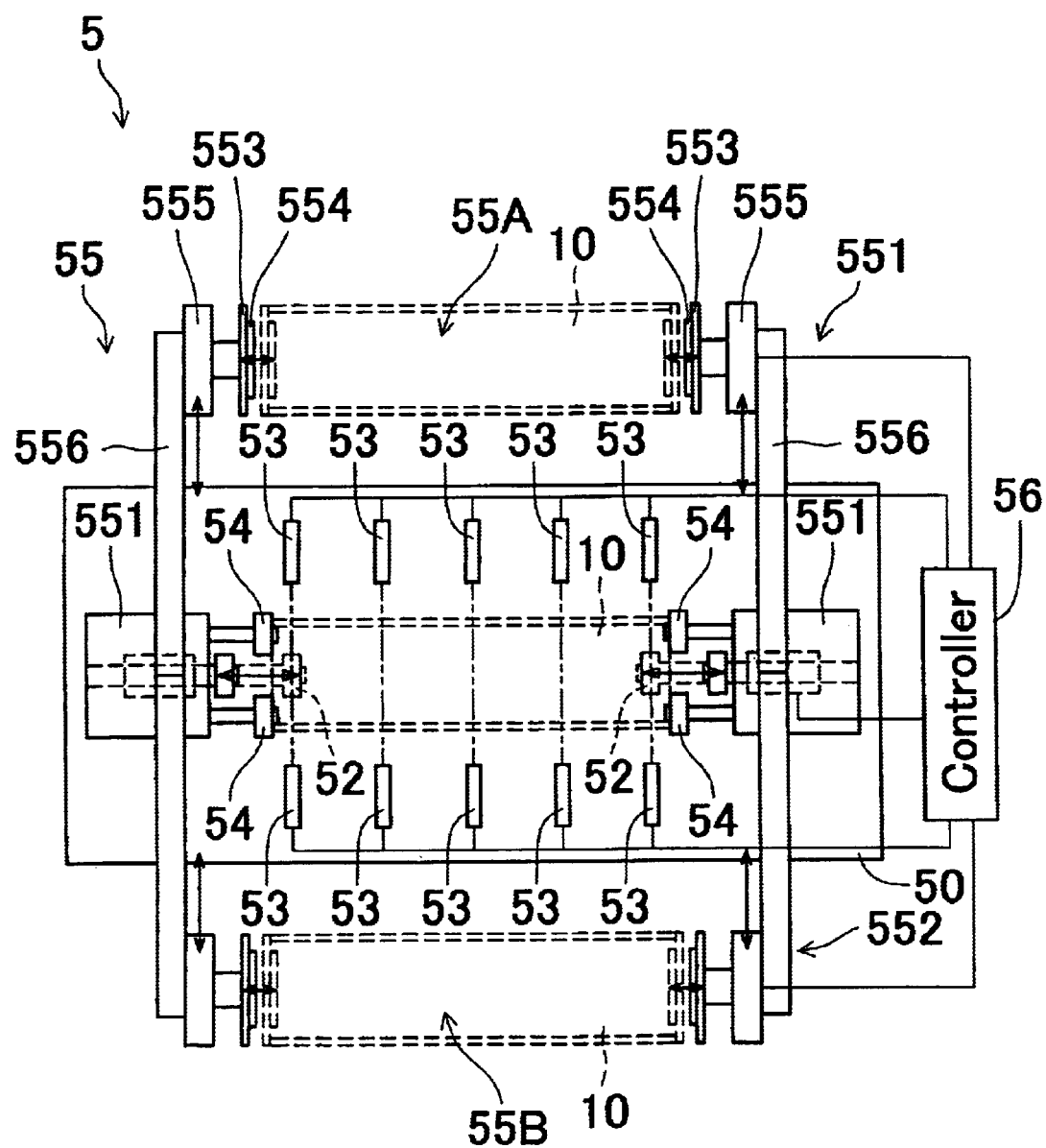
FIG. 22 is a plan explanatory view of a tubular body transferring apparatus.
Figure 23:
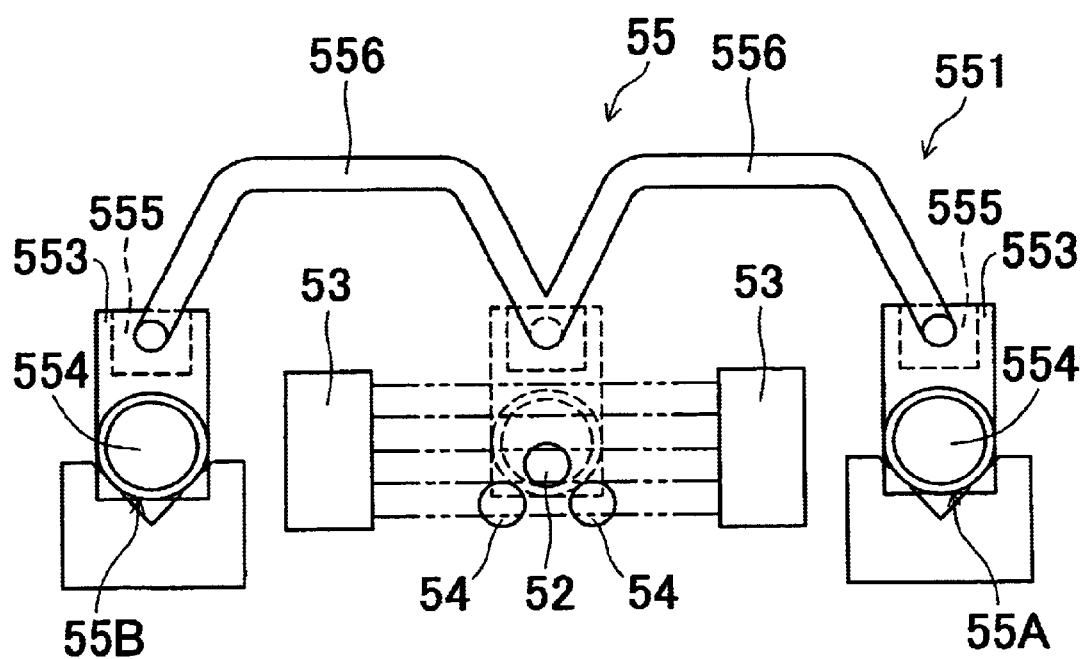
FIG. 23 is a side explanatory view of the tubular body transferring apparatus.

FIG. 17 is an entire schematic perspective view of this automatic type shape measuring apparatus 5. FIG. 18 is an enlarged perspective view showing the supporting structure of the tubular body 10 in the apparatus 5. FIG. 19 is a front cross-sectional explanatory view showing the principle portion of the apparatus 5. FIG. 20 is a side cross-sectional view showing the principle portion of the apparatus 5. FIG. 21 is a front cross-section showing the supporting status of the reference roller. FIG. 22 is a plane explanatory view of the tubular conveyance apparatus. FIG. 23 is a side explanatory view of the tubular conveyance apparatus.

This shape measuring apparatus 5 is provided with a pair of reference rollers (reference portions) 52 and 52 which comes into contact with the internal peripheral surface 11 of the tubular body 10 to become a reference of the shape measurement, supporting rollers 54 which support the tubular body 10 from its lower side at both end portions thereof so as to rotate the tubular body 10, light transmittance type displacement detecting devices 53 disposed so as to locate the tubular body 10 therebetween in the direction perpendicular to the axial direction of the tubular body 10, a tubular body carrying apparatus 55 for carrying in/out the tubular body 10, a controller 56 for controlling the operation of each part, and a main body base 50.

<Pair of Reference Portions>

As shown in FIG. 20, etc., each of the pair of reference rollers 52 and 52 comes into contact with the lower position of the internal peripheral surface 11 (internal lower peripheral surface) at the vicinity of the end portion of the tubular body 10 to constitute a reference for a shape measurement.

Each of the pair of reference rollers 52 and 52 is a columnar member with round and smooth edges. Each of the reference rollers 52 are rotatably attached to the corresponding reference supporting shaft 521 and 521 via the bearing 523 and 523. Thus, each of the reference rollers 52 and 52 rotatably connected to the corresponding reference supporting shaft 521 and 521 is in contact with the internal peripheral surface 11 of the tubular body 10 to be rotated in accordance with the rotation of the tubular body 10. Consequently, the reference roller 52 can smoothly rotate together with the tubular body 10 without preventing the rotation of the tubular body 10. Furthermore, each the pair of reference rollers 52 and 52 formed into a columnar member comes into line-contact with the internal peripheral surface 11 of the tubular body 10, dispersing the contact pressure, which in turn prevents damages of the internal peripheral surface 11 of the tubular body 10.

The bearing 523 is an axial load withstanding bearing. Concretely, as shown in FIG. 21, the bearing is constituted by a dual-row angular contact ball bearing having a bearing force against both the axially outward load and the axially inward load (axial loads). As a result, even in cases where axial load is applied to the reference rollers 52 and 52 because of the bent tubular body 10 or another reasons, smooth rotation of the reference roller 52 can be secured, causing a smooth rotation of the tubular body 10, which in turn enables steady shape measurement.

Each of the pair of reference supporting shaft 521 supporting the reference roller 52 is made of a metal shaft having sufficiently high rigidity, and is attached so as to penetrate the device box 511 provided on the main base 50 disposed at the longitudinal end of the tubular body 10. This structure prevents the displacement of the position of the reference supporting shaft 521 in any direction perpendicular to the axial direction of the tubular body 10 (i.e., in the up-and-down direction and in the fore-and-aft direction in FIG. 17), which in turn prevents the displacement of the position of the reference roller 52 (measuring reference position) in any direction perpendicular to the axial direction of the tubular body 10. This in turn ensures the smooth rotational operation of the tubular body 10.

Furthermore, this reference supporting shaft 521 is movable in the axial direction of the tubular body 10 by the driving portion 522 provided in the device box 511. This enables the setting of the tubular body 10 to the shape measuring apparatus by moving the pair of reference rollers 52 and 52 outward in the axial direction without the necessity of moving the tubular body 10 in the axial direction. In other words, this driving portion 522 functions as a projecting/retracting means. The projecting/retracting operation of each of the pair of the reference rollers 52 and 52 is limited to the slide operation in the axial direction of the tubular body 10, so that the axial position itself is immovable regardless of the projecting/retracting movements. As a result, the accuracy of the pair of reference rollers 52 and 52 as a reference for the shape measurement can be secured, resulting in high reliability on shape measurement.

As shown in FIG. 4, each of the pair of reference rollers 52 and 52 comes into contact with the internal peripheral surface of the tubular body 10 at the position (supporting position) where the tubular body 10 is rotatably supported by a flange or the like which is to be inserted in use. Therefore, the shape measurement can be performed under the same conditions as the actual use.

<Supporting Roller>

The supporting rollers 54 support the tubular body 10 from its lower side at both end portions, and press the tubular body 10 against the reference roller 52 at certain pressure. At the same time, the supporting rollers 54 carry out the following functions: a function of rotatably driving the tubular body 10; a function of positioning the axial position of the tubular body 10; a function of moving the tubular body 10 up and down; a function of stabilizing the height position of the tubular body 10 by supporting it from its lower side; and a function of temporarily supporting the tubular body 10.

Two supporting rollers 54 are positioned below each end portion of the tubular body 10 at the same height, and the total of four supporting rollers 54 are provided to support both end portions of the tubular body 10. The two supporting rollers 54 and 54 positioned at one of the end portions of the tubular body 10 are configured to be a pair of rollers with parallel rotational axes as best shown in FIG. 15. Since two supporting rollers 54 and 54 are disposed at each of both end portions of the tubular body 10 as mentioned above, the axial position of the tubular body 10 and the posture of the tubular body 10 can be stabilized.

Each supporting rollers 54 includes a small diameter portion 541 which comes into contact with the external peripheral surface 12 of the tubular body 10 to support the tubular body 10 from its lower side and a concentric larger diameter portion 542 formed at the outside of the small diameter portion 541.

As shown in FIG. 19, the small diameter portion 541 of the supporting roller 54 is configured so as to come into contact with the tubular body 10 at a position which is outside the contact position where the reference roller 52 comes into contact with the internal peripheral surface 11 of the tubular body 10. This enables the displacement detecting device 53 to detect the displacement of the cross-section where the reference roller 52 is in contact without disturbing the detection. Further, the supporting both end portions of the tubular body 10 stabilizes the posture of the tubular body 10 at the time of measuring the shape. Furthermore, since it is not necessary to bring the supporting rollers into contact with the most central portion of the tubular body 10, the possibility of damage which will be caused by bringing the supporting rollers 54 into contact with the external peripheral surface 12 of the tubular body 10 can be decreased. From this reason, it is preferably used especially for the shape measurement of photosensitive drum substrates, etc.

The larger diameter portion 542 of the supporting roller 54 comes into contact with the end face of the tubular body 10 to position the axial direction of the tubular body 10 to be set to the device 5. Thus, the distance between the supporting rollers 54 disposed at both ends of the tubular body 10 is set to correspond with the length of the tubular body 10. Since the positioning of the tubular body 10 in the axial direction is carried out by the supporting rollers 54 supporting the tubular body 10 as mentioned above, the number of members to be made contact with the tubular body 10 can be decreased. This eliminates the possible error factors as much as possible. In addition, this results in high reliability in shape measurement. Furthermore, the possible damage of the tubular body 10 can also be decreased.

<Supporting Structure of the Supporting Roller>

Each of the aforementioned supporting rollers 54 is rotatably attached to the supporting roller support member 543 at the end of the tubular body 10. Each supporting roller support member 543 is slidably attached to the device box 511 such that the slide movement direction thereof is restricted only to the up-and-down direction by the slide movement direction rails 547 and 547. That is, the supporting roller support member 543 functions as an ascending/descending member, and the movement direction restriction rail 547 functions as a movement direction restriction means. They also function as a part of ascending/descending means. Since the supporting rollers 54 are attached to the supporting roller support member 543, two supporting rollers 54 and 54 disposed at both sides of the tubular body 10 can maintain the relative positional relationship, resulting in high reliability of the shape measurement. Furthermore, since the slide moving direction of the supporting roller support member 543 is restricted, the ascending/descending direction of the supporting rollers 54 can be stabilized, resulting in high reliability of the shape measurement.

At the lower side of the supporting rollers 54, a coupling roller 544 which comes into contact with the external surface of the larger diameter portion of each supporting roller 54 is rotatably connected to the supporting roller support member 543. Since two supporting rollers 54 and 54 are driven by the coupling roller 544 at both sides of the tubular body 10, the rotational speed of these two supporting rollers 54 and 54 can be equalized. This in turn stabilizes the rotation of the tubular body 10, resulting in high reliability of the shape measurement.

One of the pair of coupling rollers 544 and 544 is rotatably driven in a predetermined direction by the driving force of the driving motor 545 accommodated in the device box 511 to equally transmit the rotation of the coupling roller 544 to the two supporting rollers 54 and 54 which are in contact with the coupling roller 544, which in turn rotates the tubular body 10. That is, the driving motor 545 functions as a rotational driving means for rotating the supporting rollers 54. At the same time, the driving motor 545 also functions as a part of an ascending/descending means. As mentioned above, since the rotational driving force is transmitted to the tubular body 10 by the supporting rollers 54 and 54 supporting the tubular body 10, the number of members to be in contact with the tubular body 10 can be decreased. This contributes the accuracy of the shape measurement by eliminating error factors. Furthermore, since the rotation of the tubular body 10 is performed by a single rotation driving source, generation of rotational fluctuation which may occur when plural rotation driving sources are employed can be suppressed. The rotational control can also be simplified.

The supporting roller support member 543 to which the supporting rollers 54 and 54 and the coupling roller 544 are attached is slidably driven in the up-and-down direction by a lifting cylinder 546 attached to the device box 511. That is, the lifting cylinder 546 functions as a lifting means for lifting the supporting rollers 54 and 54. At the same time, the lifting cylinder 546 also functions as a part of a lifting means.

The sliding movement of the supporting roller support member 543 by the lifting cylinder 546 allows the movement of the tubular body 10 supported by the supporting rollers 54 and 54 between the measuring position where the lower internal peripheral surface of the tubular body 10 comes into contact with the reference roller 52 and the apart position where the lower internal peripheral surface is apart from the reference roller 52.

At the time of performing the shape measurement of the tubular body 10, the lifting cylinder 546 lifts the tubular body 10 to the measuring position and applies a predetermined upward force against the supporting roller support member 543 to thereby press the tubular body 10 at the measuring position against the reference roller 52. Thus, at the time of performing the shape measurement of the tubular body 10, the contact pressure between the lower internal peripheral surface of the tubular body 10 and the reference roller 52 can be appropriately maintained, resulting in high reliability of shape measurement.

Furthermore, since the weight of the tubular body 10 is supported from its lower side by the supporting rollers 54, the contact pressure between the lower internal peripheral surface of the tubular body 10 and the reference roller 52 can be set to any contact pressure more than or less than the weight of the tubular body 10 irrespective of the weight of the tubular body 10. Thus, the most appropriate contact pressure for a shape measurement can be set, thereby enabling accurate shape measurement. In concrete, the contact pressure can be a pressure which does not cause substantial deformation of the end portion of the tubular body 10. Alternatively, a pressure which positively causes slight deformation of the end portion of the tubular body 10 can be set.

<Displacement Detecting Device>

The displacement detecting device 53 detects the radial displacement of the external peripheral surface 12 of the tubular body 10. In this embodiment, a total of five non-contact type detecting devices are provided at five positions different in axial position of the tubular body 10. The opposite two detecting devices among these five devices are disposed so as to detect the displacement of the cross-section of the position facing off against the reference roller 52 respectively.

Each displacement detecting device 53 is a light transmittance type displacement detecting device disposed so as to face the tubular body 10 from the direction perpendicular to the axial direction of the tubular body 10. Thus, a pair of a light irradiating portion and a light receiving portion disposed at both sides of the tubular body 10 constitutes each displacement detecting portion 53. The light (e.g., laser beam) irradiated from the light irradiating portion but not interrupted by the tubular body 10 will be detected by the light receiving portion to thereby detect the surface position of the external peripheral surface 12 of the tubular body 10.

The detecting region 531 and 532 of each displacement detecting device 53 has a width exceeding the diameter of the tubular body 10 as shown in FIG. 19 for example. Each displacement detecting device 53 can simultaneously detect not only the displacement of one position of the external peripheral surface of the tubular body 10 but also the displacement of a position opposite to the aforementioned one position (a position moved from the position by a half peripheral length of the tubular body 10 in the circumferential direction thereof, a position rotated from the position by 180 degrees, or an opposite phase position). Thus, by combining the displacements detected at the opposite positions, the diameter of the tubular body 10 passing these two positions can be obtained, to thereby grasp the shape of the tubular body 10 more concretely.

As a result, the displacement detecting device 53 enables a shape measurement in the same manner as in the shape measuring method shown in FIGS. 10 and 11.

<Tubular Body Carrying Apparatus>

As shown in FIGS. 22 and 23, the tubular body carrying apparatus 55 is provided with a first carrying apparatus 551 for carrying the tubular body 10 to be fed to the shape measuring apparatus 5 from a certain carry-in position 55A to the above of the supporting rollers 54 and 54 on which the shape measurement is to be performed and a second carrying apparatus 552 for carrying the tubular body 10 whose shape measurement was completed from the supporting rollers 45 and 45 to a certain carry-out position 55B.

The first carrying apparatus 551 is provided with carrying arms 553 and 553 to be disposed at both ends of the tubular body 10. At the tip of each carrying arm 553, a pick-up protrusion 554 to be inserted into the tubular body 10 is provided. Also provided to the first carrying apparatus 551 are slide driving sources 551 and 551 for moving the carrying arm 553 in the axial direction of the tubular body 10 and a moving rail 556 for moving the carrying arm 553 with the tubular body 10 picked up by the pick-up protrusion 554 from the carry-in position 55A to the position above the supporting rollers 54 and 54.

Similarly, the second carrying apparatus 552 is also provided with carrying arms 553 and 553 to be disposed at both ends of the tubular body 10. At the tip of each carrying arm 553, a pick-up protrusion 554 to be inserted into the tubular body 10 is provided. Also provided to the second carrying apparatus 552 are slide driving sources 555 and 555 for moving the carrying arm 553 in the axial direction of the tubular body 10 and a moving rail 556 for moving the carrying arm 553 from the position above the supporting rollers 54 and 54 to the carry-out position 55B.

<Controller>

A controller (controlling means) 56 generally controls the operation of each potion of the shape measuring apparatus 5, and constituted by a sequencer or the like as a computer equipped with CPUs and memories, etc.

Examples of operation portions to be controlled by the controller 56 include driving portions for driving the pair of reference rollers 52, driving motors 545 and 545, lifting cylinders 546 and 546 for lifting the supporting rollers 54, displacement detecting devices 53 for performing the shape measurement of the tubular body 10, slide driving sources 555 and 555 of the first carrying apparatus 551 and slide driving sources 555 of the second carrying apparatus 552. The controller 56 controls each of these operation portions at respective timing of the shape measuring procedures.

The shape measuring procedures to be executed under the control of the controller 56 can be exemplified as follows.

The controller 56 first controls the first carrying apparatus 551 so as to carry the tubular body 10 from the carry-in position 55A to a position above the supporting rollers 54.

Concretely, the carrying arms 555 and 555 are moved by the moving rail 556 to the carry-in position 55A in a state in which the carrying arms are opened outward by the slide driving sources 555 and 555. Then, the distance of the carrying arms 553 and 553 is narrowed by the slide driving sources 555 and 555 to insert the pick-up protrusions 554 and 554 into the tubular body 10. In this state, the carrying arms 553 and 553 are moved from the carry-in position 55A to the position above the supporting rollers 54 and 54 by the moving rails 556 and 556 to carry the tubular body 10. The rail track of the moving rail 556 extends obliquely upward from the carry-in position, then approximately horizontally to the position above the supporting rollers 54 and 55, and then obliquely downward therefrom. This rail track configuration prevents the tubular body 10 to be carried from interfering with the displacement detecting devices 53.

At the time of the carry-in of this tubular body 10, the controller 56 controls the driving portions 522 and 522 so that the pair of reference rollers 52 and 52 are retracted outward. This prevents the tubular body 10 to be carried-in from interfering with the reference rollers 52 and 52.

When the tubular body 10 is carried at the position above the supporting rollers 54 and 54, the first carrying apparatus 551 unloads the tubular body 10 on the small diameter portions 541 of the supporting rollers 54 and 54 by moving the carrying arms 553 and 553 outward by the slide driving sources 555 and 555. Thereafter, with the carrying arms 553 and 553 opened, the carrying arms 553 and 553 are returned to the carry-in position 55A by the moving rails 556 and 556 to prepare for the subsequent carrying operation.

Subsequently, the controller 56 controls the driving portions 522 and 522 so as to insert the pair of reference rollers 52 and 52 into the tubular body 10. With this state, the controller 56 controls the lifting cylinders 546 and 546 so as to lift the tubular body 10 together with the supporting rollers 54 and 54.

When the pair of reference rollers 52 and 52 come into contact with the internal peripheral surface 11 of the tubular body 10, the tubular body 10 is pressed against the pair of reference rollers 52 and 52 at a predetermined pressure. With this state, the driving motors 545 and 545 rotate the tubular body 10 via the coupling rollers 544 and the supporting rollers 54 and 54.

At this time, the radial displacement of the external peripheral surface 12 of the tubular body 10 at each axial cross-section of the tubular body 1 is detected by each displacement detecting device 53.

When the detection of the displacement of the entire periphery of the tubular body 10 is completed, in accordance with the procedure opposite to the aforementioned procedure, the rotation of the tubular body 10 is stopped, the tubular body 10 is lowered to release the contact state with the reference rollers 52 and 52, and then the pair of reference rollers 52 and 52 are retracted outward again.

Subsequently, in a manner similar to the carry-in procedure by the first carrying apparatus 551, the controller 56 controls the second carrying apparatus 552 so as to carry out the tubular body 10 whose shape measurement was completed from the portion above the supporting rollers 54 and 54 to complete a sequence of shape measuring operation of a single piece of the tubular body 10.

<Functions and Effects>

The shape measurement apparatus 5 constituted as mentioned above can have the functions and effects of the shape measurement method disclosed by FIGS. 10 and 11.

Furthermore, according to this automatic type shape measurement apparatus 5, when the tubular body 10 is placed on the supporting rollers 54 and 54, the shape measurement can be performed automatically, enabling an easy employment into an automated line.

Furthermore, the supporting rollers 54 and 54 for supporting the tubular body 10 simultaneously carry out plural functions, i.e., a function of transferring the rotational driving force to the tubular body 10, a function of positioning the axial position of the tubular body 10, a function of lifting the tubular body 10, and a function of supporting the tubular body 10 from the lower side thereof to maintain the contact state with the reference rollers 52 and 52. As a result, a structure having less number of moving portions has been attained by integrating operating portions for setting the tubular body 10 to the shape measuring position or for performing the shape measurement. Furthermore, the number of parts which come into contact with the tubular body 10 as a measuring object can be decreased. This eliminates error factors to contribute accurate shape measurement and enables high reliability of shape measurement.

Furthermore, the supporting rollers 54 and 54 support the tubular body 10 at its end portions, enabling the cross-sections corresponding to the contact portions of the pair of reference rollers 52 and 52 to be measured. Accordingly, as mentioned above, the thickness distribution of the tubular body 10 can be obtained, and therefore, the shape of the tubular body 10 can be specified in more detail.

Furthermore, the employment of the non-contact type displacement detecting devices 53 eliminates damages to the external peripheral surface of the tubular body 10.

Furthermore, since this non-contact type displacement detecting device 53 is a light transmittance type displacement detecting device, the light is diffracted at the vicinity of the external peripheral surface 12 of the tubular body 10 which blocks the light to reach the light receiving portion, and therefore, appropriate detection results in which displacements of the external peripheral surface 12 due to unnecessary fine surface defects are deleted can be obtained.

At the time of setting the tubular body 10 to the shape measuring apparatus 5, the pair of reference rollers 52 and 52 are not moved in a direction perpendicular to the axial direction of the tubular body 10. Consequently, the position to be fixed as a reference portion can be stabilized, contributing to accurate shape measurement.

The tubular body 10 is pressed against the reference rollers 52 and 52 while contacting the supporting roller 54 to the end portion of the tubular body 10, causing burrs generated at the end face of the tubular body 10 at the time of cutting the tubular body 10 to be removed. As a result, it is possible to assuredly keep the state in which the tubular body 10 is in contact with the supporting rollers 54 and 54, resulting in high precision of the shape measurement. Furthermore, this shape measuring apparatus 5 can also be used as a burr removing apparatus.

Figure 24:
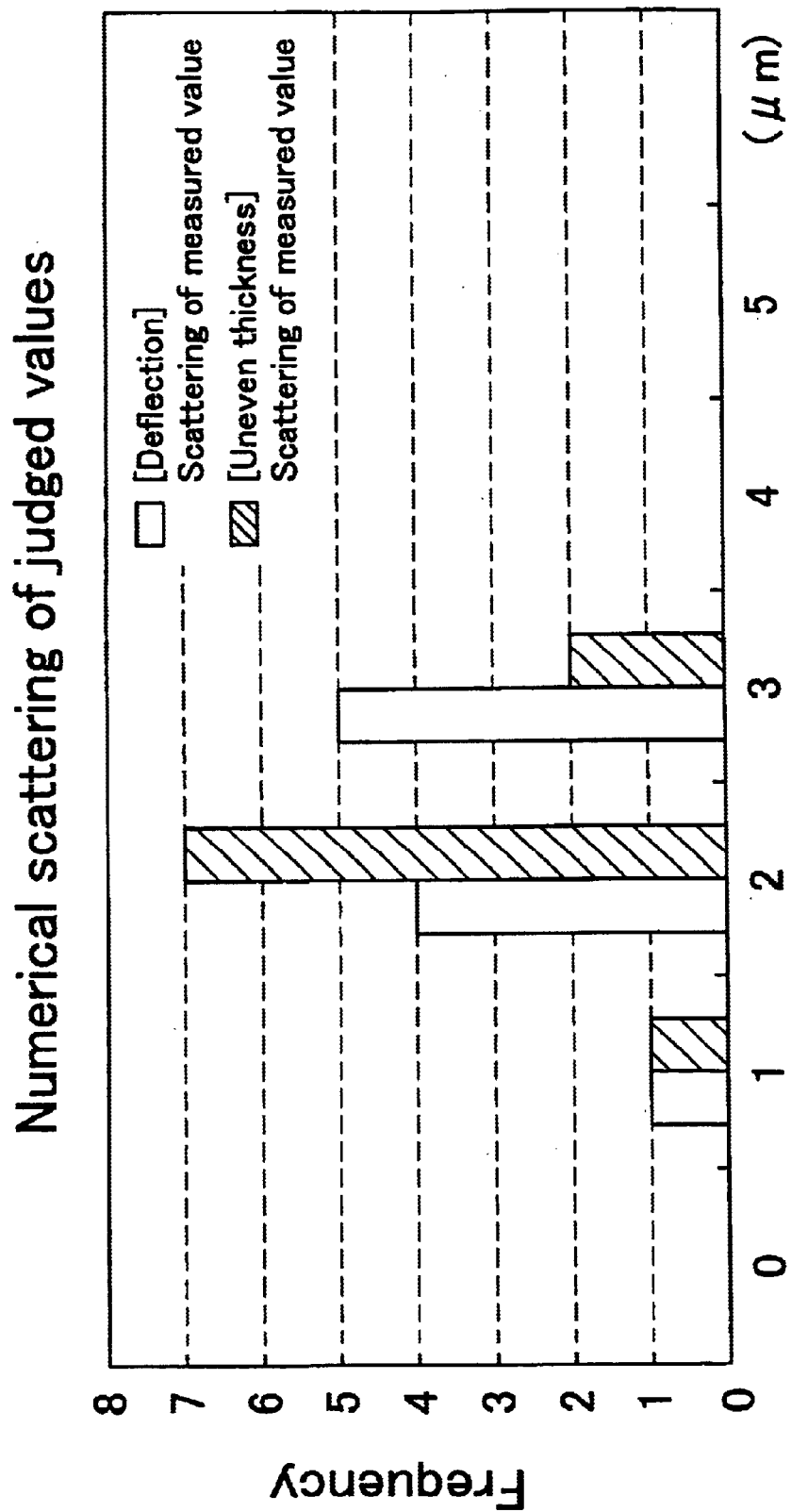
FIG. 24 is a graph showing the data spread (measurement errors) of each measured result in the case in which shape measurement is performed with respect to a plurality of tubular bodies having various displacements ten times, respectively.

Using this automatic shape measuring apparatus 5, concrete shape measurements were performed against a plurality of tubular bodies with various displacements ten times, respectively. As a result, as shown in FIG. 24, the scattering of each measured result (measurement error) was 3 $\mu$m at the maximum, confirming the high reliability. This measurement error is an extremely excellent value for a tubular body shape measuring apparatus capable of being mass-produced, and therefore, it is possible to eliminate the cases in which a good item is erroneously judged as a defective item by decreasing the room for absorbing the measurement errors.

In the case where the allowable range of the external peripheral surface deflection with respect to the internal peripheral surface of the tubular body as a reference is, for example, 20 $\mu$m or less which is a total of the working limit precision level of each defective factor of the tubular body 10 including bentness or unevenness, a selection of a good tubular body can be performed by picking a tubular body with a deflection of 17 $\mu$m or less in consideration of the maximum measurement error of 3 $\mu$m. By this selection, a group of tubular bodies in which all of the items regarded as good items assuredly fall within an allowable range of 20 $\mu$m or less can be obtained while minimizing the number of items misclassified as defective items.

Furthermore, when the selection of tubular bodies is performed by setting a threshold in consideration of measurement errors, a group of preferable tubular bodies each having a deflection of 15 $\mu$m or less can be obtained. Furthermore, a group of more preferable tubular bodies each having a deflection of 10 $\mu$m or less, which is a very difficult level for a conventional method of manufacturing tubular bodies, or a group of extremely preferable tubular bodies each having a deflection of 5 $\mu$m or less can be obtained. Ultimately, a group of tubular bodies each having a deflection of 3 $\mu$m (maximum measurement error) or less can be obtained.

In this tubular body shape measuring apparatus 5, a series of processes, i.e., automatically carrying in, setting, measuring, and carrying out the tubular body 10, can be completed in about 60 seconds or less per one piece. At the time of high-speed operation, the series of processes can be completed in 30 seconds or less, 10 seconds or less, or 5 seconds or less per one piece.

As will be understood from the above, since this shape measuring apparatus 5 can perform the shape measurement of each tubular body at high speed, a shape measurement and a acceptance/rejection determination can be easily applied to all of tubular bodies to be manufactured, which in turn guarantees that each deflection of all the shipping tubular bodies each having a known working precision limit level falls within a predetermined range.

For example, a photosensitive drum substrate is carried, dealt with a plurality of pieces as a unit accommodated in a box or the like. One unit usually includes ten pieces or more, for example 80 or 140 pieces. According to this shape measuring apparatus 5, it is possible to guarantee that all of them fall within an allowable range, e.g., 20 $\mu$m or less.

<Modified Embodiments>

Although the second embodiment was explained, the present invention is not limited to this. The present invention can be variously modified, like the aforementioned first embodiment, and also can be constituted as follows.

(1) In the aforementioned second embodiment, although the pair of reference portions are brought into contact with the positions to be supported when the tubular body is used, they can be brought into contact any position within the internal peripheral surface of the tubular body. It is preferably for the vicinity of the portion to be supported since there is a high possibility that the portion to be supported and the vicinity thereof resemble in cross-sectional shape.

(2) In the aforementioned second embodiment, although the shape measurement was performed with the axial direction of the tubular body 10 placed nearly horizontally, the measurement can be performed with the axial direction of the tubular body 10 placed nearly vertically. This decreases the deflection of the tubular body 10 due to its own weight, enabling accurate shape measurement of the tubular body 10.

(3) In the aforementioned second embodiment, although the positions facing off against the hypothetical line passing the contact portions between the pair of reference portions and the tubular body and the opposite positions are selected as the displacement detecting positions, any other position along the peripheral direction thereof can be selected as detecting positions.

(4) In the aforementioned second embodiment, although a plurality of detecting positions are provided, only one detecting position can be provided.

(5) In the aforementioned second embodiment, although a photosensitive drum substrate is exemplified as a tubular body 10 to be subjected to the shape measurement, the present invention is not limited to this, but can also be applied to a carrying roller, a developing roller, a transferring roller for use in copying machines, etc. Furthermore, any other tubular body can be a measuring object of the present invention.

(6) In the aforementioned second embodiment, although a light transmittance type displacement detecting device (light transmittance type optical sensor) which does not come into contact with the tubular body 10 is exemplified as a displacement detecting device, the displacement detecting device is not limited to the above so long as it is possible to detect the radial displacement of the external peripheral surface 12 of the tubular body 10. As a displacement detecting device, it is possible to employ any detecting device based on various measuring principles, such as a contact type displacement sensor with a contact arm which comes into contact with the external peripheral surface of the tubular body 10 to detect the displacement, a reflection optical sensor capable of detecting the displacement in a non-contact state, an all-purpose image processing CCD camera or line camera capable of detecting the displacement in a non-contact state and applicable to any material, a current-type displacement sensor capable of detecting the displacement in a non-contact state and high in accuracy, high in processing speed, strong in environment and low in cost, a capacitance-type displacement sensor capable of detecting the displacement in a non-contact state and high in accuracy, an air-type (differential pressure type) displacement sensor capable of detecting the displacement in a non-contact state, or an ultrasonic type displacement sensor capable of performing a long distance measurement.

Figure 25:
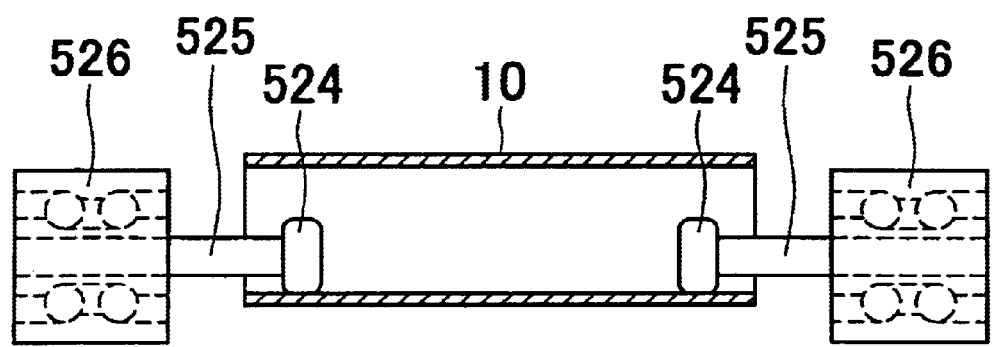
FIG. 25 is a front cross-sectional view showing a supporting form of a reference roller according to the third embodiment.

(7) In the aforementioned second embodiment, although the bearing 523 rotatably supporting the reference portion (reference roller) 52 is inserted into the tubular body 10 together with the reference roller 52, such a bearing can be disposed at the outside of the tubular body 10. In concretely, as shown in FIG. 25, an embodiment in which the reference roller 524 is immovably fixed to the supporting shaft 525 rotatably supported by the bearing 526 at the outside of the tubular body 10 can be exemplified. This enables a larger bearing to be employed without being restricted by the inside size of the tubular body 10, causing a stable rotation of the reference portion, resulting in high reliability.

(8) In the aforementioned second embodiment, although the tubular body carrying apparatus 55 for carrying the tubular body 10 is employed, it can be structured such that the tubular body 10 is carried in to or out from the shape measuring position over the supporting rollers 54 with operator's hands.

(9) In the aforementioned second embodiment, although the movement direction restriction means is constituted by two movement direction restriction rails 547 and 547, any structure constituted by a single rail, three or more rails, or a protrusion or a dented portion extending in the movement direction can be employed so long as it is possible to restrict the movement direction.

(10) In the aforementioned second embodiment, although the displacement of the external peripheral surface of the tubular body 10 is detected while rotating the tubular body 10, the detection of the displacement of the external peripheral surface can be performed by intermittently stopping the rotation of the tubular body 10.

[Third Embodiment]

Next, the third embodiment of the present invention will be explained.

In the third embodiment, the supporting rollers 54, etc., which are directly supported by the lifting cylinder 546 in the aforementioned second embodiment, are supported by a swing member 571 and a weight 574.

Hereinafter, the difference between this embodiment and the aforementioned embodiment will be explained, and therefore, cumulative explanation will be omitted by allotting the same reference numeral to the corresponding portion.

Figure 26:
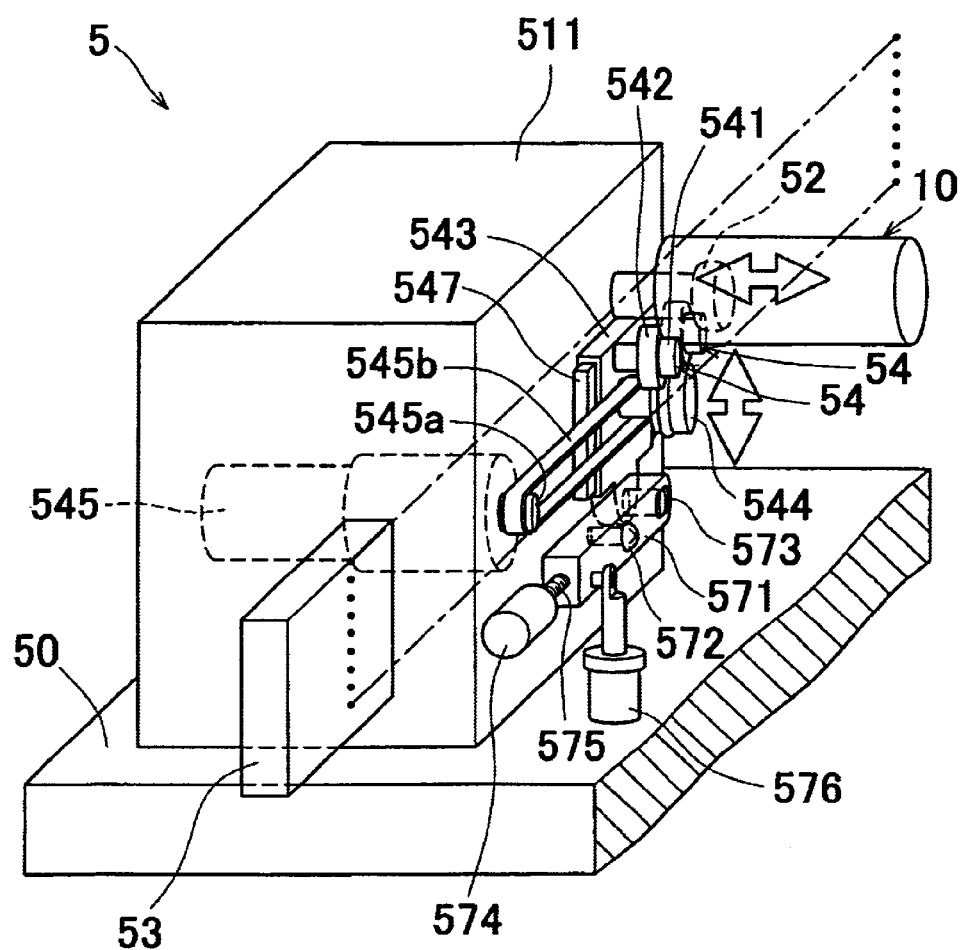
FIG. 26 is an enlarged perspective view of the supporting structure of the tubular body 10 in the third embodiment.
Figure 27:
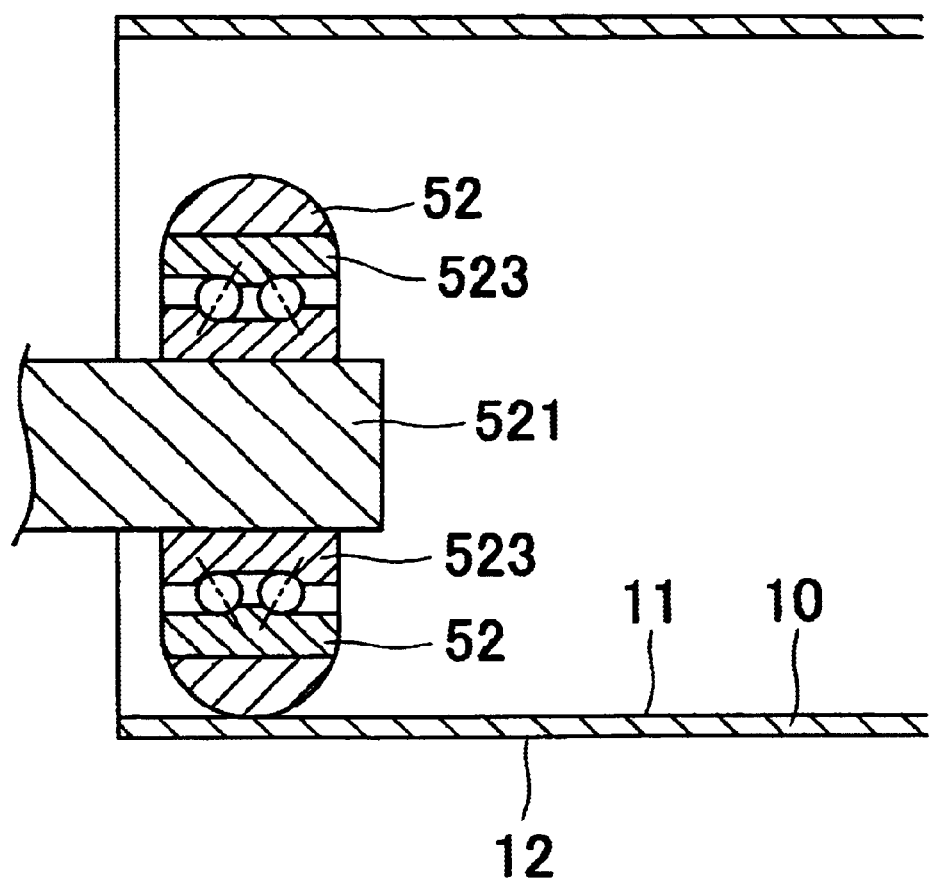
FIG. 27 is a front cross-sectional view showing a support form of a reference roller.
Figure 28:
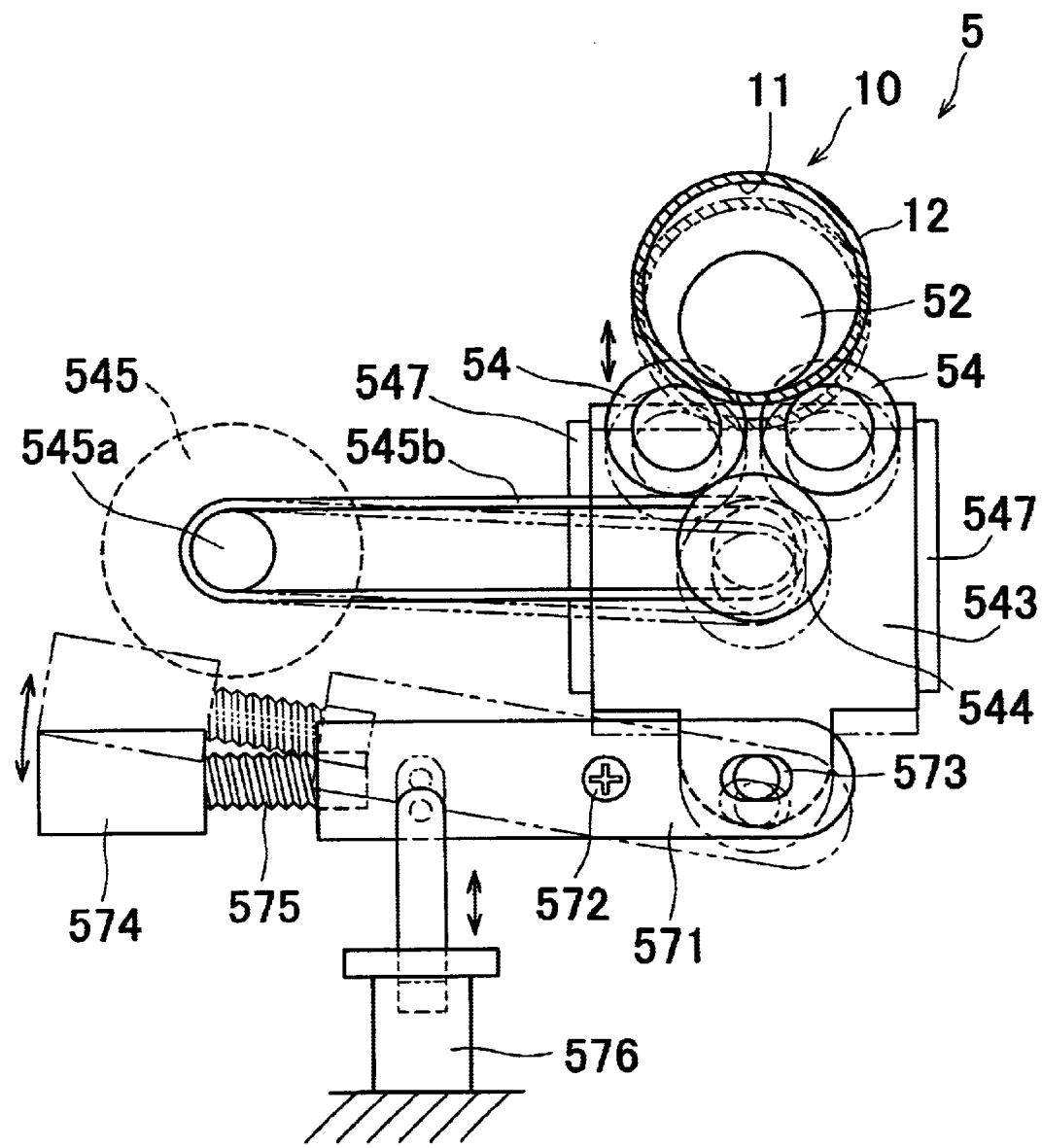
FIG. 28 is a side view showing the supporting form of supporting rollers.

FIG. 26 is an enlarged perspective view showing the supporting structure for supporting the tubular body 10 according to the third embodiment. FIG. 27 is a front cross-sectional view showing the supporting state of the reference roller. FIG. 28 is a side view showing the supporting state of the supporting rollers.

As shown in FIG. 26, in this third embodiment too, the pair of reference rollers 52 and 52 come into contact with the lower position (internal lower surface) of the internal peripheral surface 11 of the tubular body 1 at the vicinity of the end portion thereof to constitute the shape measuring reference. 298

As shown in FIG. 27, each of the pair of reference rollers 52 and 52 of the third embodiment is a member having an arc-shaped external peripheral surface in cross-section. Each of the reference rollers 52 is rotatably attached to the corresponding reference supporting shaft 521 and 521 via the bearing 523. Thus, each of the reference rollers 52 rotatably connected to the corresponding reference supporting shaft 521 is in contact with the internal peripheral surface 11 of the tubular body 10 to be rotated in accordance with the rotation of the tubular body 10. Consequently, the reference roller 52 can smoothly rotate together with the tubular body 10 without preventing the rotation of the tubular body 10. Furthermore, each of the pair of reference rollers 52 and 52 formed into an arc-shape in cross-section causes the roller to come into line-contact with the internal peripheral surface 11 of the tubular body 10, enabling the distance from the rotational axis of the reference roller 52 to the contact portion with the tubular body 10 to be kept constant assuredly.

As shown in FIG. 26, in this third embodiment too, the supporting rollers 54 and 54 are attached to the supporting roller support member 543, and the sliding direction of this supporting roller support member 543 is restricted by the movement direction restriction rails 547 and 547 only in the up-and-down direction.

A driving belt 545b is put on the driving shaft 545a of the driving motor (rotational driving means) 545 and the coupling roller 544, so that the driving motor 545 rotates the coupling roller 544 via the driving belt 545b. The driving motor 545 is immovably fixed in the device box 511 so as not to move up and down together with the supporting rollers 54 and the coupling roller 544 because of the driving force transmitting mechanism. This enables the supporting rollers 54 and the supporting roller support member 543 to be moved up and down with small force.

The supporting roller support member 543 is supported by the swing member 571. This swing member 571 is supported in a pivotable manner by the supporting shaft (fulcrum) 572 at the longitudinal central position thereof. This swing member 571 is provided at its one end thereof with an elongated hole 573 to which the supporting roller support member 543 is attached in a pivotable manner. This attachment allows the supporting roller support member 543 to be slid up and down.

At the other end of this swing member 571, the aforementioned weight 574 is attached. This weight 574 enables the moment about the supporting shaft (fulcrum) 572 by the weight to be balanced with the moment about the supporting shaft (fulcrum) 572 by the weight of supporting roller support member 543 and the supporting rollers 54 and 54 moved up and down with the supporting roller support member 543. In other words, the swing member 571 and the weight 574 support the weight of the supporting roller support member 543 and members moved up and down together with the supporting roller support member 543 so as to function as a weight supporting means for supporting the supporting roller support member 543.

This weight 574 is screwed into the other end of the swing member 571 via the screw portion 575 50 that the distance between the supporting shaft (fulcrum) of the swing member 571 and the weight 574 can be adjusted by adjusting the screwed amount. That is, this screw portion 575 functions as a weight position adjusting means. Because of this attaching structure, it is possible to adjust such that the weight 574 is balanced with the supporting roller support member 543, etc. Therefore, even in cases where the tubular body 10 as a shape measuring object, the supporting roller 54, etc. are changed in size, etc., this apparatus can cope with such a change.

At the other end of the swing member 571, an air cylinder 576 for driving the swing member 571 is attached. This air cylinder 576 drives the swing member 571, giving a prescribed upward force to the supporting roller support member 543 disposed at the measuring position, which in turn causes the tubular body 10 to be pressed against the reference roller 52 via the supporting rollers 54 and 54. That is, this air cylinder 576 functions as a pressing force giving means. This air cylinder 576 is designed so that the swing member 571 can be driven clockwise and counterclockwise, and therefore the air cylinder 576 also functions as a means for moving the supporting roller support member 543 between the measuring position and the standby position.

As mentioned above, the structure in which only the force for pressing the tubular body 10 against the reference roller 52 is imposed on the air cylinder 576 by imposing the weight of the supporting roller support member 543 and members to be moved together with the supporting roller support member 543 to the swing member 571 and the weight 574 is employed, decreasing the force to be imposed on the air cylinder 576. This enables the force of the air cylinder 576 to be accurately set and controlled, which in turn enables the accurate setting of the contact pressure between the tubular body 10 and the reference roller 52 to attain high reliability on the shape measurement.

The contact pressure between the tubular body 10 and the reference roller 52 and/or the contact pressure between the tubular body 10 and the supporting roller 54 can be set to a pressure not causing a substantial deformation of the end portion of the tubular body 10. Alternatively, such contact pressure can be set to a pressure positively causing slight deformation of the end portion of the tubular body 10 to perform the shape measuring while correcting the cross-sectional shape of the tubular body 10.

In a state in which the weight 574 and the supporting roller support member 543, etc. are balanced without driving the air cylinder 576, the supporting roller support member 543 can be positioned at the measuring position or the standby position. In the case where the weight 574 is adjusted such that the supporting roller support member 543 takes the standby position, there is an advantage that the supporting roller support member 543 can be lifted by the air cylinder 576 only having a driving force for lifting the supporting roller support member 543.

<Modified Embodiments>

Although the third embodiment was explained, the present invention is not limited to the above. Like the aforementioned first and second embodiment, various modifications can be made as follows.

(1) Although the pressing force giving means is constituted by an air cylinder in the aforementioned third embodiment, the means can be constituted by various actuators, such as a hydraulic cylinder or an electric motor using electric power.

[Fourth Embodiment]

Next, the fourth embodiment will be explained.

In this fourth embodiment, the weight supporting means constituted by the swing member 571 and the weight 574 in the third embodiment is replaced with the elastic member 581.

Hereinafter, the difference between this embodiment and the aforementioned embodiment will be explained, and therefore, cumulative explanation will be omitted by allotting the same reference numeral to the corresponding portion.

Figure 29:
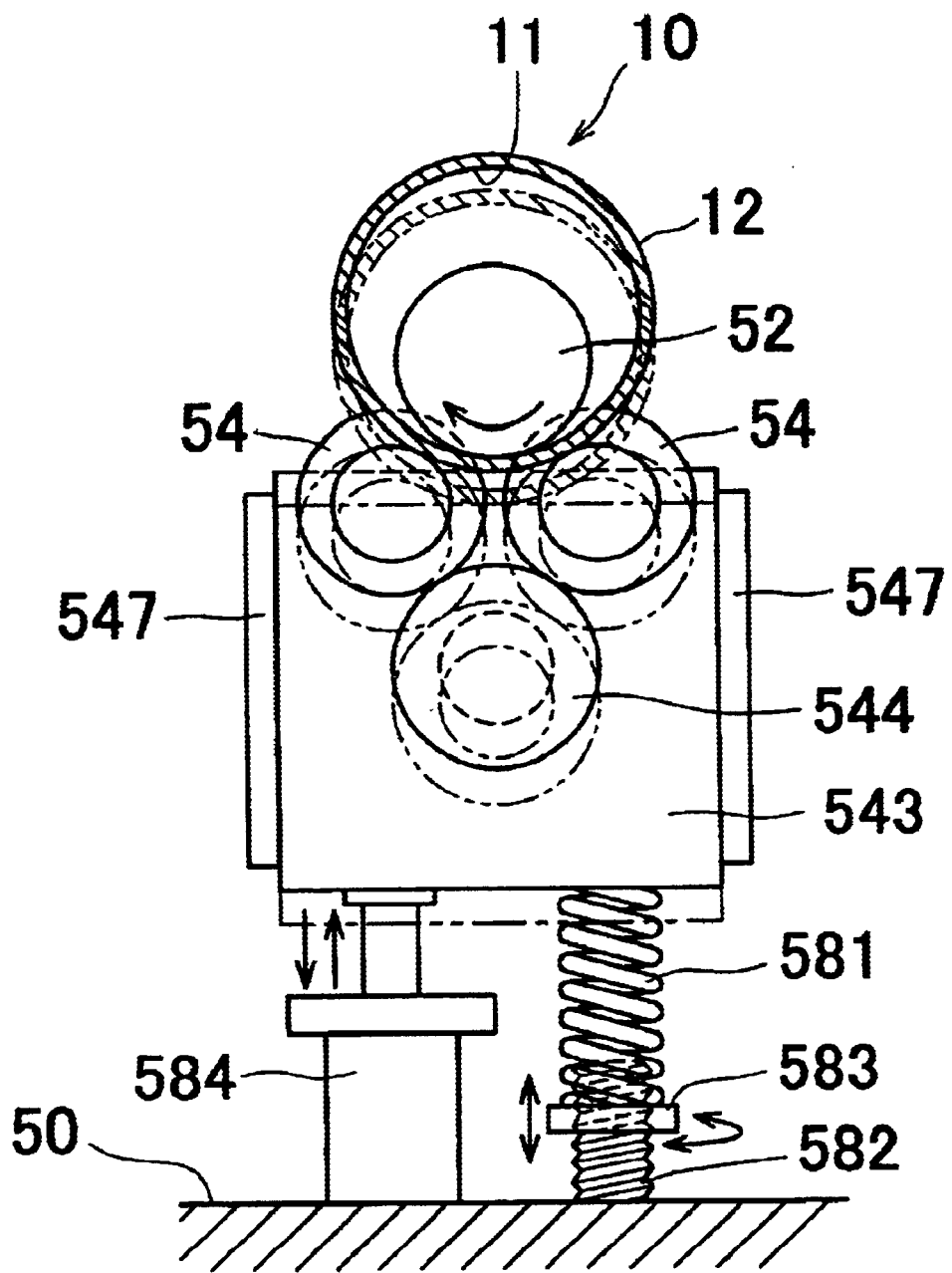
FIG. 29 is a side view showing a supporting form of supporting rollers according to a fourth embodiment.

FIG. 29 is a side view showing the supporting status of the supporting rollers according to the fourth embodiment.

As shown in FIG. 29, in this fourth embodiment, supporting rollers 54 and 54 are attached to the supporting roller support member 543. The sliding direction of this support member 543 is restricted to the up-and-down direction of the movement direction restriction rails 547 and 547.

This supporting roller support member 543 is urged upward by the elastic member 581, such as a spring, which supports the weight of the supporting roller support member 543 and the supporting rollers 54 and 54, etc. moved up and down together with the support member 543. That is, the elastic member 581 functions as a weight supporting means for supporting the weight of the supporting roller support member 543 and members moved up and down together with the support member 543.

In the state of being supported by the elastic member 581, the supporting roller support member 543 is situated at the standby position where the internal peripheral surface 11 of the tubular body 10 supported by the supporting rollers 54 is apart from the reference roller 52.

This elastic member 581 is in contact with the supporting roller support member 543 at the upper end portion, and is engaged with the engaging member 583 screwed on the spring supporting shaft 582 on the main base 50 at the lower end portion. This engaging member 583 can be adjusted in the height position by adjusting the screwed amount with respect to the spring supporting shaft 582, enabling the adjustment of the lower end position of the elastic member 581 or the height position of the supporting rollers 54 and 54. That is, this engaging member 583 functions as a height position adjusting means of the supporting roller support member 543. Because of this structure, even in cases where the size, etc. of the tubular body 10 as a shape measuring object and/or the supporting rollers 54 is changed, the height position of the supporting roller support member 543 can be adjusted appropriately.

Provided under the supporting roller support member 543 is an air cylinder 584 for lifting the supporting roller support member 543 up to the measuring position where the tubular body 10 on the supporting rollers 54 and 54 comes into contact with the reference roller 52 and further pressing the tubular body 10 against the reference roller 52 at a prescribed pressure. That is, the air cylinder 584 functions as a pressing force giving means.

According to the shape measuring apparatus of the fourth embodiment, like the aforementioned third embodiment, since the weight of the supporting roller support member 543 and members moved upward and downward together with the support member 543 can be received by the elastic member 581, the air cylinder 584 can simply undertake the pressing force for pressing the tubular body 10 against the reference roller 52 via the supporting rollers 54 and 54. This enables the accurate setting/controlling of the contact pressure between the tubular body 10 and the reference roller 52 to attain high reliability on the shape measurement.

Although the fourth embodiment was explained, the present invention is not limited to the above. Like the aforementioned first to third embodiments, various modifications can be made as follows.

(1) Although a spring is exemplified as the elastic member in the fourth embodiment, any member such as a plate spring or rubber can be employed as along as it exerts resilient force.

[Fifth Embodiment]

Next, the fifth embodiment will be explained.

In this fifth embodiment, although the same mechanical structure as in the aforementioned third embodiment is equipped, the pressing force for pressing the tubular body 10 on the supporting rollers 54 and 54 against the reference roller 52 is generated by the weight 574 in place of the air cylinder 576.

Hereinafter, the difference between this embodiment and the aforementioned embodiment will be explained, and therefore, cumulative explanation will be omitted by allotting the same reference numeral to the corresponding portion.

In this fifth embodiment, in the structure shown in FIG. 28, the weight and the position of the weight 574 are set such that the moment about the supporting shaft 572 by the weight 574 becomes larger than that by the supporting roller support member 543 in the state in which the air cylinder 576 is not driven. In this state, the tubular body 10 on the supporting rollers 54 and 54 is pressed against the reference rollers 52 and 52 at a prescribed pressure. That is, in the fifth embodiment, the swing member 571 and the weight 574 urge the supporting roller support member 543, etc. upward, and functions as a pressing means for pressing the tubular body 10 against the reference roller 52 via the supporting rollers 54 and 54 at a prescribed pressure.

On the other hand, the air cylinder 576 moves the supporting roller support member 543 downward to the standby position at the time of setting the tubular body 10 on the supporting rollers 54 and 54 and taking out the tubular body 10 after the shape measurement. That is, in the fifth embodiment, this air cylinder 576 functions as a downward driving means for moving the supporting roller support member 543 against the force for urging the supporting roller support member 543 upward by the weight 574.

Furthermore, in this fifth embodiment, the screw portion 575 for adjusting the position of the weight 574 functions as a urging force adjusting means for adjusting the urging force for urging the supporting roller support member 543 upward. This enables appropriate adjusting of the pressing force for pressing the tubular body 10 against the reference rollers 52 and 52.

In this structure, the pressing force for pressing the tubular body 10 against the reference roller 52 is given not by a positively driving means such as an air cylinder 576 but by a pressing means which automatically generates the pressing force by the swing member 571 and the weight 574. Therefore, the contact pressure between the tubular body 10 and the reference roller 52 can be set accurately in advance, resulting in high reliability on the shape measurement.

<Modified Embodiments>

Although the fifth embodiment was explained, the present invention is not limited to the above. Like the aforementioned first to fourth embodiments, various modifications can be made as follows.

(1) Although the downward driving means is constituted by an air cylinder in the aforementioned fifth embodiment, it can be constituted by various actuators, such as a hydraulic cylinder or an electric motor using electric power.

[Sixth Embodiment]

Next, the sixth embodiment will be explained.

In this sixth embodiment, although the same mechanical structure as in the aforementioned fourth embodiment is equipped, the pressing force for pressing the tubular body 10 on the supporting rollers 54 and 54 against the reference roller 52 is generated by the elastic member 581 in place of the air cylinder 584.

Hereinafter, the difference between this embodiment and the aforementioned embodiment will be explained, and therefore, cumulative explanation will be omitted by allotting the same reference numeral to the corresponding portion.

In this sixth embodiment, in the structure shown in FIG. 29, the elastic member 581 is set to generate the urging force for pressing the tubular body 10 on the supporting rollers 54 and 54 against the reference roller 52 at a prescribed pressure in the state in which the air cylinder is not driven. That is, in the sixth embodiment, the elastic member 581 functions as a pressing means for urging the supporting roller support member 543 upward and pressing the tubular body 10 against the reference roller 52 via the supporting rollers 54 and 54 at a prescribed pressure.

On the other hand, the air cylinder 584 moves the supporting roller support member 543 downward to the standby position at the time of setting the tubular body 10 on the supporting rollers 54 and 54 and taking out the tubular body 10 after the shape measurement. That is, in the sixth embodiment, this air cylinder 584 functions as a downward driving means for moving the supporting roller support member 543 against the force for urging the supporting roller support member 543 upward by the elastic member 581.

Furthermore, in this sixth embodiment, the engaging portion 583 for adjusting the lower position of the elastic member 581 functions as an urging force adjusting means for adjusting the urging force for urging the supporting roller support member 543 upward. This enables appropriate adjusting of the pressing force for pressing the tubular body 10 against the reference rollers 52 and 52.

In this structure, the pressing force for pressing the tubular body 110 against the reference roller 52 is given not by a positively driving means such as an air cylinder 584 but by a pressing means which automatically generates the pressing force by the elastic member 581. Therefore, the contact pressure between the tubular body 10 and the reference roller 52 can be set accurately in advance, resulting in high reliability on the shape measurement.

<Modified Embodiments>

Although the sixth embodiment was explained, the present invention is not limited to the above. Like the aforementioned first to fifth embodiments, various modifications can be made as follows.

(1) Although the downward driving means is constituted by an air cylinder in the aforementioned sixth embodiment, it can be constituted by various actuators, such as a hydraulic cylinder or an electric motor using electric power.

[Seventh Embodiment]

Next, the seventh embodiment will be explained.

Although the elastic member 581 and the air cylinder 584 are disposed in parallel in the sixth embodiment (FIG. 29), in this seventh embodiment, the elastic member 591 and the air cylinder 594 are disposed in series.

Hereinafter, the difference between this embodiment and the aforementioned embodiment will be explained, and therefore, cumulative explanation will be omitted by allotting the same reference numeral to the corresponding portion.

Figure 30:
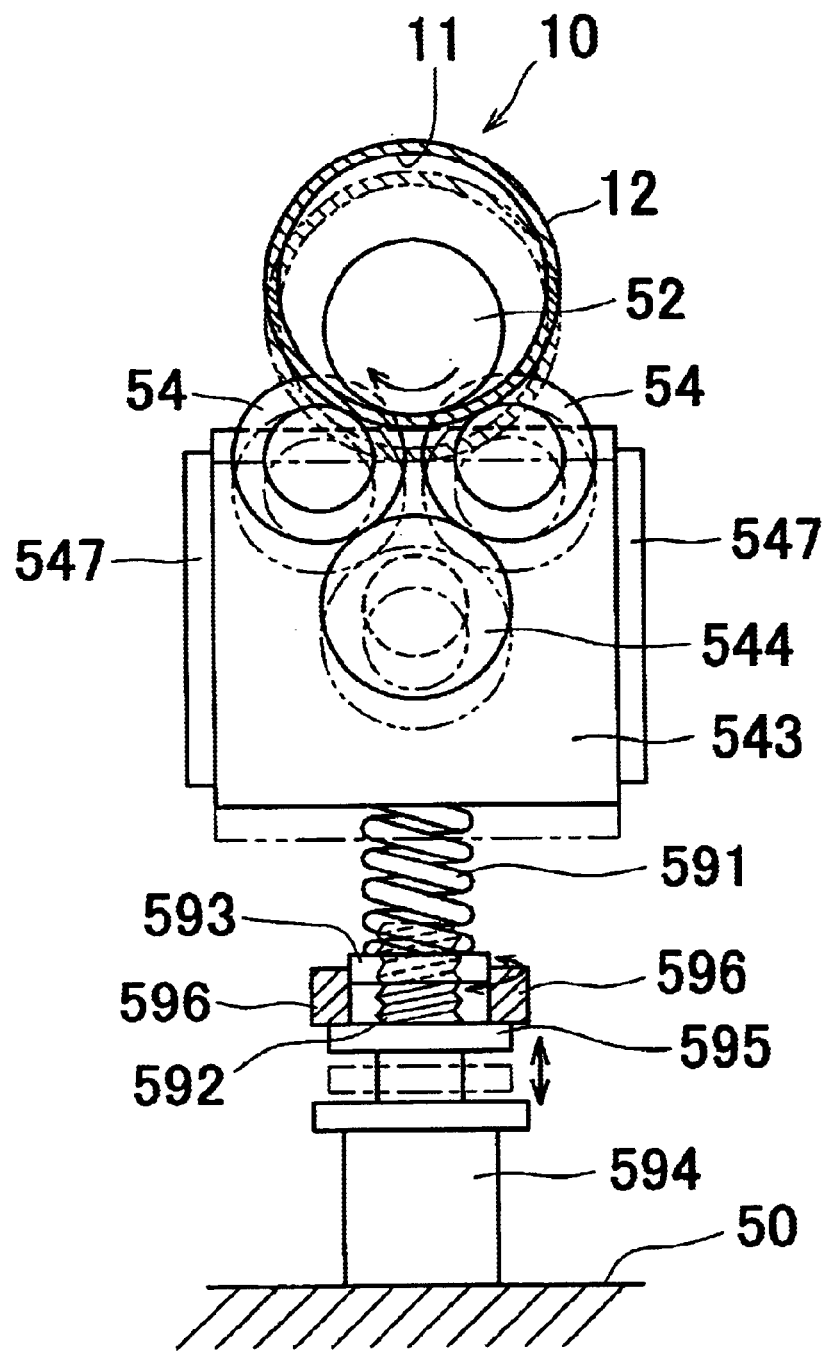
FIG. 30 is a side view showing a supporting form of supporting rollers according to a seventh embodiment.

FIG. 30 is a side view showing the supporting status of the supporting rollers in the shape measuring apparatus according to the seventh embodiment.

As shown in FIG. 30, in this seventh embodiment, supporting rollers 54 and 54 are attached to the supporting roller support member 543. The sliding direction of this support member 543 is restricted to the up-and-down direction of the movement direction restriction rails 547 and 547.

This supporting roller support member 543 is supported by the air cylinder 594 installed on the main base 50 via the elastic member 591 such as a spring.

This air cylinder 594 is provided with a spring supporting shaft 592 at its operational end portion. An engaging member 593 is screwed on the screw-thread formed in the spring supporting shaft 592. The lower end of this elastic member 591 is fixed to this engaging member 593.

This engaging member 593 can be adjusted in height position by adjusting the screwed amount to the spring supporting shaft 592. This enables the adjustment of the lower end position of the elastic member 591 with respect to the operational end portion 595 of the air cylinder 594.

The air cylinder 594 moves the supporting roller support member 543 up and down via the elastic member 591 between the measuring position where the tubular body 10 on the supporting rollers 54 and 54 comes into contact with the reference roller 52 and the standby position where the tubular body 10 is away from the reference roller 52. In the state in which the supporting roller support member 543 has reached the measuring position, the air cylinder 594 further pushes up the operational end portion 595 to thereby press the tubular body 10 against the reference roller 52 at a prescribed pressing force. That is, the air cylinder 594 functions an elevating means.

The operational end portion 595 of the air cylinder 594 comes into contact with a stopper 596 provided at a predetermined height position so as not to exceed a predetermined upper limit height position. The engaging member 593 for adjusting the lower end height position of the elastic member 591 with respect to the operational end portion 595 is adjusted such that the urging force of the elastic member 591 generates a predetermined pressing force for pressing the tubular body 10 against the reference roller 52 when the operational end portion 595 is in contact with the stopper 596. That is, this engaging member 593 functions as an urging force adjusting means by the elastic member 591.

In this shape measuring apparatus according to the seventh embodiment, the pressing force for pressing the tubular body 10 against the reference roller 52 is given not by a positively driving means such as an air cylinder 594 but by the elastic member 591 which automatically generates the pressing force. The urging force of this elastic member 591 can be set to an appropriate value by the engaging member 593 in advance, enabling the contact pressure between the tubular body 10 and the reference roller 52 to be set accurately, which in turn results in high reliability on the shape measurement.

In this seventh embodiment, the urging force of the elastic member 591 is adjusted by adjusting the height position of the engaging member 593. However, the urging force can be adjusted by adjusting the height position of the stopper 596 which sets the upper limit of the lifting operation of the air cylinder (lifting means) 594.

<Modified Embodiments>

Although the seventh embodiment was explained, the present invention is not limited to the above. Like the aforementioned first to sixth embodiments, various modifications can be made as follows.

(1) Although the lifting means is constituted by an air cylinder in the aforementioned seventh embodiment, it can be constituted by various actuators, such as a hydraulic cylinder using an oil pressure or an electric motor using electric power.

[Eighth Embodiment]

Next, the eighth embodiment will be explained.

In the following explanation, the difference between this embodiment and the aforementioned embodiment will be explained, and therefore, cumulative explanation will be omitted by allotting the same reference numeral to the corresponding portion.

Figure 31:
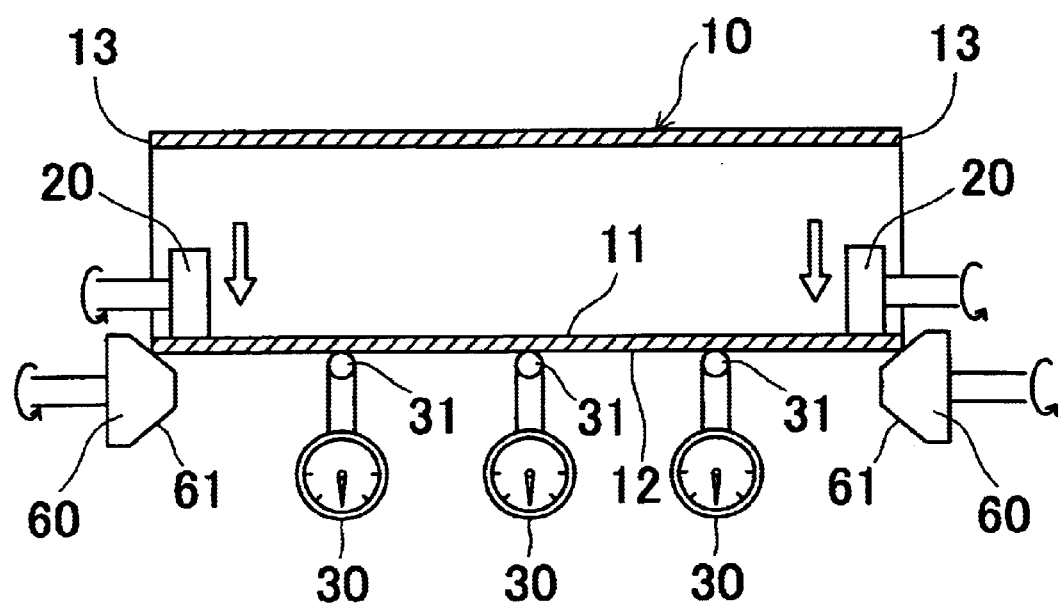
FIG. 31 is a front cross-sectional view showing a supporting form of a tubular body according to an eighth embodiment.

FIG. 31 is a front cross-sectional view showing the supporting status of the tubular body according to the eighth embodiment.

In this eighth embodiment, each supporting roller 60 is formed to have a tapered surface 61 at the external peripheral surface, so that the tapered surface 61 comes into contact with the end portion of the tubular body 10.

Thus, while supporting the tubular body 10, each supporting roller 60 does not almost come into contact with the external peripheral surface 12 of the tubular body 10 except for the vicinity of the external end portion, causing no damage on the external peripheral surface of the tubular body 10. Accordingly, even if the tubular body is a photosensitive drum substrate with an external peripheral surface 12 used as a photosensitive layer, the shape measurement can be performed without causing no damage on the external peripheral surface 12 of the tubular body 10.

Furthermore, since the supporting rollers 60 come into contact with both end portions 13 and 13 of the tubular body 10, any possible burr remained on the end face of the tubular body 10 will be removed, resulting in high accuracy. Furthermore, this shape measuring apparatus 5 can be functioned as a burr removing processing apparatus.

Although the eighth embodiment was explained, the present invention is not limited to the above. Like the aforementioned first to seventh embodiments, various modifications can be made.

[Ninth Embodiment]

Next, the ninth embodiment will be explained.

A tubular body 10 such as a photosensitive drum substrate will be used in a state in which a flange 80 with a sufficiently accurate circular shape is forcibly inserted as shown in FIG. 4, and therefore, in many cases, the cross-sectional shape of each end portion of the tubular body 10 will be corrected at the time of the actual case.

In view of the circumstances, in the ninth embodiment, the shape of the tubular body 10 is measured while temporarily correcting the shape of each end portion of the tubular body 10 to thereby grasp the shape of the tubular body in a condition similar to the actual condition in use.

In the following explanation, the difference between this embodiment and the aforementioned embodiment will be explained, and therefore, cumulative explanation will be omitted by allotting the same reference numeral to the corresponding portion.

Figure 32:
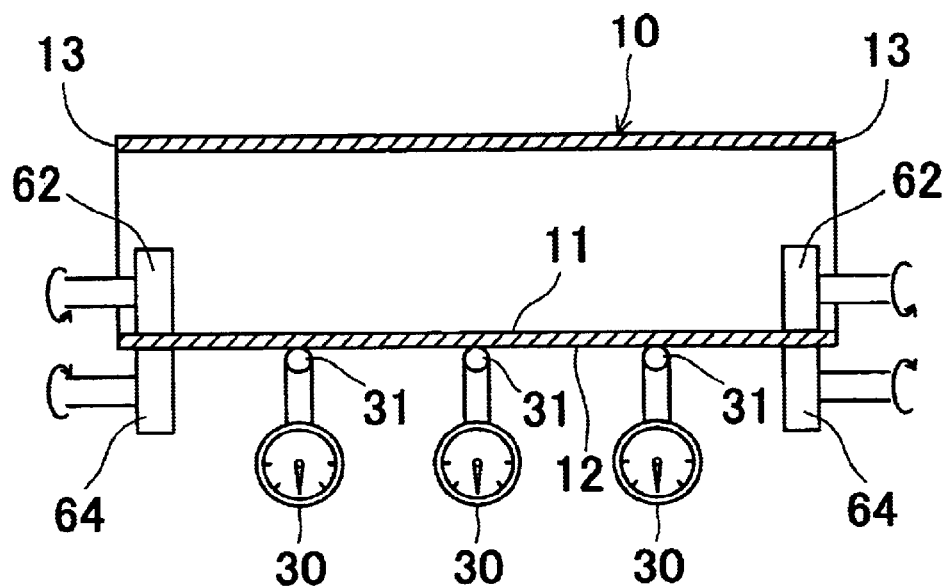
FIG. 32 is a concept view for explaining a method for measuring a shape of tubular body according to a ninth embodiment.
Figure 33:
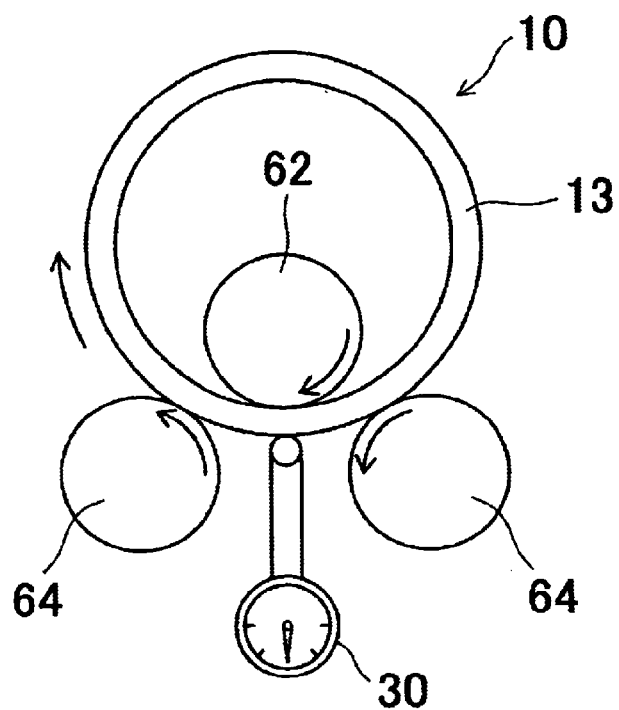
FIG. 33 is a side view thereof.

FIG. 32 is a schematic view for explaining a shape measuring method of a tubular body according to the ninth embodiment, and FIG. 33 is a side view thereof.

As shown in FIGS. 32 and 33, in the shape measuring method of a tubular body according to the ninth embodiment, each of the end portions 13 and 13 of the tubular body (work) 10 is corrected by an inner correcting roller 62 and an outer correcting roller 64, and the radial displacement of the external peripheral surface 12 of the tubular body 10 rotating while being corrected is detected by displacement detecting devices 30.

<Correcting Roller>

At the time of performing the shape measurement, the inner correcting roller 62 and the outer correcting rollers 64 are brought into contact with the internal peripheral surface 11 of the end portion 13 of the tubular body and the external peripheral surface 12 to temporarily correct the cross-sectional shape of the end portion 13 of the tubular body 10.

The inner correcting roller 62 is disposed at each end of the tubular body 10, and therefore, a total of two inner correcting rollers are disposed. Two outer correcting rollers 64 are disposed at each end of the tubular body 10, and therefore, a total of four inner correcting rollers are disposed.

Two outer correcting rollers 64 and 64 disposed at each end portion of the tubular body 10 stabilize the position of the axis of the tubular body 10 and the posture of the tubular body 10, enabling the correction of the cross-sectional shape of each end portion of the tubular body 10 with high degree of accuracy. Furthermore, this enables the tubular body 10 to be supported stably.

Furthermore, the tubular body 10 is pinched by and between the inner correcting rollers 62 and the outer correcting rollers 64 and 64 from the inside thereof and the outside, enabling steady holding of the tubular body 10.

Furthermore, since the inner correcting roller 62 and the outer correcting rollers 64 are disposed at the inside of the tubular body 10 and the outside, respectively, correcting force can be given to the tubular body 10 while closely disposing these rollers. In this embodiment, the inner correcting roller 62 and the outer correcting rollers 64 and 64 are disposed at the lower half region of the tubular body 10 falling within the angle of 90 degrees or less. Therefore, the inner correcting roller 62 and the outer correcting rollers 64 and 64 are positioned firmly, enabling each end portion of the tubular body 10 to be corrected accurately.

The inner correcting roller 62 and the outer correcting rollers 64 and 64 are in contact with the inner peripheral surface 11 of the tubular body 10 and the outer peripheral surface 12, respectively, at different circumferential positions of the tubular body 10. Concretely, the inner correcting roller 62 is positioned between the outer correcting rollers 64 and 64. Since the inner correcting roller 62 and the outer correcting rollers 64 are disposed at different circumferential positions within a narrow region in the circumferential direction of the tubular body 10 as mentioned above, correcting force is given to the tubular body 10 effectively, enabling accurate shape correction.

The portions of the tubular body 10 to which the inner correcting roller 62 and the outer correcting rollers 64 and 64 contact are portions of the internal peripheral surface 11 and the external peripheral surface 12 corresponding to the portions (hatched region S in FIG. 4) supported by the flange 80 when the tubular body 10 is actually used. Thus, the inner correcting roller 62 and the outer correcting rollers 64 are configured to correct the shape of the portion expected to be corrected by the flange 80 when the tubular body 10 is actually used.

In the inner correcting roller 62 and the outer correcting roller 64 and 64, the external cylindrical peripheral surfaces thereof come into line-contact with the internal peripheral surface 11 of the tubular body 10 and the external peripheral surface 12, respectively, causing the contact pressure by the inner correcting roller 62 and the outer correcting rollers 64 to be dispersed to thereby prevent local deformations of the tubular body 10.

The relative positional relationship between the inner correcting roller 62 and the outer correcting rollers 64 is set such that these rollers are disposed at correcting positions for correcting the cross-sectional shape of the end portion 13 of the tubular body 10.

In this embodiment, the correcting positions are positions where the outer correcting rollers 64 and the inner correcting rollers 62 are slightly in contact with the external peripheral surface 12 and the internal peripheral surface 11 of the end portion of the tubular body 10, provided that the cross-sectional shape of the end portion of the tubular body 10 is appropriate. Therefore, if the cross-sectional shape of the end portion 13 of the tubular body 10 is inappropriate, correction force will be applied to the tubular body 10 by the outer and inner correcting rollers 62 and 64.

At this time, each end portion 13 of the tubular body 10 is temporarily corrected in its cross-sectional shape by the inner and outer correcting rollers 62 and 64 each fixed at the correcting position. This deformation of each end portion of the tubular body 10 due to the temporary correction includes an elastic deformation (may be an elastic deformation only), a certain amount of the deformation will be released when the contact state with the inner and outer correcting rollers 62 and 64 is released.

[Examples of Shape Measurements]

Next, concrete tubular body shapes will be exemplified, and the following explanation will be directed to the case in which the advantages of the method of measuring a shape of a tubular body according to the ninth embodiment.

<Tubular Body with Flat Ends>

Figure 34:
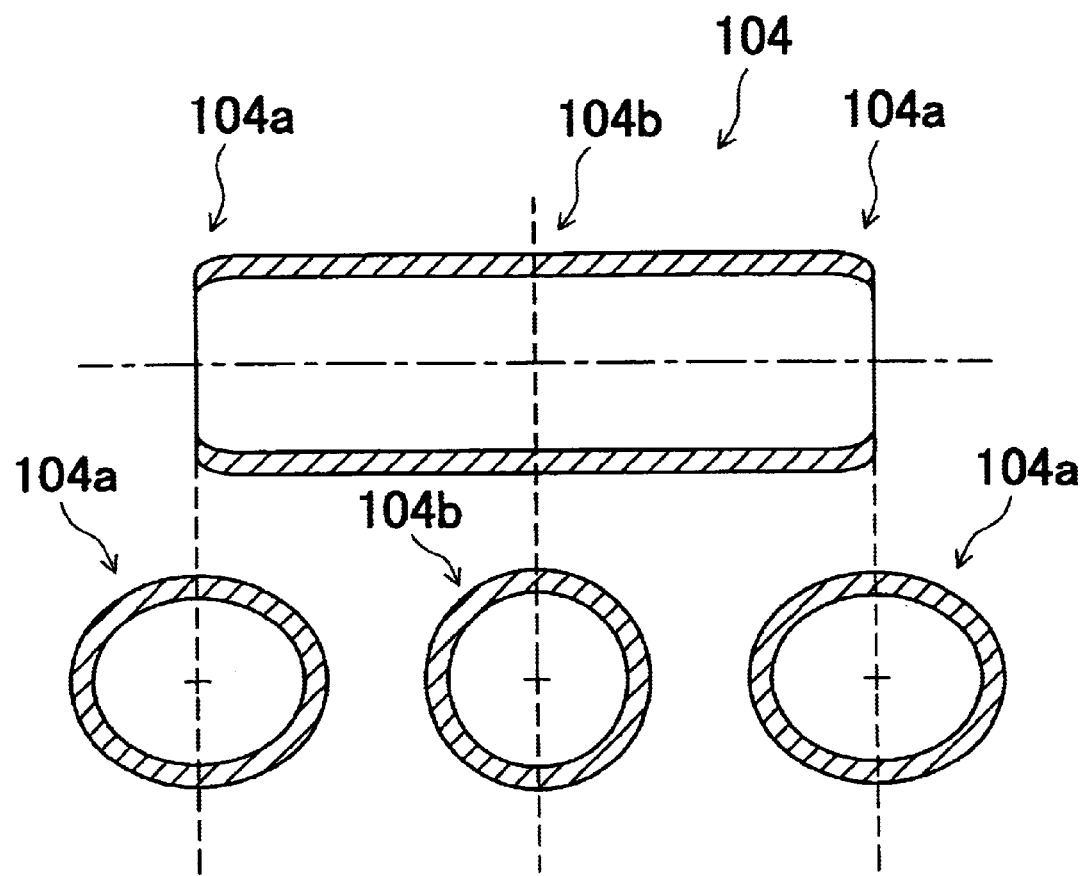
FIG. 34 is an explanatory view showing a tubular body 104 in which a central portion 104b has an appropriate perfect circular cross-sectional shape but both end portions 104a and 104a have a flat cross-sectional shape respectively.

As shown in FIG. 34, in the tubular body 104 according to the first example, the central portion 104b is formed into a perfect circular cross-sectional shape, but each end portion 104a is formed into a flat cross-sectional shape.

The aforementioned shape tends to be generated at the time of cutting a long tubular body 104 substrate formed by extrusion or the like as mentioned above into a certain length for manufacturing photosensitive drum substrates or the like for example.

In the case of such a shape in which both end portions 104a and 104a are formed into a flat shape respectively, when the shape is measured in accordance with a conventional method as shown, for example, in FIGS. 56 and 57, both end portions 104a and 104a to be supported will move up and down as the tubular body 14 rotates. This in turn causes the lower external peripheral surface of the longitudinal central portion of the tubular body 104 to be moved up and down. As a result, it is judged that the shape is far from the perfect cylindrical shape. In the case of a shape inspection with a certain acceptance level, there is a high possibility that it is judged as a defective item.

In some cases, however, when flanges 80 and 80 are forcibly inserted into both ends of the tubular body in the actual use as shown in FIG. 4, both end portions 104a and 104a of a tubular body 104 may be corrected into a perfect circular shape respectively, which resolves the shape defect. Thus, in such cases, it becomes a perfect cylindrical shape in the actual use, causing no problem. On the other hand, in another cases, even if flanges are forcibly inserted at the time of the actual use, a perfect cylindrical shape may not be obtained. Such a tubular body is a true defect item. In a conventional shape measuring method, such a discrimination was impossible, and therefore there is a possibility that an item to be discriminated as a good item is discriminated as a defect item.

To the contrary, in the shape measuring method according to the ninth embodiment, the shape measurement of the tubular body 104 is performed while reproducing a shape of both end portions 104a and 104a of the tubular body 104 similar to that in the actual use by temporarily correcting them. Accordingly, even if the tubular body 104 has a false defect which will be dissolved at the time of actually being used at the vicinities of both end portions, it is possible to obtain a shape measuring result including a discrimination on whether the false defect is a permanent defect which will remain even in the actual use.

As a result, an accurate shape measurement of a tubular body which had no choice but to be discriminated as a defect item in a conventional method can be performed, resulting in a perfect shape measuring result.

<Tubular Body Flat in Cross-section Along Entire Length>

Figure 35A:
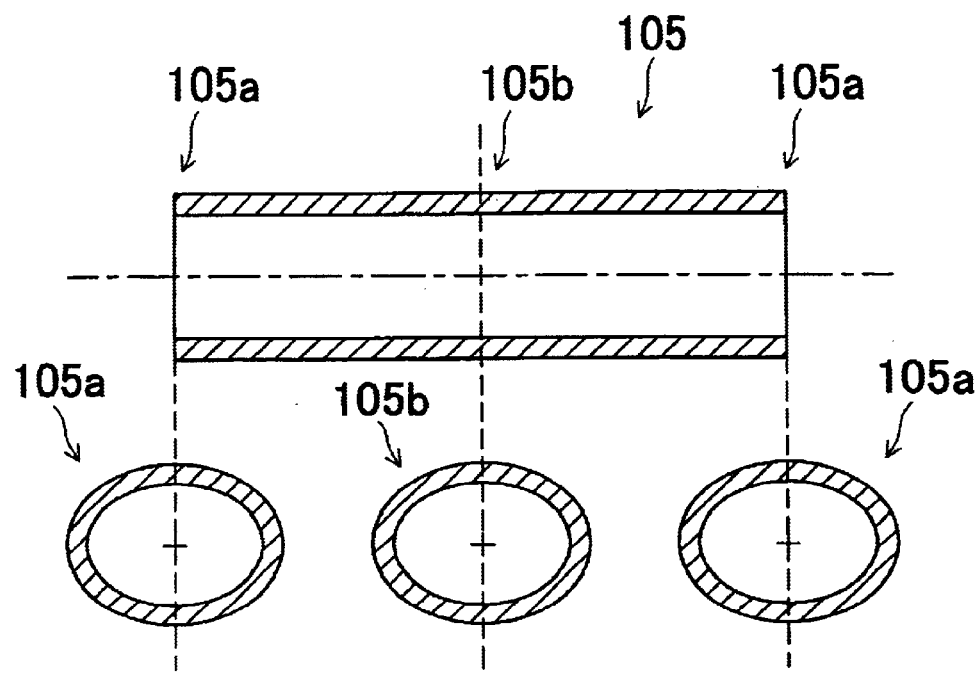
FIG. 35A is an explanatory view showing a tubular body 105 in which the cross-sectional shape is constant along the entire length but not perfect circular.

As shown in FIG. 35A, the tubular body 105 as a second example is constant in cross-section along the entire length thereof, but the cross-sectional shape is not a perfect circular shape. Here, it is assumed that the cross-sectional shape is an elliptical shape formed by being pressed from the up-and-down direction or from the right-and-left direction.

This shape tends to be generated at the time of manufacturing the tubular body 105 as a long tube by an extruding method or a drawing method.

In the case of the shape deformed into a flat cross-section along the entire length of the tubular body 105, the conventional shape measuring method as shown in FIGS. 56 and 57 tends to judge the shape to be a normal cylindrical tubular shape. That is, although the tubular body 105 to be rotated with its both end portions 105a and 105a supported moves up and down depending on the rotational phase, the lower external peripheral surface of the longitudinal central portion would hardly change in height position, causing the deflection to hardly be detected. Thus, In the case of a shape inspection with a certain acceptance level, there is a high possibility that it is judged to be a good item.

Figure 35B:
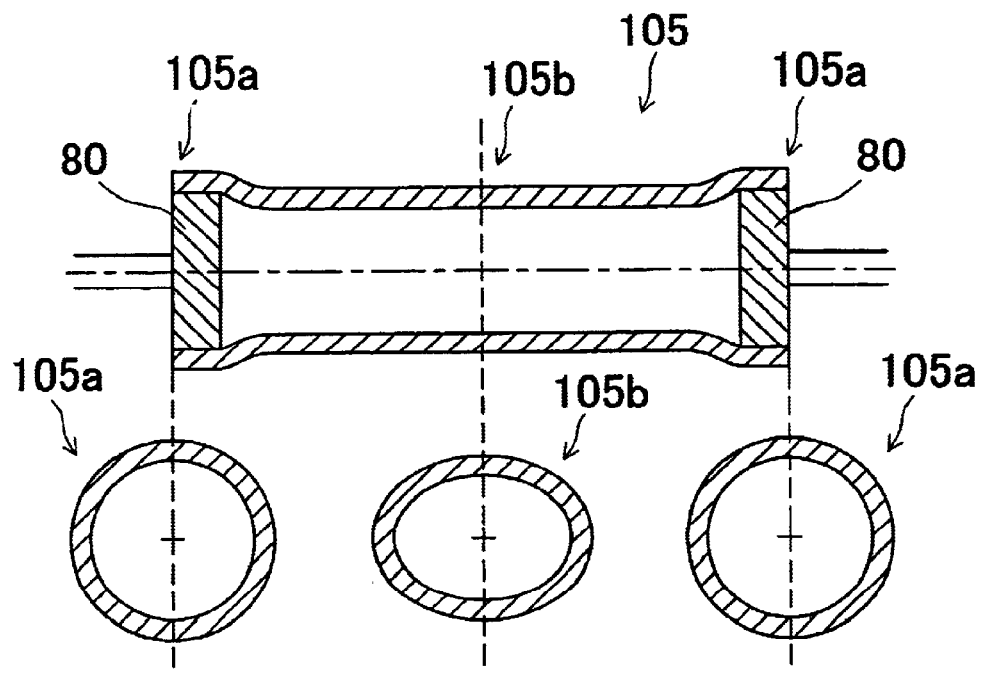
FIG. 35B is an explanatory view showing the tubular body 105 in actual use in which flanges 80 and 80 are inserted into both end portions 105a and 105a of the tubular body 105.

In such a tubular body 105, even if both end portions thereof are corrected into a perfect circular shape respectively by forcibly being inserted by flanges 80 and 80 at the time of the actual use, as shown in FIG. 35B, the longitudinal central portion 105b of the tubular body 105 remains the flat cross-sectional shape. Thus, such a tubular body 105 may be a defective tube which causes large deflections at the time of the actual use.

To the contrary, in the shape measuring method according to the ninth embodiment, the shape measurement of the tubular body 105 is performed while reproducing a shape of both end portions 105a and 105a of the tubular body 105 similar to that in the actual use by temporarily correcting them. Accordingly, even if the tubular body 105 has a shape defect difficult to be detected as shown in FIGS. 35A and 35B, it is possible to obtain a shape measuring result including a discrimination on whether the defect is a permanent defect which will remain even in the actual use.

As a result, an accurate shape measurement of a tubular body which had no choice but to be discriminated as a defect item in a conventional method can be performed, resulting in a perfect shape measuring result.

(Concrete Example)

Although the ninth embodiment was explained conceptually, the ninth embodiment can be constituted by almost the same mechanical structure as that of the aforementioned second embodiment.

Figure 36:
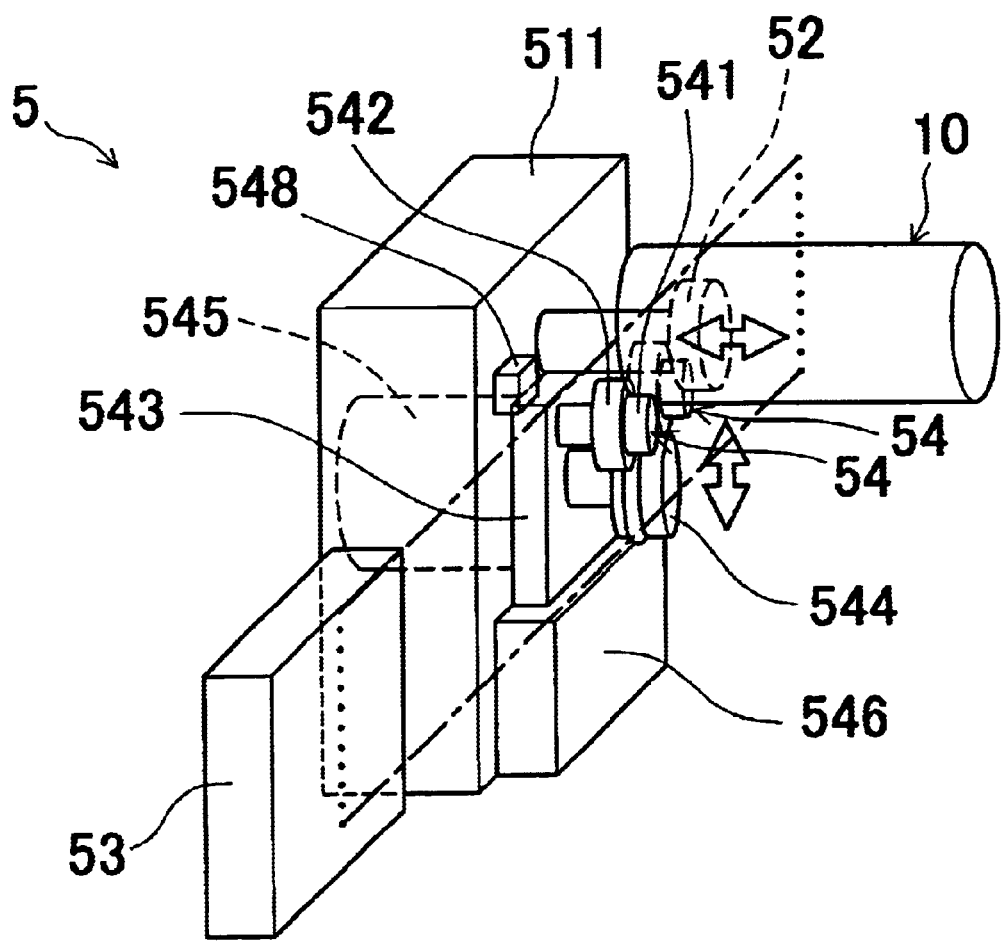

FIG. 36 is an enlarged perspective view showing the supporting structure of a tubular body in the case where the ninth embodiment is structured by almost the same mechanical structure as that of the second embodiment.

In this case, the pair of reference rollers 52 and 52 in the second embodiment correspond to the inner correcting rollers, and the supporting rollers 54 correspond to the outer correcting rollers.

Each supporting roller support member (outer correcting roller support member) 543 is configured so as to be brought into contact with the stopper 548 fixed to the device box 511 at the upper limit of the slide operation by the lifting cylinder 546. The position of the stopper 548 is set such that the relative positional relationship between the outer correcting rollers (supporting rollers) 54 and the inner correcting roller (reference roller) 52 meets the correcting position for correcting the cross-sectional shape of the end portion 13 of the tubular body 10 when the supporting roller support member 543 is brought into contact with the stopper 548.

The lifting cylinder 546 lifts the tubular body 10 together with the supporting roller support member 543 and the outer correcting rollers 54 and presses the supporting roller support member 543 against the stopper 548 with a large enough pressing force, to thereby fix the position of the outer correcting roller 54 to the correcting position. As mentioned above, since the position of the outer correcting roller 54 is fixed to the correcting position, no complicated control is required for the shape correction of the end portions 13 and 13 of the tubular body 10.

The correcting position of the outer correcting rollers 54 and the inner correcting roller 52 is a position where the outer correcting rollers 54 and the inner correcting roller 52 are just in contact with the external peripheral surface 12 and the internal peripheral surface 11 of the end portion 13 of the tubular body 10 in the case where the cross-sectional shape of each of both end portions of the tubular body 10 is appropriate. In other words, in the case where the cross-sectional shape of each of both end portions of the tubular body 10 is inappropriate, a correcting force is applied to the tubular body 10 by the outer correcting rollers 54 and the inner correcting roller 52.

The displacement detecting device 53 is a device for detecting the radial displacement of the external peripheral surface 12 of the tubular body 10. Here, a non-contact type detecting devices are installed at five positions different in axial directional position of the tubular body 10.

<Modified Example>

Although the ninth embodiment was explained, the present invention is not limited to the above. Like the aforementioned first to eighth embodiments, various modifications can be made as follows.

(1) In the aforementioned ninth embodiment, the outer correcting rollers are fixed to the correcting positions when the shape measurement is performed while correcting the tubular body 10. However, some of the correcting rollers can be unfixed so that the pressing force of the inner correcting roller 62 or the outer correcting rollers 64 can be changed depending on the rotational phase of the tubular body 10 to correct the shape of the end portion of the tubular body 10. Concretely, for example, a larger pressing force (correcting force) can be given to a portion having a cross-sectional shape away from an appropriate perfect circular shape, while smaller pressing force or no pressing force can be given to a portion having a cross-sectional shape similar to a perfect circular shape.

Alternatively, the cross-sectional shape of each end portion of the tubular body 10 can be actually detected, and the pressing force (correcting force) against the tubular body 10 can be changed depending on the detected concrete cross-sectional shape.

The detection of the cross-sectional shape of each end portion 13 of this tubular body 10 can be performed before or during the correction. Detecting the cross-sectional shape while correcting each end portion 13 of the tubular body 10 enables an operator to know whether the pressing force (correcting force) is appropriate to the correction of the cross-sectional shape.

As a means for detecting the cross-sectional shape of each end portion of the tubular body 10, a displacement detecting device for detecting the radial displacement of the external peripheral surface of the tubular body 10 can be used.

Figure 37:
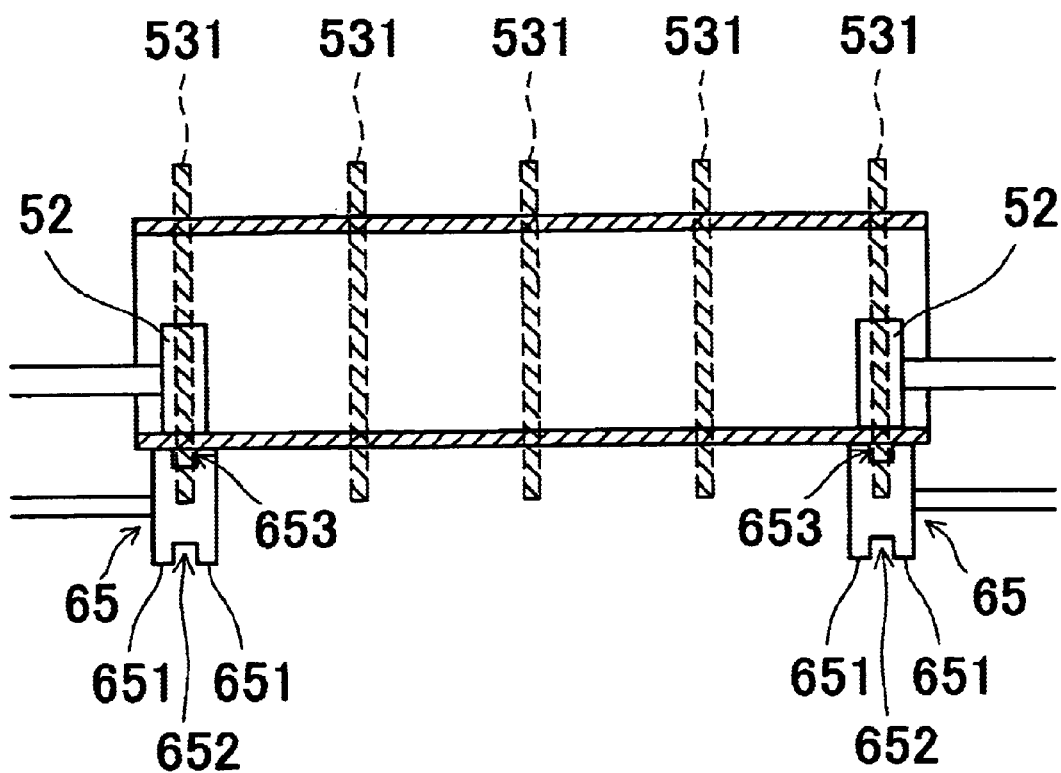
FIG. 37 is a front cross-sectional view showing a modified embodiment using outer correcting rollers each having a smaller diameter portion 652 forming a gap 653 at the widthwise central portion of the external peripheral surface 651.

In this case, as shown in FIG. 37, it is preferable to employ an outer correcting roller 65 with a small diameter portion 652 forming a groove 653 at the widthwise central portion of the external peripheral surface 651 and pass a laser beam from an optical transmission type displacement detecting device through the gap. This enables a detection of the cross-sectional shape being corrected by and between the inner correcting roller 52 and the outer correcting rollers 65.

(2) In the aforementioned ninth embodiment, although one inner correcting roller and two outer correcting rollers are disposed at each end of the tubular body 10, positioning of these correcting rollers is not limited to the above, and can be various positions as exemplified below.

Figure 38:
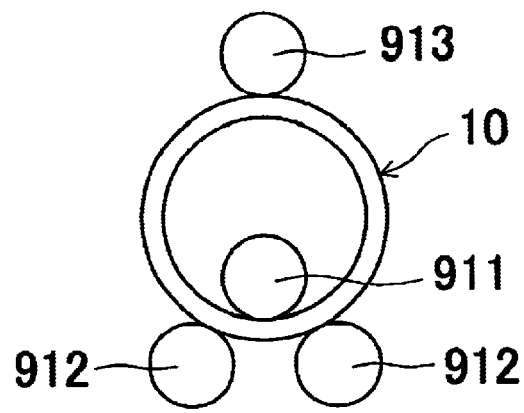
FIG. 38 is a modified embodiment of correcting roller arrangement including one inner correcting roller 911, two outer correcting rollers 912 and 912 disposed at the lower side of the tubular body 10 and an outer correcting roller 913 disposed at the upper side of the tubular body 10.

(2-1) As shown in FIG. 38, in addition to the one inner correcting roller 911 and the two outer correcting rollers 912 and 912 positioned below the tubular body 10 employed in the aforementioned embodiment, an additional outer correcting roller 913 positioned above the tubular body 10 can be employed. In this case, the tubular body 10 is pinched by and between the outer correcting rollers 912, 912 and 913, effectively correcting the elliptical cross-sectional shape of the tubular body.

Figure 39:
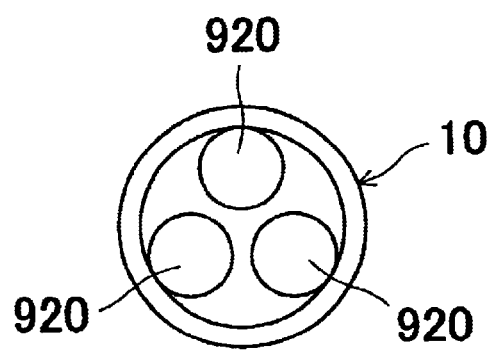
FIG. 39 is a modified embodiment of correcting roller arrangement in which all of the correcting rollers are inner correcting rollers 920.

(2-2) As shown in FIG. 39, all of the correcting rollers can be inner correcting rollers 920.

Figure 40:
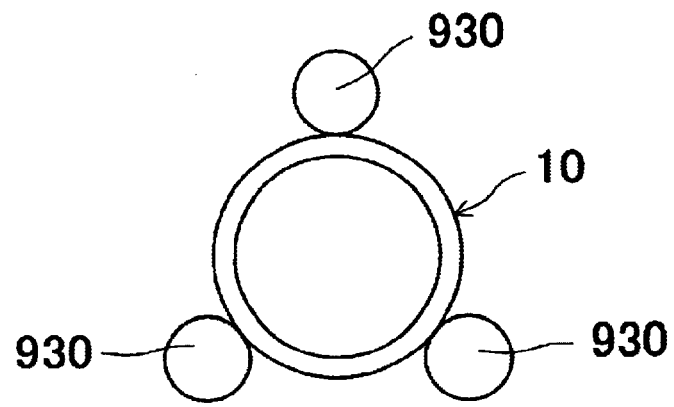
FIG. 40 is a modified embodiment of correcting roller arrangement in which all of the correcting rollers are outer correcting rollers 930.

(2-3) As shown in FIG. 40, all of the correcting rollers can be outer correcting rollers 930.

Figure 41:
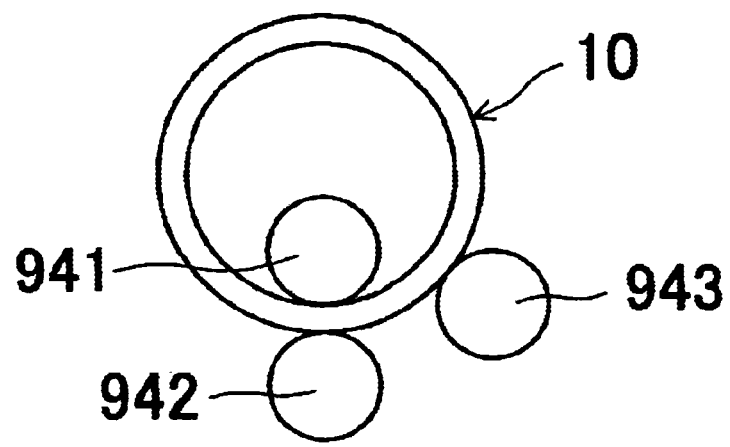
FIG. 41 a modified embodiment of correcting roller arrangement in which an inner correcting roller 941 and an outer correcting roller 942 are disposed at the same circumferential position to hold the tubular body 10 by pinching it from the inside and the outside, and correction is performed by a correcting roller 943 disposed at a position different from the aforementioned circumferential position.

(2-4) As shown in FIG. 41, an inner correcting roller 941 and an outer correcting roller 942 can be placed at the same circumferential position of the tubular body 10 to restrain the tubular body 10 by pinching the tubular body 10 from its inside and outside, and the correction can be performed by another correcting roller 943 disposed at a circumferentially different position.

Figure 42:
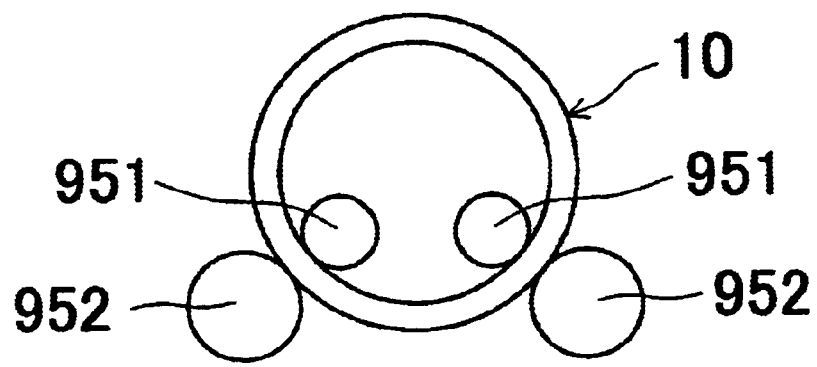
FIG. 42 a modified embodiment of correcting roller arrangement in which a plurality sets each consisting of an inner correcting roller 951 and an outer correcting roller 952 are disposed to hold the tubular body 10 by pinching it from the inside and the outside at different circumferential positions.

(2-5) As shown in FIG. 42, it can be configured such that a plurality of pairs (two pairs in this example) each insisting of an inner correcting roller 951 and an outer correcting roller 952 are disposed at different circumferential positions of the tubular body 10 to restrain the tubular body 10 by pinching the plural circumferential positions thereof. In this case, it is possible to correct any portion of the tubular body having a radius of curvature larger or smaller than an appropriate radius of curvature.

Figure 43:
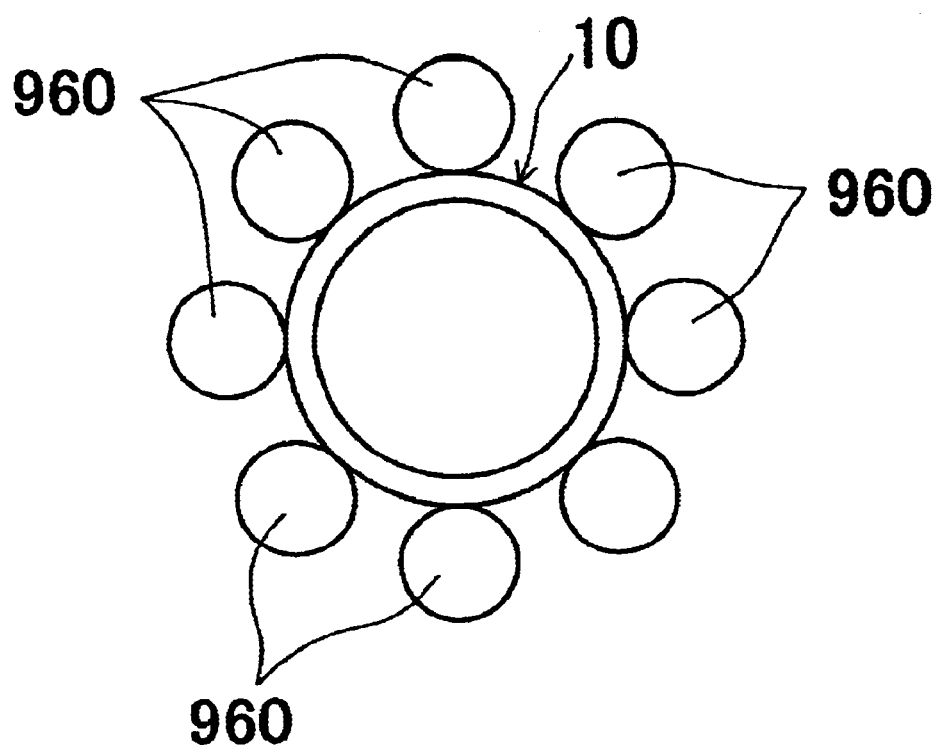
FIG. 43 a modified embodiment of correcting roller arrangement in which a number of correcting rollers 960 in contact with the external peripheral surface of the tubular body 10 are used to correct the tubular body.

(2-6) As shown in FIG. 43, it can be configured such that a number of correcting rollers 960 (eight in this example) are disposed so as to come into contact with the external or internal peripheral surface of the tubular body 10 to correct the shape. Disposing four or more correcting rollers inside or outside the tubular body 10 enables an appropriate correction with respect to a triangular shape.

(3) The correction can be performed such that the degree of deformation caused by the correction of the end portion 13 of the tubular body 10 falls within the elastic deformation range. In this case, reliability that the shape of the tubular body does not change by the shape measurement can be obtained.

(4) In the ninth embodiment, the correcting rollers are brought into contact with the position to be supported at the time of using the tubular body. However, the correcting rollers can be positioned at any end portion of the tubular body near the position to be supported.

(5) In the ninth embodiment, although the shape measurement is performed with the axial direction of the tubular body 10 disposed approximately horizontally, the shape measurement can be performed with the axial direction disposed approximately vertically. In this case, the deformation of the tubular body 10 due to its own weight can be decreased. approximately horizontally, the shape measurement can be performed with the axial direction disposed approximately horizontally. In this case, the deformation of the tubular body 10 due to its own weight can be decreased.

(6) In the ninth embodiment, the displacement was detected at plural positions, but can be one or more positions.

In the ninth embodiment, a photosensitive drum substrate is exemplified as a tubular body to be measured. However, the present invention can be preferably applied to carrying rollers, developing rollers, transferring rollers for use in copying machines. Other than the above, any tubular body can be a measuring object of the present invention.

(8) In the aforementioned ninth embodiment, although a light transmittance type displacement detecting device (light transmittance type optical sensor) which does not come into contact with the tubular body 10 is exemplified as a displacement detecting device, the displacement detecting device is not limited to the above so long as it is possible to detect the radial displacement of the external peripheral surface 12 of the tubular body 10. As a displacement detecting device, it is possible to employ any detecting device based on various measuring principles, such as a contact type displacement sensor which comes into contact with the external peripheral surface of the tubular body 10 to detect the displacement, a reflection optical sensor capable of detecting the displacement in a non-contact state, an all-purpose image processing CCD camera or line camera capable of detecting the displacement in a non-contact state and applicable to any material, a current-type displacement sensor capable of detecting the displacement in a non-contact state and high in accuracy, high in processing speed, strong in environment and cheap in cost, a capacitance-type displacement sensor capable of detecting the displacement in a non-contact state and high in accuracy, an air-type (differential pressure type) displacement sensor capable of detecting the displacement in a non-contact state, or an ultrasonic type displacement sensor capable of performing a long distance measurement.

(9) In the ninth embodiment, the tubular body 10 is rotated by rotatably driving the outer correcting roller 54. However, the tubular body 10 can be rotated by an operator's hand, or by directly contacting a driving roller (not shown) or the like, or by any other method.

(10) In the aforementioned ninth embodiment, the displacement of the external peripheral surface of the tubular body 10 is detected while rotating the tubular body 10. However, the detection of the displacement of the external peripheral surface can be performed by intermittently stopping the rotation of the tubular body 10.

(11) In the aforementioned ninth embodiment, the outer correcting rollers 54 are lifted with the height of the inner correcting roller 52 fixed. However, the inner correcting roller 52 can be moved downward.

[Tenth Embodiment]

Next, the tenth embodiment will be explained.

In the tenth embodiment, like the aforementioned ninth embodiment, the shape of the tubular body 10 is measured after correcting the shape of each end portion of the tubular body 10 to thereby grasp the shape of the tubular body in a condition similar to the actual condition in use.

In the following explanation, the difference between this embodiment and the aforementioned embodiment will be explained, and therefore, cumulative explanation will be omitted by allotting the same reference numeral to the corresponding portion.

In the shape measuring method according to the tenth embodiment, like the aforementioned ninth embodiment shown in FIG. 32, an inner correcting roller 62 is disposed so as to come into contact with the internal peripheral surface 11 of each end portion 13 of the tubular body (work) 10, and outer correcting rollers 64 and 64 are disposed so as to come into contact with the exterior peripheral surface 12. Displacement detecting devices 30 for measuring the radial displacement (deflection) of the external peripheral surface of the tubular body 10 are disposed at plural longitudinal central portions of the tubular body 10.

Figure 44A:
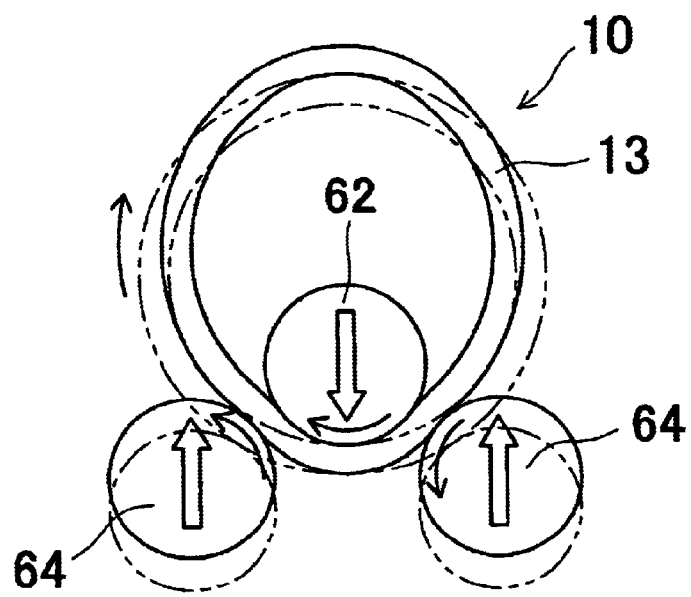
FIG. 44A is a side view for explaining the status in which both side end portions of a tubular body are being corrected by the method for measuring a shape of a tubular body according to the tenth embodiment.
Figure 44B:
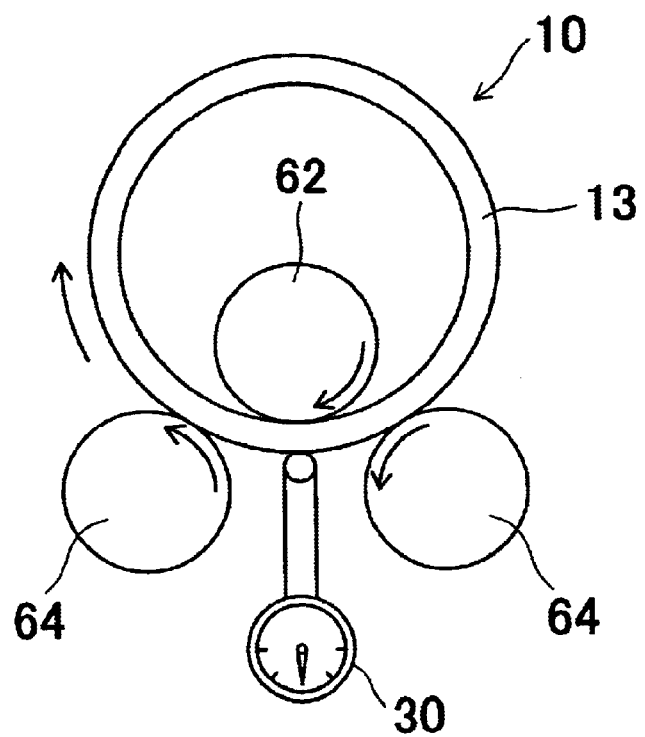
FIG. 44B is a side view for explaining the status in which the shape of a tubular body is being measured similarly.

FIG. 44A is a side view for explaining the correcting status of the end portion of the tubular body in the shape measuring method of a tubular body according to the tenth embodiment. FIG. 44B is a side view for explaining the measuring status of the tubular body.

In the shape measuring method of the tubular body 10 according to the tenth embodiment, first, as shown in FIG. 44A, the end portion 13 of the tubular body 10 is firmly pressed with the inner correcting roller 62 and the outer correcting rollers 64 and 64 to correct the cross-sectional shape. Thereafter, as shown in FIG. 44B, the pressing force against the end portion 13 of the tubular body 10 by the inner correcting roller 62 and the outer correcting rollers 64 and 64 is decreased, and then the radial displacement (deflection) of the external peripheral surface 12 of the tubular body 12 is measured with the displacement measuring devices 30.

<Correcting Roller>

The inner correcting roller 62 and the outer correcting rollers 64 and 64 come into contact with the internal peripheral surface 11 and the external peripheral surface 12 of the end portion 13 of the tubular body 10 respectively to correct the cross-sectional shape of the end portion 13 of the tubular body 10. After the correction, these rollers 62, 64 and 64 also come into contact with the internal peripheral surface 11 and the external peripheral surface 12 of the end portion 13 of the tubular body 10 respectively to function as supporting rollers for supporting the tubular body 10 at the time of performing the shape measurement (deflection measurement) of the tubular body 10.

As shown in FIGS. 44A and 44B, these inner and outer correcting rollers 62, 62 and 64 are configured so as to be changed in relative position.

In detail, as shown in FIG. 44A, at the time of correcting the end portion 13 of the tubular body 10, it is configured such that the outer correcting rollers 64 and 64 can be moved upward than the appropriate shape (chain double-dashed line in FIG. 44A) of the tubular body 10. This causes the radius of curvature of the portion of the tubular body 10 pinched by and between the inner correcting roller 62 and the outer correcting rollers 64 to be deformed larger than the appropriate shape (chain double-dashed line in FIG. 44A) of the tubular body 10 so that the tubular body 10 can have an appropriate shape when the pressing force (correcting force) by the correcting rollers 62, 64 and 64 are decreased to release the elastic deformation of the tubular body 10.

On the other hand, at the time of measuring the shape of the corrected tubular body 10, as shown in FIG. 44B, the outer correcting rollers 64 and 64 are moved downward to the position where these rollers are just in contact with the tubular body 10 having an appropriate shape (perfect circular shape) to thereby decrease the pressing force against the end portion 13 of the tubular body 10 so that the radial displacement (deflection) of the external peripheral surface 12 of the tubular body 10 can be measured with the displacement detecting devices 30.

(Concrete Example)

Although the tenth embodiment was explained conceptually, the tenth embodiment can be constituted by almost the same mechanical structure as that of the aforementioned second embodiment.

Figure 45:
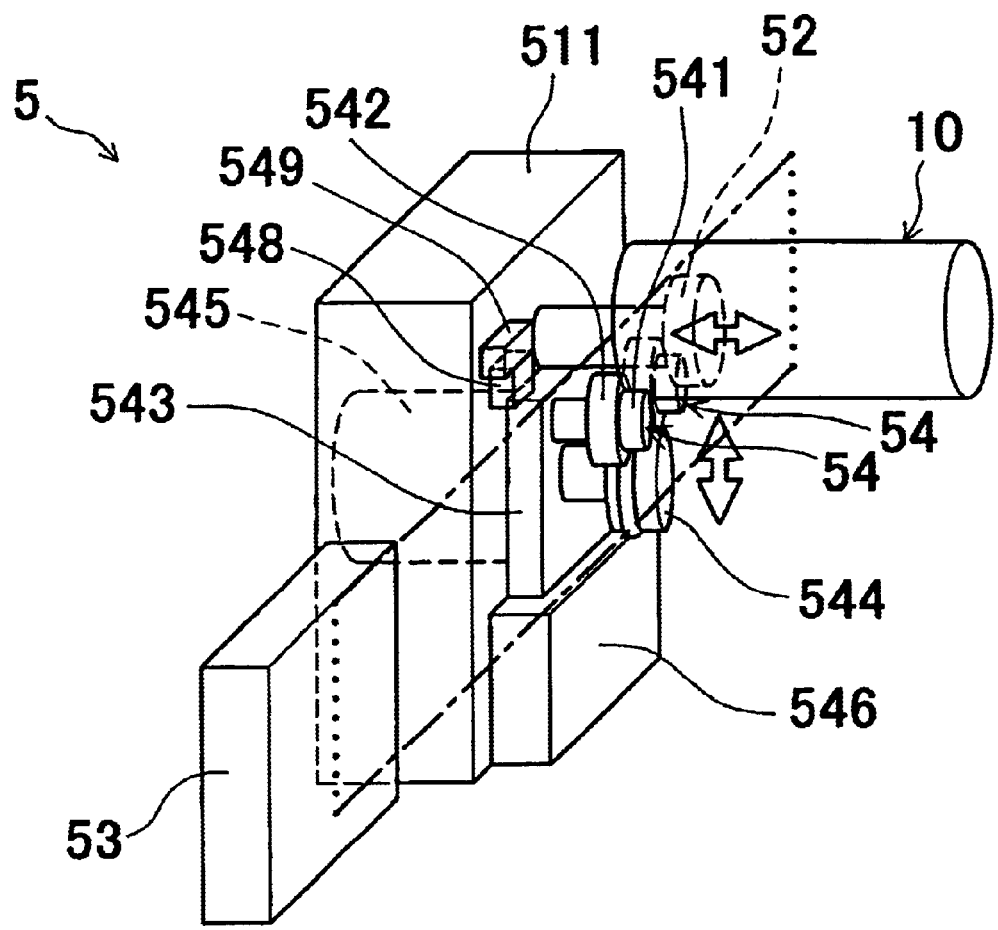
FIG. 45 is an enlarge perspective view of a supporting structure of a tubular body in the case in which the tenth embodiment is constituted by a mechanical structure almost similar to that of the second embodiment.

FIG. 45 is an enlarged perspective view showing the supporting structure of a tubular body in the case where the tenth embodiment is structured by almost the same mechanical structure as that of the second embodiment.

In this case, the pair of reference rollers 52 and 52 in the second embodiment correspond to the inner correcting rollers, and the supporting rollers 54 correspond to the outer correcting rollers.

Each supporting roller support member (outer correcting roller support member) 543 is configured so as to be brought into contact with the stopper 548 fixed to the device box 511 at the upper limit of the slide operation by the lifting cylinder 546.

The outer correcting rollers 54 are positioned such that the relative position of the outer correcting rollers 54 against the inner correcting roller 52 meets the correcting position for correcting the cross-sectional shape of the end portion 13 of the tubular body 10 when the supporting roller support member 543 is brought into contact with the stopper 548.

The stopper 548 is very short in stroke due to a stopper position setting means 549 as compared with the movable range of the outer correcting roller support member 543, but can be slightly moved in the up-and-down direction.

The lifting cylinder 546 lifts the tubular body 10 together with the supporting roller support member 543 and the outer correcting rollers 54 and presses the outer correcting roller support member 543 against the stopper 548 with a large enough pressing force, to thereby fix the position of the outer correcting roller 54 to the correcting position. The aforementioned large enough pressing force means a force capable of causing partial plastic deformation of the tubular body 10 when the tubular body 10 lifted by the outer correcting rollers 54 is pinched by and between the inner correcting roller 52 and the outer correcting rollers 54. As mentioned above, the position of the outer correcting rollers 54 and 54 are fixed to the respective correcting position, eliminating the need of complicated control at the time of performing the shape correction of the end portion 13 of the tubular body 10.

In this embodiment, the correcting position of each outer correcting roller 54, or the position of the stopper 548 set by the stopper position setting means 549, is set based on the result of an advance measurement performed prior to the correction of the end portion 13 of the tubular body 10 which will be mentioned later. This stopper position setting means 549 functions as a means for setting the correcting roller fixing position that sets the fixing position of the outer correcting roller 54 at the time of the correction based on the result of the advance measurement. The correcting position of the outer correcting roller 54 to be set by the stopper position setting means 549 can be set to a position inner than the position where the outer correcting roller 54 is just in contact with the external peripheral surface 12 of the tubular body 10 in the case where the cross-sectional shape is an appropriate.

Furthermore, at the time of performing the shape measurement of the tubular element 10 after the correction of the end portions 13 and 13 of the tubular body 10, the outer correcting roller support member 543 is detached from the stopper 548 to press the tubular body 10 against the inner correcting roller 52 by weak pressing force via the outer correcting rollers 54. At this time, the outer correcting rollers 54 and the inner correcting roller 52 become a state in which both of them are pressed against the tubular body 10 by the weak pressing force. The weak pressing force means a pressing force which does not cause substantial deformation of the end portion 13 of the tubular body 10.

Thus, the lifting cylinder 546 functions as a means for giving a pressing force capable of switching the pressing force of the correcting rollers 52, 54 and 54 against the end portion 13 of the tubular body 10 between a strong force capable of plastically deforming the end portion 13 of the tubular body 10 and a force weaker than the strong force.

The displacement detecting device 53 is a device for detecting the radial displacement of the external peripheral surface 12 of the tubular body 10. Here, a non-contact type detecting devices are installed at five positions different in axial directional position of the tubular body 10.

<Shape Measuring Procedures>

Next, concrete shape measuring procedures of a tubular body 10 using the shape measuring apparatus 5 will be explained.

Figure 46:
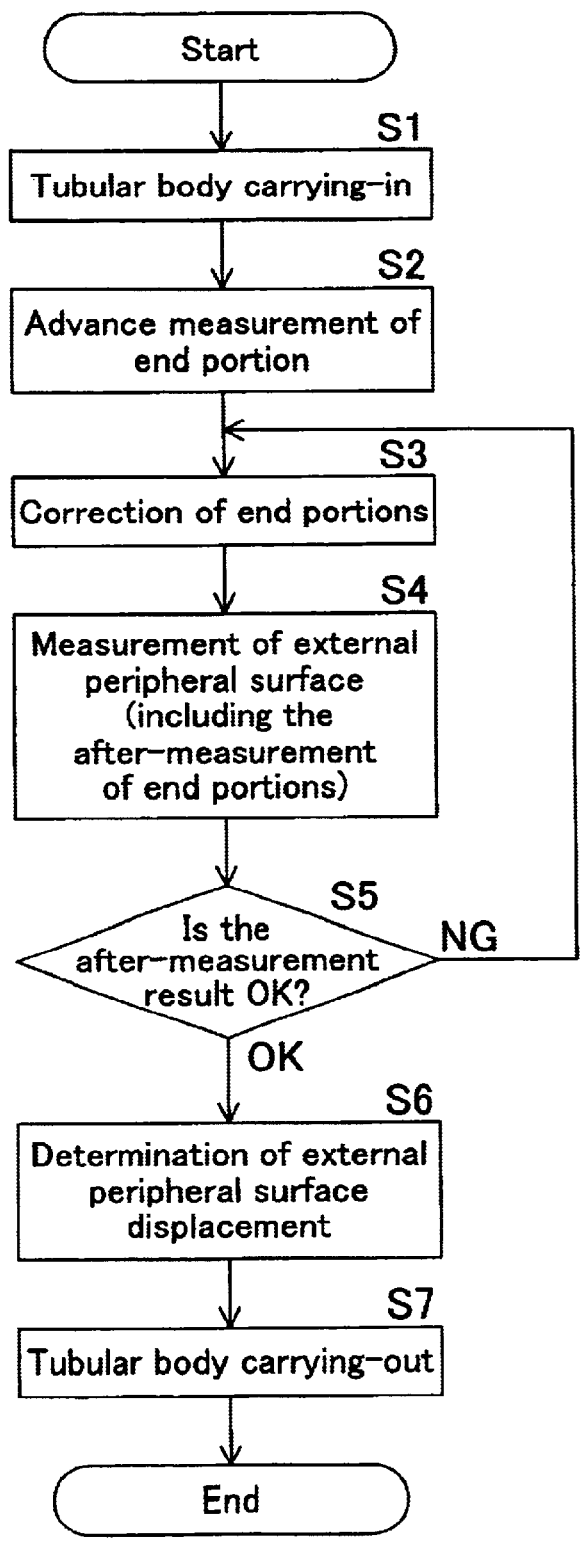
FIG. 46 is a flowchart for explaining the entire flow of the shape measurement in the tenth embodiment.

FIG. 46 is a flowchart for explaining the entire flow of the shape measuring means.

In this shape measuring operation, initially, the tubular body 10 is carried in and set to the shape measuring position (correcting position) of the shape measuring apparatus 5 (Step S1).

In this carrying step of the tubular body 10, in a state in which each inner correcting rollers 52 is moved outward by the operation of the driving portion 522, the tubular body 10 is carried by using any carrying device or manually to be disposed on the smaller diameter portions 541 of the outer correcting rollers 54. Then, each inner correcting roller 52 is inserted into the tubular body 10 by the operation of the driving portion 522. In this state, the outer correcting rollers 54 and the tubular body 10 disposed thereon are raised by the lifting cylinders 546 and 546.

Subsequently, in order to obtain an appropriate correcting amount corresponding to a cross-sectional shape different every tubular body 10, an advance measurement of the cross-sectional shape of the end portion 13 of the tubular body 10 will be performed (Step S2).

In this advance measurement, the tubular body 10 disposed on the outer correcting rollers 54 is raised by the lifting cylinders 546 and 546 up to the height position where the internal peripheral surface 11 of the tubular body 10 slightly comes into contact with the inner correcting rollers 52 and 52. In this state, the outer correcting rollers 54 are slightly in contact with the external peripheral surfaces 12 of the end portions of the tubular body 10, and therefore a weak pressing force is applied to the tubular body 10 by the inner correcting rollers 52 and the outer correcting rollers 54.

In this state, the tubular body 10 is rotated by driving the outer correcting rollers 54 with the driving motors 545, and the displacement detecting devices 53 each having at least a detecting area corresponding to the end portion of the tubular body 10 are activated to detect the cross-sectional area of each of both end portions 13 of the tubular body 10. Concretely, the detection result reveals the flatness of the end portion 13 or the like from the diameter or the like of the tubular body 10 changing in accordance with the rotational phase.

Then, the correction of the cross-sectional shape by plastically deforming the end portions 13 of the tubular body 10 is performed (Step S3).

In this correction, depending on the degree of the required correction of the tubular body 10 which is a measuring object shown by the aforementioned advance measuring result, the fixing position of the outer correcting rollers 54 (correcting position) at the time of correcting will be set. The reason why only the outer correcting rollers 52 and 52 are positioned is that the inner correcting roller 52 is not moved up and down in this embodiment. In concrete, the setting of the correcting position of the outer correcting rollers 54 is performed by the stopper position setting means 549 which sets the height position of the stopper 548.

After setting the fixing position (correcting position) of the outer correcting roller 54, the supporting roller support member 543 is raised by the lifting cylinder 546 up to the position where the support member comes into contact with the stopper 548 and then fixed. Thus, the height position of the outer correcting roller 54 is also fixed. By the way, the height position of the inner correcting roller 52 has been fixed. At this time, the outer correcting rollers 54 are pressed against the external peripheral surface 12 of the tubular body 10 by a strong force, and at the same time the inner correcting roller 52 is pressed against the internal peripheral surface 11 of the tubular body 10 by a strong force.

In this state, the outer correcting rollers 54 are driven by the driving motor 545 to rotate the tubular body 10, causing the correcting force to be applied to the entire periphery of the end portion 13 of the tubular body 10, which in turn causes a partial plastic deformation in the circumferential direction to be corrected into an appropriate cross-sectional shape (perfect circular shape).

After one revolution or more, preferably plural revolutions, of the tubular body 10, the supporting roller support member 543 is moved downward so as to detach from the stopper 548 by the lifting cylinder 546 to release the strong pressing force (correcting force) by the outer and inner correcting rollers 54 and 52 against the tubular body 10. This releasing of the strong pressing force is performed while rotating the tubular body 10 such that the pressing force against the tubular body 10 is gradually decreased. Preferably, this releasing is performed during one or more rotations so as to prevent a bad influence of causing the cross-sectional shape of the end portion 13 of the tubular body 10 to become discontinuous in the circumferential direction.

In cases where the advance measurement reveals that no correction is required because the cross-sectional shape of the end portion 13 of the tubular body 10 is good, this correction step (Step S3) can be skipped.

Subsequently, the radial displacement of the external peripheral surface 12 due to the rotation of the tubular body 10, or the deflection of the external peripheral surface, is measured (Step S4). In this embodiment, the measurement of the deflection of the external peripheral surface 12 of the longitudinal central portion of the tubular body 10 and the measurement (after-measurement) of the cross-sectional shape of the end portion 13 of the tubular body 10 are simultaneously performed. This after-measurement is performed to confirm whether the aforementioned correction was performed appropriately.

The downward movement of the outer correcting roller 54 for releasing the strong pressing force against the tubular body 10 at the end of the correction is stopped at the height where the inner and outer correcting rollers 52, 54 and 54 are slightly in contact with the tubular body 10. The measurement of the deflection of the external peripheral surface 12 is performed in this state, or like the aforementioned advance measurement, in the state in which a slight pressing force is applied to the tubular body 10 by the inner and outer correcting rollers.

The measurement of the deflection of the external peripheral surface 12 is performed by rotating the tubular body 10 by driving the outer correcting roller 54 with the driving motor 545 in the state in which a slight pressing force is applied to the tubular body 10 by the inner and outer correcting rollers 52 and 54, to thereby measure the displacement (deflection) of the external peripheral surface at the five axial position of the tubular body 10. The displacements detected by the displacement detecting devices 53 located at the end portion of the tubular body 10 are to detect the cross-sectional shapes of the end portions 13 of the tubular body 10. In other words, the measurements by the displacement detecting devices 53 at the end portions 13 of the tubular body 10 are after-measurements of the cross-sectional shapes of the end portions of the tubular body 10.

After the completion of the measuring of the external peripheral surface 12 of the tubular body 10 and the after-measurement, it is discriminated whether the result of the after-measurement is appropriate (Step S5).

If the result of the after-measurement is inappropriate (NG in Step S5), the routine returns to S3 since the correction of the end portions of the tubular body 10 was not performed appropriately to repeat the correcting of the cross-sectional shape of the end portion 13 of the tubular body 10. In cases where the after-measurement in Step S5 is still NG after plural times of the corrections, the measurement of the tubular body 10 is terminated, regarding the tubular body 10 as a defective tube that no correction is effective.

If the result of the after-measurement is appropriate (OK in Step S5), it can be presumed that the deflection measurement of the external peripheral surface 12 in Step S4 was performed in a state similar to the state in which the end portion 13 of the tubular body 10 is in actual use. Therefore, the deflection of the external peripheral surface 12 of the tubular body 10 obtained in Step S4 is regarded as the shape measurement result of this tubular body 10, and therefore the shape measurement is completed (Step S6).

After the completion of the shape measurement of the tubular body 10, the tubular body 10 is carried out of this shape measuring apparatus 5 (Step S7).

The carrying-out operation of this tubular body 10 is performed by the procedures opposite to the aforementioned procedures, i.e., stopping the rotation of the tubular body 10, releasing the contact state of the inner and outer correcting rollers 52 and 544 to the tubular body 10 by moving the outer correcting rollers 54 and 54 downward, moving the inner correcting rollers 52 and 52 outward, and then taking out the measured tubular body 10.

in the aforementioned tenth embodiment of the shape measuring method of the tubular body, the positions of the correcting rollers, etc. can be variously changed, like in the aforementioned ninth embodiment.

<Modified Example>

Although the tenth embodiment was explained, the present invention is not limited to the above. Like the aforementioned ninth embodiment, various modifications can be made as follows.

(1) In the tenth embodiment, at the time of the correction applying a strong pressing force by the correcting rollers, the correction which causes a plastic deformation of the cross-sectional shape of the end portion 13 of the tubular body 10 is performed. On the other hand, at the time of the shape measurement of the tubular body 10, the measurement is performed without deforming the cross-sectional shape of the end portion 13 of the tubular body 10 by slightly bringing the correcting rollers into contact with the end portion. However, the measurement can also be performed while slightly deforming the end portion 13 of the tubular body 10 at the time of the measurement. In this case, even in cases where sufficient correction cannot be attained by the correcting process causing plastic deformation, at the time of the actual use, it is possible to reproduce the state similar to the state in which flanges 80 or the like are inserted as shown in FIG. 4, resulting in practical shape measurement.

In this case, it is preferable to limit the deformation of the end portion 13 at the time of the shape measurement so as to fall within the elastic deformation range to ensure the measuring accuracy.

(2) In the aforementioned tenth embodiment, at the time of terminating the correction, the strong pressing force by the correcting rollers is gradually decreased while rotating the tubular body. At the time of initiating the correcting, however, the pressing force by the correcting rollers can be gradually increased while rotating the tubular body.

[Eleventh Embodiment]

Next, the eleventh embodiment will be explained.

In the eleventh embodiment, like the aforementioned ninth and tenth embodiments, the shape of the tubular body 10 is measured while correcting the shape of each end portions of the tubular body 10 to thereby grasp the shape of the tubular body in a condition similar to the actual condition in use.

In the following explanation, the difference between this embodiment and the aforementioned embodiment will be explained, and therefore, cumulative explanation will be omitted by allotting the same reference numeral to the corresponding portion.

Figure 47:
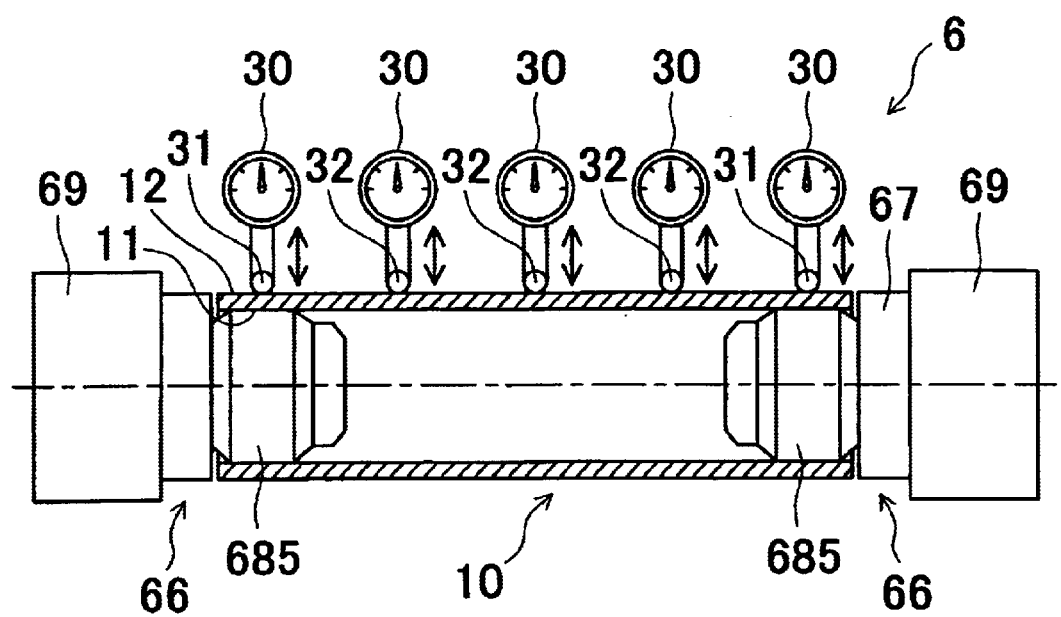
FIG. 47 is a front cross-sectional view showing an apparatus for measuring a shape of a tubular body for a method for measuring a shape of a tubular body according to the present invention.

FIG. 47 is a front cross-sectional view showing a tubular body shape measuring apparatus for a tubular body shape measuring method according to the present invention. FIG.

Figure 49A:
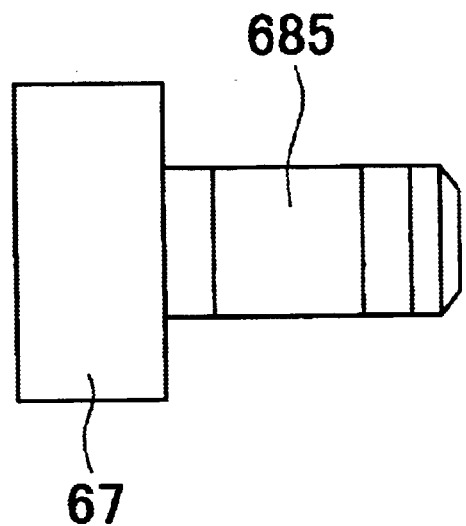
FIG. 49 is an explanatory view for the operation.
Figure 49B:
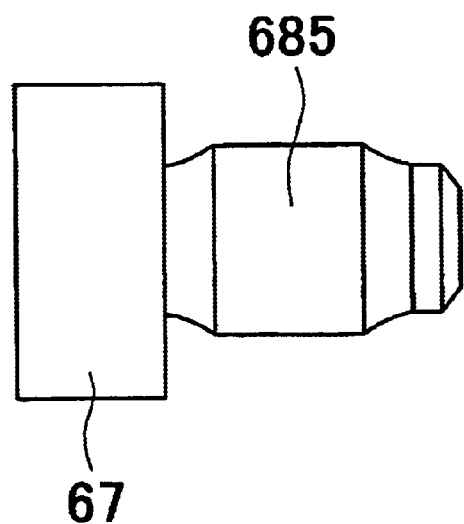
Figure 50:
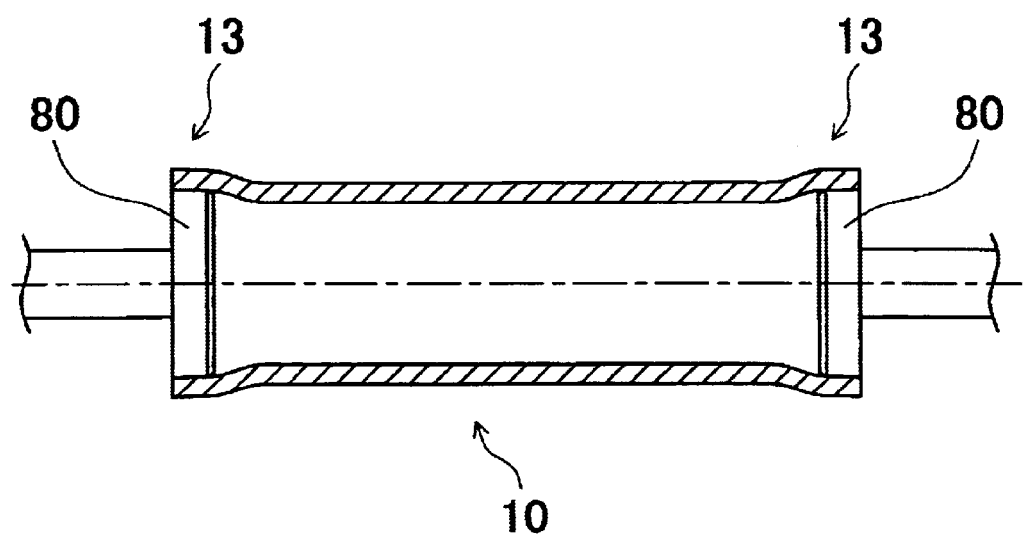
FIG. 50 is a front cross-sectional view showing the use status of a tubular body (work) 10 to be measured in shape.

48 is a cross-sectional view of an expansion clamp 66. FIG. 49 is an operation explanatory view. FIG. 50 is a front cross-sectional view showing the using status of a tubular body (work) 10 as a shape measuring object.

As shown in FIG. 47, in the tubular body shape measuring method according to the eleventh embodiment, a pair of expansion clamp 66 and 66 are inserted into the insides of both end portions of the tubular body (work) 10, and then the expansion clamps 66 are expanded so as to be brought into contact with the entire peripheral surface 11 of the tubular body 10. In this state, the tubular body 10 is rotated together with the pair of expansion clamps 66 and 66 about the central axis thereof as a rotational axis to thereby detect the radial displacement of the external peripheral surface 12 of the tubular body 10 with displacement detecting devices 30 disposed outside the tubular body 10.

<Expansion Clamp>

The pair of expansion clamps 66 and 66 define the reference of the shape measurement of the tubular body 10.

The pair of expansion clams 66 is disposed approximately in parallel, and the tubular body 10 as a shape measuring object is supported approximately horizontally by the pair of expansion clamps 66 and 66.

Figure 48:
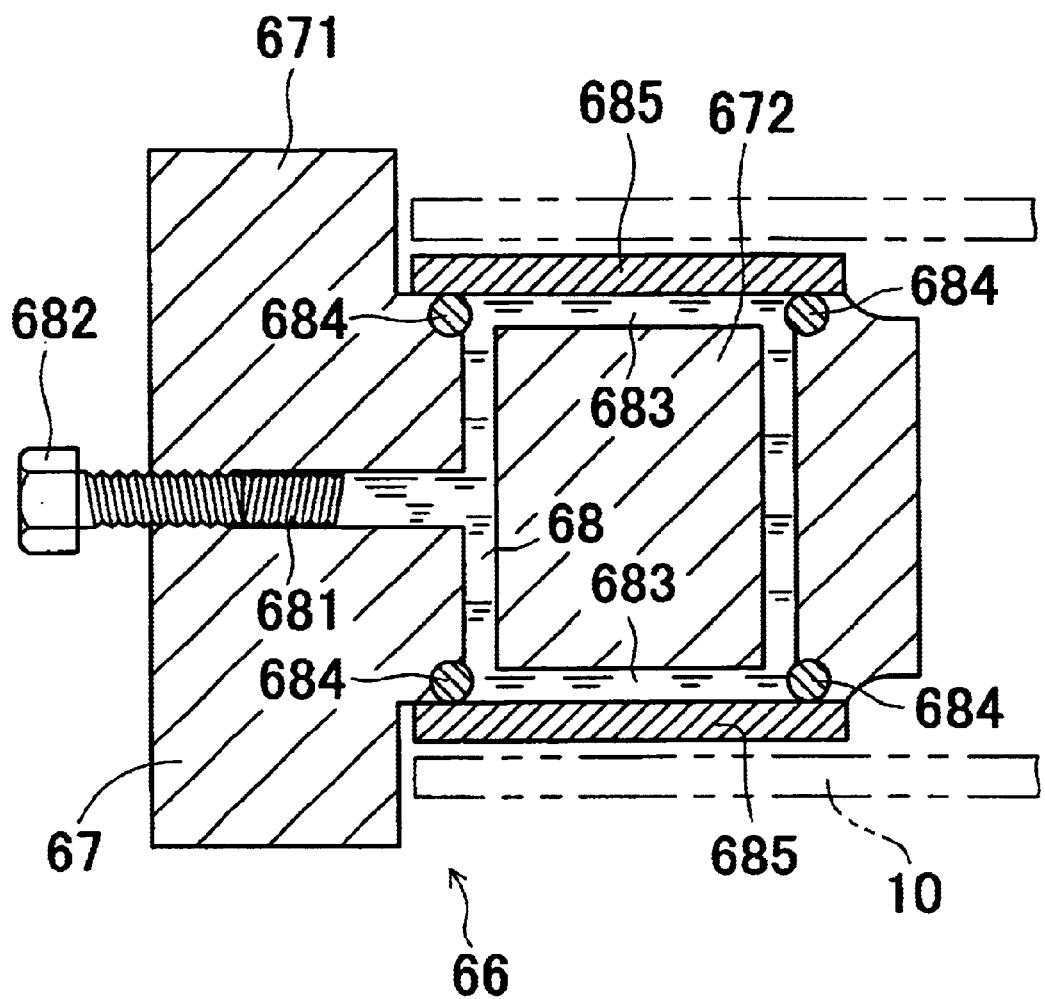
FIG. 48 is a cross-sectional view showing an expandable clamp 20.

As shown in FIG. 48, each of the pair of expansion clamps 66 and 66 is provided with a cylindrical clamp main body 67 having a larger diameter portion 671 and an expansion ring (cylindrical member) 685 attached to a smaller diameter portion 672 of the clamp main body 67 so as to cover the external peripheral surface of the smaller diameter portion 672.

Each of the pair of the expansion clamps 66 and 66 is attached to a rotational driving source 69 at the outside of the larger diameter portion 671 of the claim main body 67, so that the expansion clamp 66 is supported so as to be correctly rotated about the central axis of thereof, as shown in FIG. 47, etc.

Furthermore, at least one of the expansion clamps 66 and 66 is configured such that it can be moved axially outward by a driving means (not shown) so as not to cause an obstruction at the time of setting the tubular body 10.

The clamp main body 67 is provided with an oil passage 68 to be filled with operation oil. This oil passage 68 is communicated with an expansion chamber 683 formed at the inside of the expansion ring 685 via a plurality of passages radially expanding in the smaller diameter portion 672 of the clamp main body 67.

This expansion chamber 683 is formed between the external peripheral surface of the smaller diameter portion of the clamp main body 67 and the inner peripheral surface of the expansion ring 685. As will be explained above, operational oil is supplied to the expansion chamber 683 to cause the expansion chamber 683 to be expanded by the operational oil pressure (fluid pressure). To keep the sealed state of the expansion chamber 683 even if the expansion ring 685 is expanded in the radial direction, sealing means are provided at the axial both end portions of the expansion chamber 683.

In this embodiment, in concrete, O-rings 684 and 684 are fitted in the grooves formed along the entire circumference of the clamp main body 67 so as to closely come into contact with the external peripheral surface (groove) of the champ main body 67 and the internal peripheral surface of the expansion ring 685 to seal the expansion chamber 683. This o-ring 684 is in an inwardly pressed state by the expansion ring 685 in a normal state. When the expansion ring 685 is expanded in the radial direction, the o-ring 684 deforms so as to increase the external diameter while keeping the close contact with the internal peripheral surface of the expansion ring 685, maintaining the sealing state between the expansion ring 685 and the external peripheral surface of the smaller diameter portion 672 of the clamp main body 67. As a material of the o-ring 684, rubber can be exemplified, but any other material can be employed as long as it is an elastic material that can be served as the aforementioned o-ring.

The oil passage 68 in the larger diameter portion 671 of the clamp main body 67 is communicated with an outside of the clamp main body 67 at the central portion of the external end surface of the larger diameter portion 671. Formed in the end portion of the oil-passage 68 in this larger diameter portion 671 is a female screw portion 681 in which an operation screw 682 is mounted. This operation screw 682 is rotatably driven by an arbitrary amount in either direction by a driving source such as a motor (not shown).

In this expansion clamp 66, when the operation screw 682 is advanced in the female screw portion 681 by rotating the rotational operation thereof, the operation oil (fluid) in the female screw portion 681 is forwarded to increase the operation oil pressure (fluid pressure) in the oil passage 68 including the aforementioned expansion chamber 683, forwarding the operation oil in the expansion chamber 683 to cause the expansion chamber to be expanded. In concrete, the expansion of the expansion chamber 683 means that the aforementioned expansion ring 685 expands radially to increase the external diameter to thereby expand in the radial direction.

The expansion ring 685 is made of an elastic material having predetermined elasticity. As the material of this expansion ring, metal such as alloy steel, synthetic resin and synthetic rubber can be exemplified, but any other material can be employed as long as it is an elastic material that can be served as the aforementioned o-ring.

The expansion ring 685 will be evenly expanded in the circumferential direction by receiving the radially outward pressure (operation oil pressure, fluid pressure) of the operation oil when the operation oil is fed into the expansion chamber 683 to thereby increase the external diameter. This expansion deformation causes the external peripheral surface of the expansion ring 685 to be brought into contact with the internal circumferential surface of the tubular body 10 along the entire circumference.

This expansion ring 685 has a prescribed length in the axial direction. As shown in FIG. 49B, at the time of the expansion, it will be expanded while keeping the same diameter of the external peripheral surface in the axial direction. Accordingly, the tubular body 10 comes into face-contact with the expansion ring 685 in the axial direction with a predetermined contact width. As a result, it is prevented the tubular body 11 from being deformed into a shape different from the shape in the actual use due to a partial contact of the expansion clamp 66 against the internal peripheral surface 11 of the tubular body 10, contributing accurate shape measurement. Furthermore, since no inappropriate deformation will be given to the tubular body 10, it becomes possible to bring the expansion clamp into contact with the internal peripheral surface 11 of the tubular body with larger pressing force.

The external peripheral surface of the expansion ring 685 is formed into a sufficiently smooth surface, so that the external peripheral surface can come into close contact with the internal peripheral surface 11 of the tubular body 10.

The pair of expansion clamps 66 and 66 will come into contact with the tubular body 10 at the positions to be supported (within the area S with hatching in FIG. 4) at the time of actually using the tubular body 10. As a result, the portion which will become a rotational reference at the time of actually using the tubular body 10 can be treated as a reference for a shape measurement, realizing measurement in line with the actual use.

According to the expansion clamp 66, the expansion clamp 66 will come into contact with the internal peripheral surface 11 of the tubular body 10 along the entire circumference thereof because the expansion rings will be expanded evenly in the circumferential direction. Therefore, the tubular body 10 becomes the supported status under approximately the same condition as in the case where the tubular body 10 is supported by flanges at the time of the actual use. That is, the central axial position of the pair of expansion clamps 66 approximately coincides with the center of the circle formed by the internal peripheral surface 11 of the tubular body 10.

In this state, by rotating the pair of expansion clamps 66 and 66 about their central axes, a rotational state extremely similar to the rotational state when the tubular body 10 with the internal peripheral surface 11 supported by flanges is actually used can be realized. The behavior of the tubular body 10 at the time of this rotation becomes nearly equal to the behavior in the actual use. Accordingly, by detecting the displacement of the external peripheral surface of the tubular body 10 rotated as mentioned above, a deflection in which the curvature and/or the uneven thickness of the tubular body 10, or influence such as a cross-sectional shape (perfect circle) are integrated can be detected.

Furthermore, since the pair of expansion clamps 66 and 66 come into contact with the internal peripheral surface 11 of the tubular body 10 along the entire circumference, the central axial position of the pair of expansion clamps 66 and 66 can be more assuredly positioned at the center of the circle formed by the internal surface 11 of the tubular body 10, which can realize the state close to the rotating state in the actual use.

Furthermore, since the pair of expansion clamps 66 and 66 come into contact with the internal peripheral surface 11 of the tubular body 10 along the entire circumference, even if the clamps come into contact with the tubular body 10 with larger pressing force, the pressing force can be approximately equally distributed in the circumferential direction, contributing to accurate shape measurement.

For example, as a common clamp, there is the so-called divided claw type clamp having a plurality of claws to be brought into contact with the internal peripheral surface 11 of the tubular body 10 by increasing the distance between the adjacent claw portions to support the tubular body 10 with the claws radially outwardly pressing plural portions of the internal peripheral surface 11 of the tubular body 10. In such a divided claw type clamp, since the claws partially come into contact with the internal peripheral surface, there is a possibility of causing the cross-section of the tubular body 10 to be unevenly deformed in the circumferential direction. Especially, in cases where the tubular body 10 is thin in thickness or soft in material, uneven deformation of the tubular body 10 may occur, resulting in inaccurate shape measurement. To the contrary, according to the expansion clamp 66 for a tubular body shape measuring method of the present invention, since the expansion clamp 66 comes into contact with the entire internal peripheral surface of the tubular body 10, problems inherent in a conventional divided claw type clamp would not occur.

Furthermore, since the pair of expansion clamps 66 and 66 are inserted in the tubular body 10 and then expanded therein to detect the displacement of the external peripheral surface 12 of the tubular body 10 while rotating the tubular body 10 together with the expansion clamps 66 and 66, the structure can be simplified. Further, the accumulation of measurement errors can be decreased, resulting in high accuracy shape measurement.

Since the expansion clamp 66 is configured to be expanded by fluid pressure (operation oil pressure), sufficiently large expansion force approximately even in the circumferential direction can be obtained. This enables the expansion clamp 66 to press the internal peripheral surface 11 of the tubular body 10 radially outwardly with a large pressing force. Accordingly, the expansion clamp 66 can be brought into contact with the internal peripheral surface 11 of the tubular body 10 assuredly.

In this embodiment, the end portions 13 of the tubular body 10 are radially outwardly deformed with an enough large pressing force.

The deformation is approximately the same as the deformation caused by being inserted by a flange 80 at the time of using the tubular body 10. This can attain the state closer to the rotating state in the actual use.

Furthermore, the pressing force pressing the expansion clamp 66 against the internal peripheral surface of the tubular body 10 is set to be approximately the same as the expanding pressing force applied to the tubular body 10 by being inserted by a flange 80 at the time of using the tubular body 10. This can attain the supporting state closer to the supporting state at the time of actually using the tubular body 10 to which flanges 80 and 80 are inserted into the vicinity of the end portions of the tubular body 10, which in turn can attain the rotating state closer to the rotating state in the actual use.

Especially, in the actual use, the cross-sectional shape (internal peripheral circle) of the end portion of the tubular body 10 will be corrected into a nearly perfect circle by being forcibly inserted by a flange 80. The shape measurement of the tubular body 10 can be performed with the end portions of the tubular body 10 corrected, like in the actual use, since the tubular body 10 is expanded by the expansion clamps 66 and 66 expanded evenly with the fluid pressure in the circumferential direction.

The deformation of the tubular body 10 by each expansion clamp 66 can be performed so as to fall within the elastic deforming region of the tubular body 10 or reach the plastic deforming region of the tubular body 10 depending on the degree of the deformation of the tubular body 10 at the time of the actual use. If the deformation of the tubular body 10 is performed within the elastic deforming region, the deformation occurred at the time of the shape measurement returns to the original shape, which assuredly can minimize the influence to the tubular body due to the shape measurement. On the other hand, in the case of the deformation reaching the plastic deforming region in the actual use, by executing the expansion deformation, the shape measurement can be performed under approximately the same conditions at the time of the actual use.

<Example of Shape Measurement>

Next, concrete tubular body shapes will exemplified, explanation will be directed to the case in which the advantage of the tubular shape measuring method according to the eleventh embodiment can be demonstrated especially.

<Tubular Body with Deformed Ends>

Figure 51:
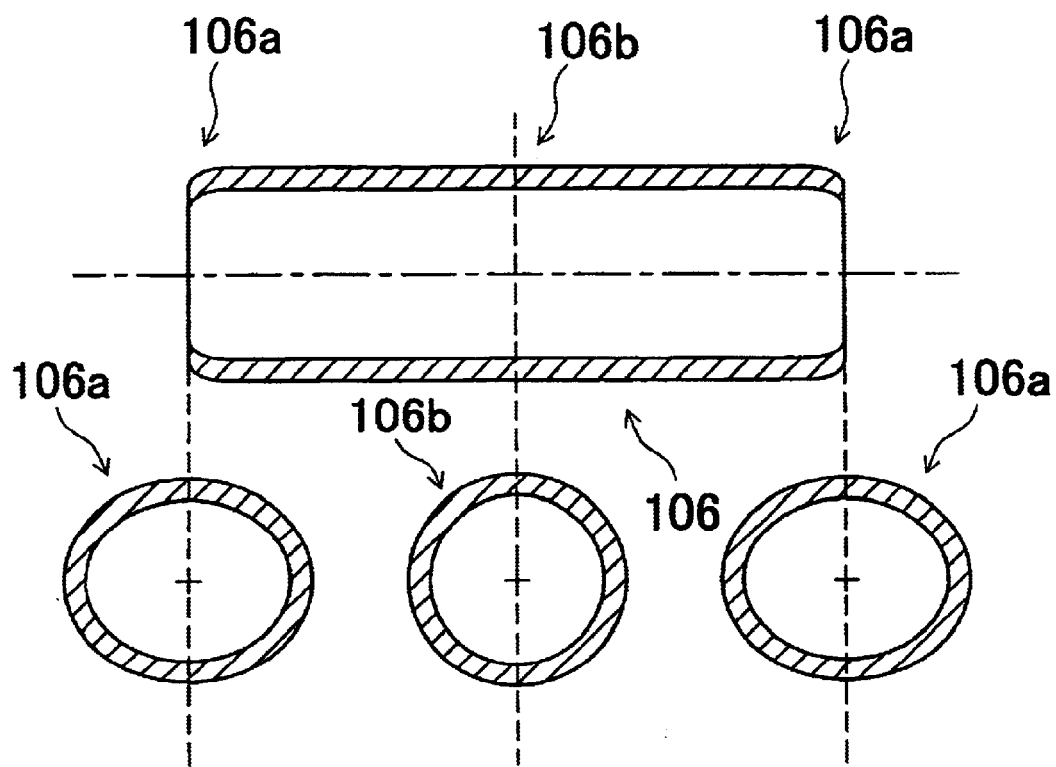
FIG. 51 is an explanatory view for explaining a tubular body 106 in which only both end portions 106a and 106a have a flat cross-sectional shape respectively but the central portion 106b has an appropriate perfect circular cross-sectional shape.

As shown in FIG. 51, in the first example, although only both end portions 106*a* and 106*a* of the tubular body 106 have a flat shape respectively, the central portion 106*b* has an appropriate perfect circular cross-sectional shape.

Tubular bodies to be supplied as photosensitive drums or the like are manufactured by cutting a long tubular body substrate into a certain length in many cases. In such cases, only the vicinities of the end portions of the tubular body tend to be deformed into a flat shape by the cutting.

In such a shape in which the vicinities of both end portions are formed into a flat shape respectively, when the shape is measured in accordance with a conventional method as shown, for example, in FIGS. 56 and 57, it will be judged that the shape is far from the perfect cylindrical shape. In the case of a shape inspection with a certain acceptance level, there is a high possibility that it is judged to be a defective item.

In some cases, however, when flanges are forcibly inserted into both ends of the tubular body in the actual use as shown in FIG. 4, both end portions of a tubular body may be corrected into a perfect circular shape respectively, which resolves the shape defect. Thus, in such cases, it becomes a perfect cylindrical shape in the actual use, causing no problem. On the other hand, in another cases, even if flanges are forcibly inserted at the time of the actual use, a perfect cylindrical shape may not be obtained. Such a tubular body is a perfect defect item. In a conventional shape measuring method, such a discrimination was impossible, and therefore there is a possibility that an item to be discriminated as a good item is discriminated as a defect item.

To the contrary, in the shape measuring method according to the present invention, the shape measurement of the tubular body 106 can be performed while expanding the shape of both end portions of the tubular body similar to that in the actual use by inserting the expansion clamps 66 into the vicinities of both end portions of the tubular body 106 and expanding it to be brought into contact with the internal peripheral surface of the tubular body 106. Accordingly, even if the tubular body has a false defect which will be dissolved at the time of actually being used at the vicinities of both end portions, it is possible to obtain a shape measuring result including a discrimination on whether the false defect is a permanent defect which will remain even in the actual use.

As a result, an accurate shape measurement of a tubular body which had no choice but to be discriminated as a defect item in a conventional method can be performed, resulting in a perfect shape measuring result.

<Tubular Body with Uneven Material Distribution>

In the second example in which the advantage of the tubular shape measuring method according to this invention can be demonstrated especially, although it has a perfect cylindrical shape before inserting a flange at the time of the actual use, the material distribution is uneven in the circumferential direction.

Figures 52A, 52B:
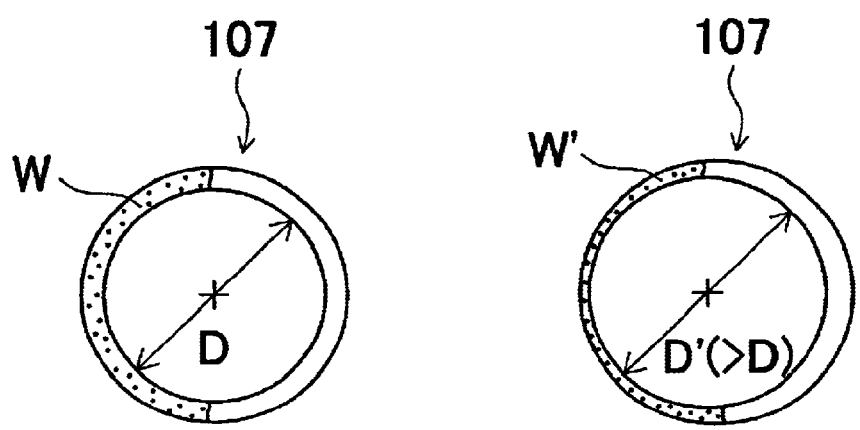
FIG. 52A is a cross-sectional view showing the state before pressing a flange in this tubular body 107.
FIG. 52B is a cross-sectional view showing the state after pressing a flange in this tubular body 107.

FIG. 52 shows an example of the tubular body 107 uneven in material distribution in the circumferential direction, wherein FIG. 52A shows the state before being inserted by a flange and FIG. 52B shows the state after being inserted by the flange.

As shown FIG. 52A, this tubular body 107 is even in thickness along the entire circumference. However, the left half portion W can be easily deformed as compared to the remaining portion. Such a tubular body can be manufactured when there is an irregular flow of the extruding material at the time of extruding the tubular body or when there are irregular environment conditions such as temperature conditions after forming into a tubular body in the circumference direction.

Inserting a flange 80 into the tubular body 107 cause the tubular body 107 having an original diameter D of the circle (internal peripheral surface) formed by the internal peripheral surface to be expanded into the diameter D' of the circle (internal peripheral surface) formed by the internal peripheral surface as shown in FIG. 52B for example. At this time, the easy-to-deform portion W will be stretched largely to thereby become a thin portion W' thinner than the remaining portion.

In other words, in the second embodiment, contrary to the first example, the shape will be discriminated as a normal shape before the actual use. However, at the time of the actual use, the end portions of the tubular body supported by at least flanges and determining the rotational center become uneven in thickness as a defect tubular body.

In a conventional shape measuring method as shown in FIGS. 56 and 57 for example, since such a tubular body 107 has a perfect cylindrical shape at the time of the shape measurement, it would be discriminated that it is a perfect cylindrical shape. Therefore, it was impossible to detect such a defect tubular body.

To the contrary, according to the shape measuring method of the present invention, the shape measuring of the tubular body can be performed in the state in which the expansion clamps 66 and 66 are inserted into the vicinities of both end portions of the tubular body 10 and then expanded to be brought into contact with the internal peripheral surface of the tubular body to thereby attain the expanded state closer to the actual use state. This also enables a detection of a hidden defect of the vicinities of the end portions which will be generated at the time of the actual use, resulting in a perfect shape measurement result.

<Modified Examples>

Although the eleventh embodiment was explained, the present invention is not limited to the above. Like the aforementioned first to tenth embodiments, various modifications can be made as follows.

(1) In the eleventh embodiment, although the pair of expansion clamps 66 and 66 are brought into contact with the positions to be supported at the time of using the tubular body, they can be brought into contact with any other positions within the internal peripheral surface of the tubular body. It is preferably the vicinity of the portion to be supported since there is a high possibility that the portion to be supported and the vicinity thereof resemble in cross-sectional shape.

(2) In the aforementioned eleventh embodiment, although the shape measurement was performed with the axial direction of the tubular body 10 placed nearly horizontally, the measurement can be performed with the axial direction of the tubular body 10 placed nearly vertically. This decreases the deflection of the tubular body 10 due to its own weight, enabling an accurate shape measurement of the tubular body 10.

(3) In the eleventh embodiment, the displacement of the external peripheral surface was detected at plural cross-sections (axial positions) of the tubular body 10 by disposing one displacement detecting device 30 at each of the plural cross-sections. However, at one or plural cross-sections, a plurality of displacement detecting devices 30 can be placed to detect a plurality of displacements at a single cross-section. In this case, from the plural detected displacements at one cross-section, it becomes possible to grasp the cross-sectional shape more precisely.

Figure 53:
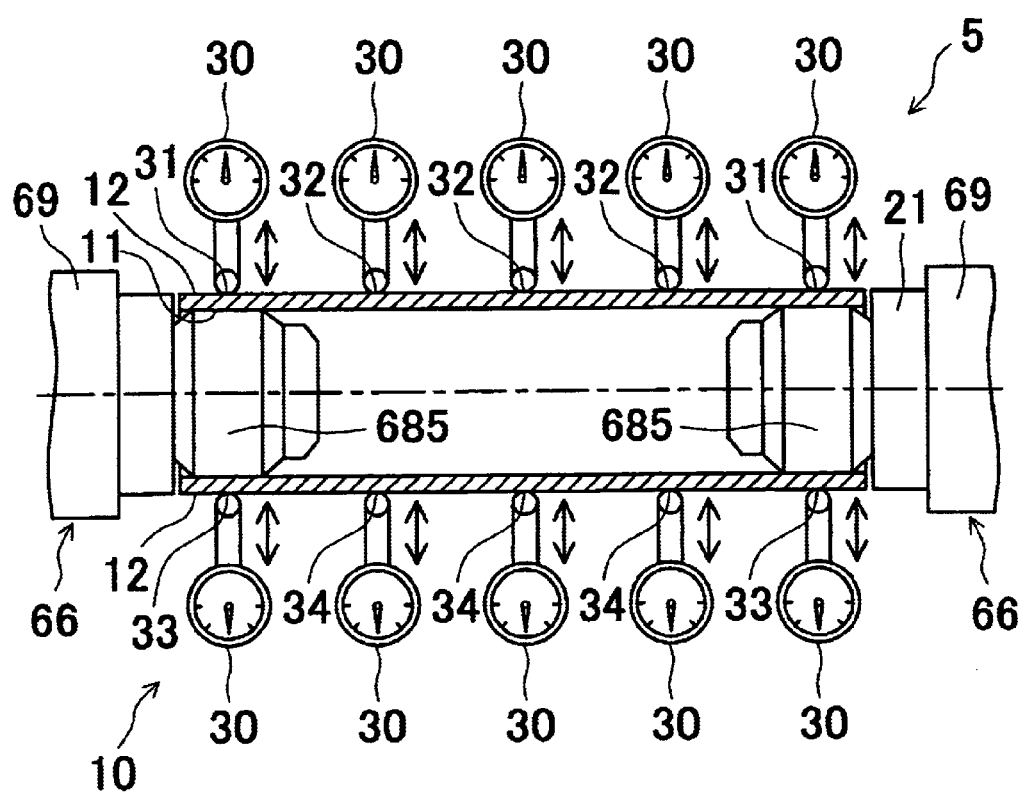
FIG. 53 is a front cross-sectional view showing a modified embodiment in which displacement detecting devices 30 . . . are arranged so as to detect the displacement of the external peripheral surface at arbitrary cross-sectional positions (axial positions) at two positions 31 . . . , 32 . . . , 33 . . . , 34 . . . different in the circumferential position by the half circumferential length.

Furthermore, as shown in FIG. 53, in the case in which the displacements of the external peripheral surface are detected at two positions 31, 32, 33 and 34 (opposing positions) of any cross-section (axial position) of the tubular body 10 different in circumferential position by a half circumferential length, the diameter of the cross-section of the tubular body 10 can be directly obtained. That is, in the case in which the tubular body 10 is rotated about the central axis of the expansion clamps 66 and 66 with the tubular body 10 supported by the expansion clamps 66 and 66, it is theoretically possible to obtain the diameter of the tubular body 10 by adding the displacement amount at the positions different in rotational angle by 180 degree from the detected displacements of the single displacement detecting device 30. However, the theoretical diameter accuracy will be affected by the control of the rotational angle of the tubular body 10 and/or the accuracy of the rotational angle thereof. To the contrary, when the displacements of the external peripheral surface are detected at positions different in circumferential position by a half circumference length, the diameter of the tubular body 10 can be obtained by comparing two displacements at each instance of the shape measurement. Therefore, the diameter will not be affected by the rotational angle of the tubular body 10. Accordingly, an accurate diameter can be easily obtained without being affected by the accuracy of the rotational angle of the tubular body 10.

(4) In the aforementioned eleventh embodiment, although a plurality of detecting positions for a displacement of the external peripheral surface of the tubular body 10 are provided, at least one detecting position can be provided.

(5) In the aforementioned embodiment, although a photosensitive drum substrate is exemplified as a tubular body 10 to be subjected to the shape measurement, the present invention is not limited to this, but can also be applied to a carrying roller, a developing roller, a transferring roller for use in copying machines, etc. Furthermore, any other tubular bodies can be a measuring object of the present invention.

(6) In the aforementioned eleventh embodiment, the tubular body 10 is expanded to the same degree as in the actual use by using the pair of expansion clamps 66 and 66. However, the expansion of the tubular body 10 by the expansion clamp 66 can be smaller than the expansion of the tubular body 10 at the time of the use. In this case, only the expansion smaller than the expansion at the time of actually using the tubular body 10 is made while attaining the supporting state similar to the supporting state in which flanges 80 and 80 are inserted into the vicinities of the end portions of the tubular body 10 at the time of the actual use. Therefore, the influence given to the tubular body 10 at the time of using the tubular body 10 can be decreased.

Especially in the case where the tubular body 10 is plastically deformed by being inserted by the flanges 80 and 80 at the time of the actual use, when the pair of the expansion clamps 66 and 66 only give a deformation within the elastic deformation region at the time of the shape measurement, the same shape as the original shape before the shape measurement can be maintained even after the shape measurement of the tubular body.

(7) In the aforementioned eleventh embodiment, pressing force similar to the pressing force applied to the tubular body 10 when the flanges 80 and 80 are forcibly inserted into the tubular body 10 is applied by the pair of the expansion clamps 66 and 66. However, the pressing force to be applied to the tubular body 10 by the pair of expansion clamps 66 and 66 can be smaller than the expanding pressing force applied to the tubular body 10 at the time of using the tubular body 10. In this case, only the expansion smaller than the expansion at the time of actually using the tubular body 10 is generated while attaining the supporting state similar to the supporting state in which flanges 80 and 80 are inserted into the vicinities of the end portions of the tubular body 10 at the time of the actual use. Therefore, the influence given to the tubular body 10 at the time of using the tubular body 10 can be decreased.

(8) In the eleventh embodiment, the structure in which the expansion ring is expanded by the fluid pressure as an operation oil is exemplified. However, it is not limited to fluid pressure in this invention. The driving mechanism to cause the expansion can be any mechanism capable of obtaining pressing force when clamped. As a driving mechanism to cause the expansion, any mechanism in which material consisting of the expansion clamp changes in volume and the changing amount can be controlled by temperature, electricity, etc. For example, an expanding portion provided in an expansion clamp is heated to be thermally expanded to thereby cause the expansion clamp to be brought into contact with the internal peripheral surface of the tubular body with this expansion force, or further cause the tubular body to be expanded. Alternatively, the so-called piezo-actuator utilizing a material that will be expanded by applying electricity can be employed to cause the expansion clamp to be brought into contact with the internal peripheral surface, or further cause the tubular body to be expanded.

[Twelfth Embodiment]

Next, a tubular body inspecting apparatus according to the present invention will be explained.

Figure 54:
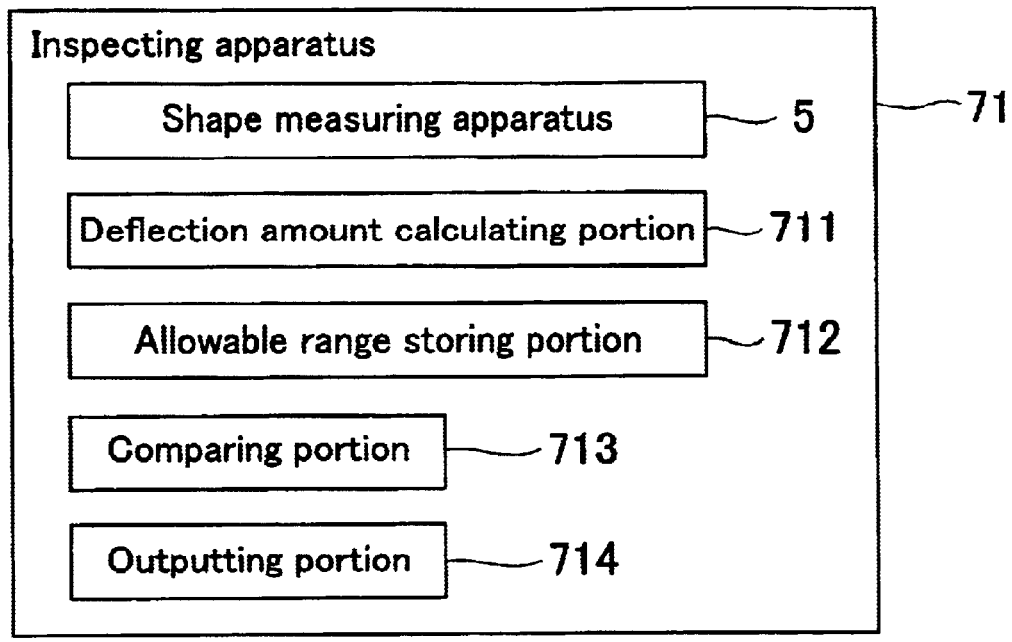
FIG. 54 is a function block diagram showing the structure of the detection device 71.

FIG. 54 is a functional block diagram showing the structure of the inspecting apparatus 71.

This inspecting apparatus 71 is equipped with an automatic shape measuring apparatus 5 according to the second embodiment among the aforementioned embodiments, a deflection amount calculating portion 711 for calculating the deflection amount of the external peripheral surface 12 from the displacement data of the external peripheral surface 12 detected by the shape measuring apparatus 5, an allowable range storing portion 712 for setting and storing the allowable range of the deflection of the external peripheral surface of the tubular body 10, a comparing portion 713 for discriminating whether the deflection amount of the tubular body 10 calculated by the deflection amount calculating portion 711, and an outputting portion 714 for outputting the inspected result.

The shape measuring apparatus is not limited to the aforementioned second embodiment, and can be any one of another embodiments or its modification.

Concretely, the deflection amount calculating portion 711, the allowable range storing portion 712, the comparing portion 713 and the outputting portion 714 are comprised of software and hardware performing each function in a sequencer, etc., consisting of a computer.

The deflection amounts treated in the deflection amount calculating portion 711, the allowable region storing portion 712 and the comparing portion 713 can be the deflection amounts at all five portions or some of them in the case where the displacements of the external peripheral surface 12 at the five portions (five cross-sections) in the axial direction of the tubular body 10 are detected by the shape measuring apparatus 5 for example.

Furthermore, even in the case where deflection amounts of plural portions (e.g., five portions) are used, the acceptable condition of the final inspection can be that each of all the deflection amounts fall within the predetermined allowable range or that the combination of the deflection amounts at plural portions falls within the predetermined allowable range. The example of the combination of the deflection amounts is that each of the deflection amount at the plural portions falls within the predetermined range and the total of these deflection amounts fall within the predetermined range.

In this embodiment, the calculating means for processing the raw data of the displacement of the external peripheral surface of the tubular body 10 detected by the shape measuring apparatus 5 and calculating the index value or the like showing the shape of the tubular body 10 such as a deflection amount of the external peripheral surface is set outside the shape measuring apparatus 5. However, the shape measuring apparatus 5 can be provided with such a calculating means. Furthermore, the shape measuring apparatus 5 can have an outputting means for outputting the calculated result.

[Thirteen Embodiment]

Next, a tubular body manufacturing system according to the present invention will be explained.

Figure 55:
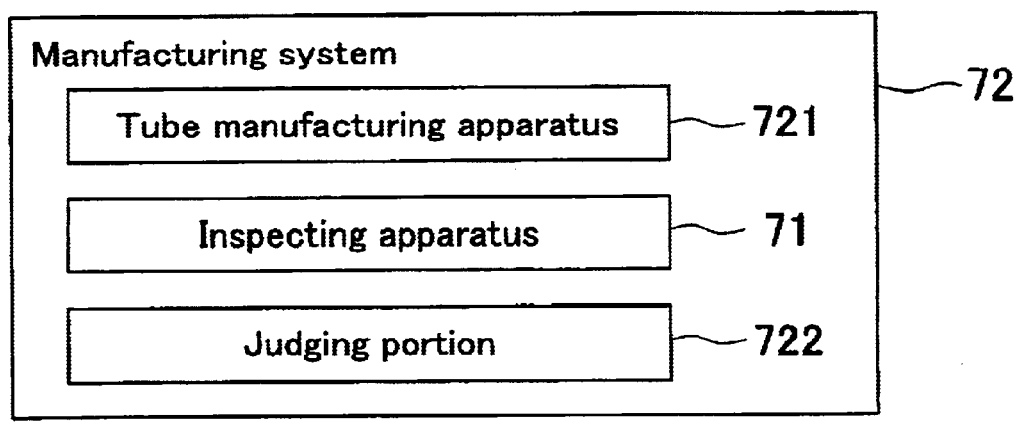
FIG. 55 a function block diagram showing the structure of the manufacturing system 72.

FIG. 55 is a functional block showing the structure of the manufacturing system 72.

This manufacturing system 72 is provided with a tube manufacturing apparatus 721 for manufacturing a tubular body 10, the aforementioned inspecting apparatus 71 and a judging portion 722 for judging whether the tubular body 10 is a completed item based on the inspection result of the inspecting apparatus 71.

The tube manufacturing apparatus 721 is an apparatus for manufacturing a tube by combining the extruding and drawing of a photosensitive drum substrate. Concretely, in the case of manufacturing an aluminum alloy photosensitive drum, the apparatus is constituted as an assembly of mechanical devices for carrying a step of manufacturing extruding material by dissolving raw materials, an extruding step, a drawing step, a correcting step, a cutting step for cutting into a predetermined length, a washing step, etc. The manufacturing apparatus 721 is not limited to the above as long as it can manufacture a tubular body, and can be any apparatus capable of manufacturing a tubular body by a cutting operation.

The tubular body 10 manufactured as mentioned above is inspected whether the shape is in a predetermined allowable range. Based on the inspection result, the judging portion 722 judges the tubular body 10 as a completed item if it falls within the predetermined allowable range.

It is preferable that the manufacturing system 72 is provided with an automatic carrying apparatus for automatically carrying the tubular body 10 from the tube manufacturing apparatus 721 to the shape measuring apparatus 5 of the inspecting apparatus 71.

Furthermore, it is preferable that the manufacturing system 72 is provided with a carrying apparatus for carrying the completed item judged as an accepted product by the judging portion 722 and the possible defect product to different places.

Furthermore, in the tubular body shape measuring apparatus 5 equipped in the inspecting apparatus 71, it is preferable to equip a feedback function for feeding the discrimination of the type or feature of the defect generated in the tubular body 10 back to the tube manufacturing apparatus 721 to prevent the generation of a defected product.

[Supplementary Explanation]

Although the present invention was explained with reference to each embodiment, the preferable structure regarding the ninth embodiment can be exemplified as follows.

In the tubular body shape measuring method, it is preferable that three or more correcting rollers are brought into contact with each end portion of the tubular body. In this case, the shape of the end portion of the tubular body can be corrected while holding the tubular body in a stable manner.

Furthermore, in the tubular body shape measuring method, it is preferable that the correcting rollers include an inner correcting roller coming into contact with the internal peripheral surface of the tubular body 1 and an outer correcting roller coming into contact with the external peripheral surface of the tubular body. In this case, the tubular body can be stably supported by being pinched by and between from the inside and outside of the tubular body, and that correcting rollers can be disposed closely with each other. Thus, plural correcting rollers can be firmly positioned to thereby enable accurate correcting of each end portion of the tubular body.

In the tubular body shape measuring method, it is preferable that the inner correcting rollers can be slid in the axial direction of the tubular body to be positioned outside the tubular body from the end portion of the tubular body when the tubular body is carried in and out of the shape measuring position. In this case, by moving the inner correcting rollers in the axially outward direction at the time of setting the tubular body, the tubular body can be set to the shape measuring position without moving the tubular body in the axial direction thereof.

Furthermore, in the tubular body shape measuring method, it is preferable that the inner correcting roller and the outer correcting roller are moved so as to be away from each other before and after measuring the shape of the tubular body. In this case, at the time of setting the tubular body, the tubular body is not pinched by and between the inner correcting roller and the outer correcting roller, enabling an easy setting of the tubular body into the shape measuring position.

In the tubular body shape measuring method, it is preferable that the inner correcting roller and the outer correcting roller come into contact with the internal peripheral surface and the external peripheral surface of the tubular body at different circumferential positions. In this case, correcting force can be effectively applied to the circumferential position of the tubular body pinched by and between the inner correcting roller and the outer correcting roller.

In the tubular body shape measuring method, it is preferable that two or more outer correcting rollers are positioned at each end portion of the tubular body. In this case, since the tubular body can be supported by two or more outer correcting rollers, the posture of the tubular body can be stabilized.

In the tubular body shape measuring method, it is preferable that two or more outer correcting rollers come into contact with the lower side of the tubular body. In this case, the outer correcting rollers below the tubular body can be utilized as a provisional platform for temporarily supporting the tubular body before and after the setting of the tubular body to the shape measuring position.

Furthermore, in the tubular body shape measuring method, it is preferable that the correcting rollers are fixed to predetermined positions respectively in the state in which the cross-sectional shape of the end portions of the tubular body are temporarily being corrected.

Furthermore, in the tubular body shape measuring method, it is preferable that the correcting rollers are fixed to the positions where they just come into contact with the internal peripheral surface and the external peripheral surface of the tubular body, provided that the cross-sectional shape of each end portion of the tubular body is appropriate. In this case, the end portion of the tubular body can be corrected into an appropriate shape easily and assuredly without performing complex controls or the like.

Furthermore, in the tubular body shape measuring method, it is preferable that at least one of the correcting rollers applies a pressing force against the tubular body. In this case, correcting flexibility can be obtained. Therefore, it becomes possible to perform an appropriate correcting depending concrete tubular body shape.

Furthermore, in the tubular body shape measuring method, it is preferable that the pressing force applied to the correcting rollers is changed depending on the rotational phase of the tubular body. In this case, correcting force depending on the shape at each circumferential position of the tubular body can be applied, enabling more appropriate correcting operation.

Furthermore, in the tubular body shape measuring method, it is preferable that, in a state in which the tubular body is being rotated with the cross-sectional shape of the end portion being temporarily corrected, the cross-sectional shape of the end portion is detected and pressing force applying to the correcting rollers is changed depending on the cross-sectional shape of the end portion. In this case, since the cross-sectional shape of the end portion of the tubular body is detected, an appropriate correcting operation can be performed by applying correcting force depending on the cross-sectional shape of the tubule body based on the detected result.

Furthermore, in the tubular body shape measuring method, it is preferable that at least one of the correcting rollers is fixed to a predetermined position in a state in which the cross-sectional shape of the end portion of the tubular body is being temporarily corrected. In this case, since the correcting roller fixed to the predetermined position can be used as a reference of the shape measurement of the tubular body, accurate shape measurement can be attained.

Furthermore, in the tubular body shape measuring method, the deformation by the temporary correcting to the end portion of the tubular body can be performed within the elastic deforming region of the tubular body. In this case, the deformation of the tubular body during the shape measurement returns to the original shape, effects to the tubular body by the shape measurement can be minimized assuredly.

Furthermore, in the tubular body shape measuring method, the deformation by the temporary correction to the end portion of the tubular body can be made so as to reach the plastic deformation region. In this case, the cross-sectional shape of the end portion of the tubular body can be corrected assuredly into an appropriate shape regardless whether the deformation of the end portion of the tubular body has reached the plastic deformation region, enabling more accurate shape measurement.

Furthermore, in the tubular body shape measuring method, it is preferable that at least one of the correcting rollers is rotatably driven. In this case, the correcting roller functions as a means for rotating the tubular body, minimizing the number of members which come into contact with the tubular body. This eliminates error factors to contribute to accurate shape measurement, resulting in high reliability in shape measurement, and also can decrease the possibility of damages to the tubular body.

Furthermore, in the tubular body shape measuring method, it is preferable that the rotational driving of the correcting roller is performed by a single rotational driving source. In this case, it becomes possible to restrain irregular rotation which may be generated when a plurality of rotational driving sources are employed and simplify the rotational control, resulting in high reliable shape measurement.

Furthermore, in the tubular body shape measuring method, it is preferable that the detecting positions for displacement include a plurality of positions outside the tubular body. In this case, the deflection of the external peripheral surface can be measured at plural positions at the outside of the tubular body. By combining the measured results, the shape of the tubular body can be recognized more concretely.

Furthermore, in the tubular body shape measuring method, it is preferable that the detecting positions for displacement include a plurality of positions different in axial position of the tubular body. In this case, the deflection of the external peripheral surface can be measured at plural positions different in axial position of the tubular body. By combining the measured results, the change of the shape in the axial direction of the tubular body can be recognized.

Furthermore, in the tubular body shape measuring method, it is preferable that the detecting positions for displacement include a plurality of positions same in axial position of the tubular body but different in circumferential position. In this case, by combining the measured displacement amounts detected at these plural positions, the cross-sectional shape at the axial position can be recognized more concretely.

Furthermore, in the tubular body shape measuring method, it is preferable that the detecting positions for displacement include two positions same in axial position of the tubular body but different in circumferential position by a half circumferential length. In this case, by combining the measured displacement amounts detected at these two positions, the diameter passing these two positions can be obtained. Thus, the shape of the tubular element can be recognized more concretely.

Furthermore, in the tubular body shape measuring method, it is preferable that the number of the rotation of the tubular body is one or more. In this case, the entire circumferential shape of the tubular body can be detected.

Furthermore, in the tubular body shape measuring method, the detection of the displacement can be performed continuously during the entire period or a part of the period for rotating the tubular body. In this case, a partial shape change in the circumferential direction of the tubular body can also be detected.

Furthermore, in the tubular body shape measuring method, the detection of the displacement can be performed intermittently during the period for rotating the tubular body. In this case, the displacement of the external peripheral surface of the tubular body can be easily detected.

Furthermore, in the tubular body shape measuring method, the rotation of the tubular body is intermittently stopped and the detection of the displacement can be performed when the rotation of the tubular body is stopped. In this case, the displacement of the external peripheral surface of the tubular body can be easily detected.

Furthermore, in the tubular body shape measuring method, the detection of the displacement can be performed by using a detecting device which comes into contact with the external peripheral surface of the tubular body. In this case, the displacement of the external peripheral surface of the tubular body can be easily detected.

Furthermore, in the tubular body shape measuring method, it is preferable that the detection of the displacement can be performed by using a detecting device which does not come into contact with the external peripheral surface of the tubular body. In this case, the displacement of the external peripheral surface of the tubular body can be detected without harming the external peripheral surface of the tubular body.

Furthermore, in the tubular body shape measuring method, it is preferable that the detection of the displacement is performed by irradiating light against the tubular body from the outside thereof and detecting the light passed over the tubular body. In this case, the displacement of the external peripheral surface of the tubular body can be detected easily and accurately.

The preferable structures relating to the eleventh embodiment can be exemplified as follows.

It is preferable that the pair of expansion clamps come into contact the positions to be supported at the time of using the tubular body. In this case, the shape measurement can be performed as a reference which is a reference of the rotational operation at the time of the actual use. Accordingly, the measurement under the conditions closer to the actual conditions can be performed.

It is preferable that each expansion clamp comes into face-contact with the entire circumference of the internal peripheral surface of the tubular body with a predetermined contact width. In this case, it is prevented the tubular body from being deformed into a shape different from the shape in the actual use due to a partial contact of the expansion clamp against the internal peripheral surface of the tubular body, contributing accurate shape measurement. Furthermore, since no inappropriate deformation will be given to the tubular body, it becomes possible to bring the expansion clamp into contact with the internal peripheral surface of the tubular body with larger pressing force.

It is preferable that the pair of expansion clamps press radially outwardly against the entire circumference of the internal peripheral surface of the tubular body. In this case, the pair of expansion clamps can be assuredly brought into contact with the internal surface of the tubular body, assuredly realizing a state close to the rotational state at the time of the actual use.

Furthermore, it is preferable that the pair of expansion clamps deform the tubular body outwardly by pressing the internal peripheral surface of the tubular body outwardly. In this case, the supporting state closer to the supporting state at the time of actually using the tubular body 10 to which flanges are inserted into the vicinity of the end portions of the tubular body can be realized, which in turn can attain the rotating state closer to the rotating state in the actual use. Accordingly, by detecting the radial displacement of the external peripheral surface of the tubular body in this state, the deflection caused at the time of the actual use can be more accurately detected.

It is preferable that the deformation of the tubular body due to the pair of the expansion clamps is approximately the same as the deformation at the time of actually using the tubular body. In this case, the supporting state more closer to the supporting state in which flanges are inserted into the end portions of the tubular body at the time of using the tubular body 10. This can attain the state more closer to the rotating state in the actual use. Accordingly, by detecting the radial displacement of the external peripheral surface of the tubular body in this state, the deflection caused at the time of the actual use can be more accurately detected.

It is preferable that the pressing force of the expansion clamp pressing the internal peripheral surface of the tubular body is set to be approximately the same as the expanding pressing force applied to the tubular body at the time of using the tubular body. This can attain the supporting state more closer to the supporting state at the time of actually using the tubular body to which flanges are inserted into the vicinity of the end portions of the tubular body at the time of using the tubular body, which in turn can attain the rotating state closer to the rotating state in the actual use. Accordingly, by detecting the radial displacement of the external peripheral surface of the tubular body in this state, the deflection caused at the time of the actual use can be more accurately detected.

Furthermore, it is preferable that the deformation of the tubular body by the expansion clamp is smaller than that at the time of using the tubular body. In this case, the supporting state closer to the supporting state in which flanges are inserted into the end portions of the tubular body at the time of using the tubular body can be attained. This can attain the state more closer to the rotating state in the actual use. Accordingly, by detecting the radial displacement of the external peripheral surface of the tubular body in this state, the deflection caused at the time of the actual use can be more accurately detected. Furthermore, since the deformation is smaller that the deformation at the time of the actual use, influences to the tubular body due to the shape measurement can be decreased.

Furthermore, it is preferable to set the pressing force of the expansion clamp pressing against the internal peripheral surface of the tubular body to be smaller than the tube expanding pressure applied to the tubular body at the time of using the tubular body. In this case, the supporting state closer to the supporting state in which flanges are inserted into the end portions of the tubular body at the time of using the tubular body can be attained. This can attain a rotating state more closer to the rotating state at the time of the actual use. Accordingly, by detecting the radial displacement of the external peripheral surface of the tubular body in this state, the deflection caused at the time of the actual use can be more accurately detected. Furthermore, since the deformation is smaller that the deformation at the time of the actual use, influences to the tubular body due to the shape measurement can be decreased.

Furthermore, it is preferable that the tube deformation by the expansion clamp is performed within the elastic deformation region of the tubular body. In this case, the deformation of the tubular body during the shape measurement returns to the original shape, influences to the tubular body due to the shape measurement can be decreased assuredly.

Furthermore, it is preferable that the tube deformation by the expansion clamp is performed until it reaches the elastic deformation region of the tubular body. In this case, even in cases where a tube deformation reaching plastic deformation is given at the time of the actual use, an appropriate deformation for the shape measurement can be given to the tubular body depending in the degree of the actual deformation.

Furthermore, it is preferable that the expansion clamp is configured to be expanded by fluid pressure. In this case, large enough expanding force approximately even in the circumferential direction can be obtained, causing the clamp to be brought into contact with the internal peripheral surface of the tubular body. Further, sufficient pressing force against the internal peripheral surface of the tubular body can be obtained.

Furthermore, it is preferable that the expansion ring is provided with an elastic expansion ring to be radially outwardly expanded by fluid pressure so as to be brought into contact with the internal peripheral surface of the tubular body. In this case, large enough expanding force approximately even in the circumferential direction can be obtained, causing the clamp to be brought into contact with the internal peripheral surface of the tubular body. Further, sufficient pressing force against the internal peripheral surface of the tubular body can be obtained.

Furthermore, it is preferable that the pair of expansion clamps are disposed horizontally. In this case, the tubular body takes a posture with the axial direction approximately horizontal, and therefore measured result close to that in the use can be obtained in the case where the tubular body is used in this posture, Furthermore, it is preferable that the pair of expansion clamps are disposed vertically. In this case, it is prevented the axial central portion of the tubular body from being bent due to gravity, enabling the original shape to be measured.

Furthermore, it is preferable that the detecting positions for the displacement include a position other than the positions facing off against the expansion clamps from the outside of the tubular body. In this case, the displacement of the external peripheral surface considering thickness of the tubular body can be measured.

Furthermore, it is preferable that the detecting positions for displacement include a plurality of positions outside the tubular body. In this case, the deflection of the external peripheral surface can be measured at plural positions at the outside of the tubular body. By combining the measured results, the shape of the tubular body can be recognized more concretely.

Furthermore, it is preferable that the detecting positions for displacement include a plurality of positions different in axial position of the tubular body. In this case, the deflection of the external peripheral surface can be measured at plural positions different in axial position of the tubular body. By combining the measured results, the change of the shape in the axial direction of the tubular body can be recognized.

Furthermore, it is preferable that the detecting positions for displacement include a plurality of positions same in axial position of the tubular body but different in circumferential position. In this case, by combining the measured displacement amounts detected at these plural positions, the cross-sectional shape at the axial position can be recognized more concretely.

Furthermore, in the tubular body shape measuring method, it is preferable that the detecting positions for displacement include two positions same in axial position of the tubular body but different in circumferential position by a half circumferential length. In this case, by combining the measured displacement amounts detected at these two positions, the diameter passing these two positions can be obtained. Thus, the shape of the tubular element can be recognized more concretely.

Furthermore, it is preferable that the detecting positions for displacement include an outside position of the tubular body facing off against at least one of the pair of expansion clamps. In this case, the thickness of the tubular body contacting the expansion clamp can be detected. By combining this thickness with the detected results at another detecting positions, more concrete tubular body shape can be obtained. For example it is possible to calculate inspection results in accordance with a conventional inspection in which the displacement of the external peripheral surface of another portions with respect to the external peripheral surface at the vicinities of the end portions of the tubular body as a reference.

Furthermore, in the tubular body shape measuring method, it is preferable that the number of the rotation of the tubular body is one or more. In this case, the entire circumferential shape of the tubular body can be detected.

Furthermore, in the tubular body shape measuring method, the detection of the displacement can be performed continuously during the entire period or a part of the period for rotating the tubular body. In this case, a partial shape change in the circumferential direction of the tubular body can also be detected.

Furthermore, in the tubular body shape measuring method, the detection of the displacement can be performed intermittently during the period for rotating the tubular body. In this case, the displacement of the external peripheral surface of the tubular body can be easily detected.

Furthermore, the rotation of the tubular body is intermittently stopped and the detection of the displacement can be performed when the rotation of the tubular body is stopped. In this case, the displacement of the external peripheral surface of the tubular body can be easily detected.

Furthermore, the detection of the displacement can be performed by using a detecting device which comes into contact with the external peripheral surface of the tubular body. In this case, the displacement of the external peripheral surface of the tubular body can be easily detected.

Furthermore, it is preferable that the detection of the displacement can be performed by using a detecting device which does not come into contact with the external peripheral surface of the tubular body. In this case, the displacement of the external peripheral surface of the tubular body can be detected without harming the external peripheral surface of the tubular body.

Furthermore, it is preferable that the detection of the displacement is performed by irradiating light against the tubular body from the outside thereof and detecting the light passed over the tubular body. In this case, the displacement of the external peripheral surface of the tubular body can be detected easily and accurately.

What is claimed is:

1. A method for measuring a shape of a tubular body, comprising:

making a pair of reference portions and internal peripheral surfaces of vicinities of both end portions of the tubular body in contact with each other;

rotating the tubular body such that contact portions where the tubular body and the pair of reference portions come in contact with each other shift on the internal peripheral surface in a circumferential direction of the tubular body with positions of the pair of reference portions fixed; and detecting radial displacement of an external peripheral surface of the tubular body caused by a rotation of the tubular body at at least one position outside the tubular element, the at least one position being fixed relative to the circumferential direction of the tubular element.

2. The method for measuring a shape of a tubular body as recited in claim 1, wherein each of the pair of reference portions is formed into a spherical shape.

3. The method for measuring a shape of a tubular body as recited in claim 1, wherein each of the pair of reference portions is in contact with the internal peripheral surface of the tubular element with a certain contact length in an axial direction of the tubular element.

4. The method for measuring a shape of a tubular body as recited in claim 1, wherein the pair of reference portions is fixed relative to the circumferential direction thereof so as not to be rotated in accordance with the rotation of the tubular body at least when the tubular body is rotated to detect the radial displacement of the external peripheral surface of the tubular body.

5. The method for measuring a shape of a tubular body as recited in claim 1, wherein the pair of reference portions is constituted as rotating members rotatably supported, and exterior peripheral surfaces of the reference portions are in contact with the internal peripheral surface of the tubular body so as to be rotated together with the tubular body in accordance with the rotation of the tubular body.

6. The method for measuring a shape of a tubular body as recited in claim 5, wherein the pair of reference portions is supported by reference portion supporting axes from both outsides of the tubular body respectively, and wherein reference portion supporting axes are rotatably supported by bearings disposed outside both end portions of the tubular body.

7. The method for measuring a shape of a tubular body as recited in claim 1, wherein at least one of the pair of reference portions is constituted such that the at least one of the pair of reference portions is capable of changing its position among plural positions in an axial direction of the tubular body and capable of being fixed at each of the plural positions.

8. The method for measuring a shape of a tubular body as recited in claim 1, wherein two supporting rollers disposed at each of both ends of the tubular body are brought into contact with an external peripheral surface of end portions of the tubular body to thereby press the tubular body against the pair of reference portions.

9. The method for measuring a shape of a tubular body as recited in claim 1, wherein detecting positions of the displacement include a position facing off against a straight line passing two contact portions where the internal peripheral surface of the tubular body and the pair of reference portions is in contact from an outside of the tubular body but not facing off against the pair of reference portions.

10. The method for measuring a shape of a tubular body as recited in claim 9, wherein the detecting positions of the displacement include a position facing off against the pair of reference portions from an outside of the tubular body.

11. The method for measuring a shape of a tubular body as recited in claim 9, wherein the detecting positions of the displacement include plural positions located outside the tubular body.

12. The method for measuring a shape of a tubular body as recited in claim 11, wherein the detecting positions of the displacement include plural positions different in the axial direction of the tubular body.

13. The method for measuring a shape of a tubular body as recited in claim 11, wherein the detecting positions of the displacement include plural positions which are the same in axial directional position of the tubular body but different in peripheral directional position thereof.

14. The method for measuring a shape of a tubular body as recited in claim 11, wherein the detecting positions of the displacement include two positions which are the same in axial directional position of the tubular body but different in peripheral directional position by a half peripheral length of the tubular body.

15. An apparatus for measuring a shape of a tubular body, comprising:
- a pair of reference portions in contact with an internal peripheral surface of vicinities of both end portions of the tubular body disposed horizontally or near horizontally;
- a pedestal portion that supports the tubular body, wherein the pedestal portion is in contact with an external peripheral surface of the tubular body from a lower side of the tubular body so that a height of the internal peripheral surface of the tubular body is positioned at the same height or almost at the same height of the pair of reference portions;
- a pressing portion that presses the external peripheral surface of the tubular body so as to press the tubular body against the reference portion, the pressing portion being provided at an outside of the tubular body; and
- a displacement detecting device that detects radial displacement of an external peripheral surface of the tubular body caused by a rotation of the tubular body when the tubular body rotates in a state in which the tubular body is in contact with the pair of reference portions at a position facing off against a hypothetical straight line passing two contact portions where the internal peripheral surface of the tubular body and the pair of reference portions contact from an outside of the tubular body.

16. The apparatus for measuring a shape of a tubular body as recited in claim 15, wherein the tubular body is rotated manually.

17. The apparatus for measuring a shape of a tubular body as recited in claim 15, wherein the displacement detecting device is provided with:
- a contact portion that comes into contact with the external peripheral surface of the tubular body; and
- a biasing means that urges the contact portion so as to be pressed against the external peripheral surface of the tubular body,
- wherein the displacement detecting device detects the displacement caused by the rotation of the tubular body from a movement of the contact portion and also functions as the pressing portion for pressing the external peripheral surface of the tubular body so as to press the tubular body against the pair of reference portions.

18. The apparatus for measuring a shape of a tubular body as recited in claim 15, wherein a stopper which comes into contact with an end surface of the tubular body to regulate an axial position of the tubular body is equipped only at one side of the tubular body.

19. An apparatus for measuring a shape of a tubular body, comprising:
- a pair of reference portions which come into contact with internal peripheral lower surfaces of vicinities of both end portions of a tubular body disposed horizontally or nearly horizontally;
- four supporting rollers which come into contact with external peripheral lower surfaces of the tubular body to support the tubular body and press the tubular body against the pair of reference portions, wherein two of the four supporting rollers are disposed at one of end portions of the tubular body and the other two of the four supporting rollers are disposed at the other side portion of the tubular body; and
- a displacement detecting device that detects radial displacement of an external peripheral surface of the tubular body caused by a rotation of the tubular body when the tubular body rotates in a state in which the tubular body is in contact with the pair of reference portions at a position facing off against a straight line passing two contact portions where the internal peripheral surface of the tubular body and the pair of reference portions contact from an outside of the tubular body.

20. The apparatus for measuring a shape of a tubular body as recited in claim 19, further comprising an elevating means for moving up and down the supporting rollers in an up-and-down direction or almost up-and-down direction so as to move up and down the tubular body supported by the supporting rollers between a measuring position where the internal peripheral lower surface comes into contact with the pair of reference portions and an apart-position where the internal peripheral lower surface is apart from the pair of reference portions.

21. The apparatus for measuring a shape of a tubular body as recited in claim 20, wherein the elevating means comprises, at respective side end portions of the tubular body, an elevating member rotatably supporting two of the supporting rollers, a moving direction regulating means for limiting a moving direction of the elevating member to an up-and-down direction or almost up-and-down direction and a driving means for moving up and down the elevating member.

22. The apparatus for measuring a shape of a tubular body as recited in claim 19, wherein the supporting rollers constitute a provisional platform.

23. The apparatus for measuring a shape of a tubular body as recited in claim 19, wherein each of the supporting rollers is provided with a smaller diameter portion comes into contact with the external peripheral lower surface of the tubular body and a larger diameter portion located outside the smaller diameter portion, and wherein the larger diameter portion has a rising surface which comes into contact with a side end surface of the tubular element to define an axial position of the tubular body.

24. The apparatus for measuring a shape of a tubular body as recited in claim 19, wherein the supporting rollers come into contact with the tubular body at positions different from contact positions of the pair of reference portions and the tubular body in an axial direction of the tubular body.

25. The apparatus for measuring a shape of a tubular body as recited in claim 19, further comprising a tubular body transferring means for transferring the tubular body from a certain transfer position onto the supporting rollers.

26. A method for measuring a shape of a tubular body, comprising:
temporarily correcting cross-sectional shapes of both end portions of the tubular body by bringing plural correcting rollers into contact with both end portions of the tubular body;
rotating the tubular body in a state in which the cross-sectional shapes of the both end portions are temporarily being corrected; and
detecting radial displacement of an external peripheral surface of the tubular body caused by a rotation of the tubular body.

27. The method for measuring a shape of a tubular body as recited in claim 26, wherein deformation of both end portions of the tubular body by the temporary correction is performed within an elastic deformation area of the tubular body.

28. The method for measuring a shape of a tubular body as recited in claim 26, wherein deformation of both end portions of the tubular body by the temporary correction is performed so as to reach an elastic deformation area of the tubular body.

29. The method for measuring a shape of a tubular body as recited in claim 26, wherein, in a state in which the cross-sectional shapes of both end portions of the tubular body is temporarily being corrected, the correction rollers are fixed at respective positions where the correction rollers just come into contact with corresponding assumed internal or external peripheral surface of the tubular body whose cross-sectional shape of both end portions is proper.

30. The method for measuring a shape of a tubular body as recited in claim 26, wherein at least one of the plurality of correcting rollers is pressed against the tubular body with pressing force changing in response to a rotational phase of the tubular body.

31. A method for measuring a shape of a tubular body, comprising:
plastically deforming both end portions of the tubular body to correct a cross-sectional shape of both end portions by rotating the tubular body while pressing both end portions with a plurality of correcting rollers; and
decreasing pressing force of the correcting rollers against the end portions of the tubular body and then continuously rotating the tubular body while bringing at least a part of the correcting rollers into contact with the tubular body to detect radial displacement of an external peripheral surface of the tubular body caused by a rotation of the tubular body, thereby performing a measurement of the shape of the tubular body.

32. The method for measuring a shape of a tubular body as recited in claim 31, wherein, after the correction of the cross-sectional shape of both end portions of the tubular body, an ex-post measurement of the cross-sectional shape of both end portions of the tubular body is performed by detecting the radial displacement of the internal and/or external peripheral surface of both end portions of the tubular body caused by a rotation of the tubular body rotated in a state in which at least a part of the correcting rollers is in contact with both end portions of the tubular body with slight pressing force, and wherein the correction is repeated if the result of the ex-post measurement fails to meet a predetermined criterion.

33. A method for measuring a shape of a tubular body, comprising:
inserting a pair of expandable clamps into the inside of vicinities of both end portions of the tubular body;
expanding the pair of expandable clamps to thereby bring the pair of expanded clamps into contact with internal peripheral surfaces of the tubular body along entire circumference thereof;
rotating the tubular body together with the expandable clamps about a central axis of the pair of expandable clamps as a rotation axis; and
detecting radial displacement of an external peripheral surface of the tubular body caused by a rotation of the tubular body at at least one position positioned outside the tubular body and fixed with respect to a circumferential direction of the tubular body.

34. The method for measuring a shape of a tubular body as recited in claim 33, wherein the pair of expandable clamps is brought into contact with support scheduled positions of the tubular body in use.

35. The method for measuring a shape of a tubular body as recited in claim 33, wherein the pair of expandable clamps is brought into face-contact with the internal peripheral surface of the tubular body along the entire circumference thereof.

36. The method for measuring a shape of a tubular body as recited in claim 33, wherein the pair of expandable clamps press radially outwardly an entire circumference of the internal peripheral surface of the tubular body evenly or approximately evenly.

37. The method for measuring a shape of a tubular body as recited in claim 36, wherein the pair of expandable clamps causes enlarged deformation of the tubular body by pressing the internal peripheral surface of the tubular body radially outwardly.

38. The method for measuring a shape of a tubular body as recited in claim 1, wherein the tubular body is a photosensitive drum substrate for a photosensitive drum.

39. An inspection method of a tubular body, comprising:
measuring a shape of the tubular body according to the method for measuring a shape of a tubular body as recited in claim 1; and
inspecting whether the shape of the tubular body falls within a predetermined allowable range based on the measured result.

40. A method for manufacturing a tubular body, comprising:

manufacturing a tubular body;

inspecting a shape of the tubular body by the inspection method of a tubular body as recited in claim 39; and discriminating that the tubular body is a completed product if the inspection result shows that the shape of the tubular body falls within the predetermined allowable range.

41. A tubular body manufactured by the method for manufacturing a tubular body as recited in claim 40.

42. A photosensitive drum substrate manufactured by the method for manufacturing a tubular body as recited in claim 40.

43. A method for manufacturing a tubular body, comprising:

manufacturing a tubular body;

measuring a shape of the tubular body by the method for measuring a shape of a tubular body as recited in claim 8;

inspecting whether the shape of the tubular body falls within a predetermined allowable range based on the measured result; and discriminating that the tubular body is a completed product if the inspection result shows that the shape of the tubular body falls within the predetermined allowable range.

44. A photosensitive drum raw tube manufactured by the method for manufacturing a tubular body as recited in claim 43, wherein no contact trace extending in a circumferential direction exists on an external peripheral surface except for both end portions thereof.

45. A method for manufacturing a tubular body, comprising:

manufacturing a tubular body;

measuring a shape of the tubular body by the method for measuring a shape of a tubular body as recited in claim 9;

inspecting whether the measured result of the radial displacement of an external peripheral surface of the tubular body at a position facing off against a straight line passing two contact portions where the internal peripheral surface of the tubular body and the pair of reference portions contact from an outside of the tubular body but not facing off against the pair of reference portions falls within a predetermined allowable range; and discriminating that the tubular body is a completed product if the inspection result shows that the shape of the tubular body falls within the predetermined allowable range.

46. A tubular body manufactured by the method for manufacturing a tubular body as recited in claim 45, wherein radial displacement of an external peripheral surface of the tubular body at a position facing off against a straight line passing two contact portions where the internal peripheral surface of the tubular body and the pair of reference portions contact from an outside of the tubular body but not facing off against the pair of reference portions is 20 $\mu$m or less.

47. A set of tubular bodies manufactured by the method for manufacturing a tubular body as recited in claim 45, wherein all of the tubular bodies contained in the set are 20 $\mu$m or less in radial displacement of an external peripheral surface of the tubular body at a position facing off against a straight line passing two contact portions where the internal peripheral surface of the tubular body and the pair of reference portions contact from an outside of the tubular body but not facing off against the pair of reference portions.

48. An apparatus for inspecting a tubular body, comprising:

an apparatus for measuring a shape of a tubular body as recited in claim 19; and a comparative means for inspecting whether the shape of the tubular body falls within a predetermined allowable range based on the displacement detected by the displacement detecting device.

49. A system for manufacturing a tubular body, comprising:

a tube manufacturing apparatus for manufacturing a tubular body;

an inspection apparatus for a tubular body as recited in claim 48;

an acceptance/rejection discriminating means for discriminating that the tubular body is a completed product if the inspection result by the inspection apparatus shows that the shape of the tubular body falls within the predetermined allowable range.

* * * * *